(12) United States Patent
Bellissimo et al.

(10) Patent No.: US 12,528,224 B2
(45) Date of Patent: Jan. 20, 2026

(54) AUTOMATED SYSTEMS AND METHODS FOR TRUSS ASSEMBLIES IN THE CONSTRUCTION OF MODULAR BUILDINGS

(71) Applicant: Buildz, LLC, Forest City, NC (US)

(72) Inventors: Mark Joseph Bellissimo, Forest City, NC (US); Jason Daryl Hunsinger, Forest City, NC (US); Stanley Clark Beard, Jr., Forest City, NC (US); Harrison Grant Meadows, Forest City, NC (US)

(73) Assignee: Buildz, LLC, Forest City, NC (US)

( * ) Notice: Subject to any disclaimer, the term of this patent is extended or adjusted under 35 U.S.C. 154(b) by 277 days.

(21) Appl. No.: 18/547,292

(22) PCT Filed: Feb. 25, 2022

(86) PCT No.: PCT/US2022/017977
§ 371 (c)(1),
(2) Date: Aug. 21, 2023

(87) PCT Pub. No.: WO2022/183037
PCT Pub. Date: Sep. 1, 2022

(65) Prior Publication Data
US 2024/0051178 A1    Feb. 15, 2024

Related U.S. Application Data

(60) Provisional application No. 63/154,553, filed on Feb. 26, 2021.

(51) Int. Cl.
| | | |
|---|---|---|
| *B27M 1/08* | (2006.01) | |
| *B27F 7/15* | (2006.01) | |
| *B27M 3/00* | (2006.01) | |
| *B27M 3/02* | (2006.01) | |
| *E04C 3/04* | (2006.01) | |
| *E04C 3/16* | (2006.01) | |
| *E04C 3/17* | (2006.01) | |
| *E04H 12/06* | (2006.01) | |

(52) U.S. Cl.
CPC ............... *B27M 1/08* (2013.01); *B27F 7/155* (2013.01); *B27M 3/0073* (2013.01); *B27M 3/02* (2013.01);
(Continued)

(58) Field of Classification Search
CPC ... B27F 7/155; E04C 3/16; E04C 3/17; E04C 2003/0486; E04H 12/06;
(Continued)

(56) References Cited

U.S. PATENT DOCUMENTS 3,543,815 A * 12/1970 Menge ................... B27G 5/023
  83/466
5,094,282 A *  3/1992 Suzuki .................... B23Q 7/14
  83/72

(Continued)

FOREIGN PATENT DOCUMENTS

| WO | 2019/079728 A1 | 4/2019 |
| WO | 2019/237030 A1 | 12/2019 |
| WO | 2019/237034 A1 | 12/2019 |

OTHER PUBLICATIONS

Communication under Rule 71(3) from EP Patent Application No. 22714950.7, dated Jan. 22, 2025, 9 pages.
(Continued)

*Primary Examiner* — Jared O Brown
(74) *Attorney, Agent, or Firm* — Michele V. Frank; Venable LLP

(57) ABSTRACT

Automated systems and methods of manufacturing truss elements for use in modular construction units can include stations, or steps, for forming angled webs, upright webs, and truss chords for use in the truss elements, transferring such angled webs, upright webs, and truss chords onto an assembly jig in a configuration corresponding to the truss element being manufactured, rigidly interconnecting, via
(Continued)

nail plates, the angled webs, the upright webs, and the truss chords to form a finished truss element, and unloading the finished truss element from the assembly jig.

46 Claims, 26 Drawing Sheets

(52) U.S. Cl.
CPC ............... *E04C 3/16* (2013.01); *E04C 3/17* (2013.01); *E04C 2003/0486* (2013.01); *E04H 12/06* (2013.01); *G05B 2219/45211* (2013.01); *Y10T 29/49625* (2015.01); *Y10T 29/5397* (2015.01)

(58) Field of Classification Search
CPC ..... G05B 2219/45211; Y10T 29/49625; Y10T 29/5397
See application file for complete search history.

(56) References Cited

U.S. PATENT DOCUMENTS

| | | | |
|---|---|---|---|
| 6,068,034 A * | 5/2000 | Phelps | B27M 1/08 144/380 |
| 6,651,306 B1 * | 11/2003 | LePoire | B27F 7/155 29/430 |
| 6,886,251 B1 * | 5/2005 | Andrews | B21D 47/01 29/430 |
| 2008/0082204 A1 * | 4/2008 | Kellam | G06Q 10/06 700/223 |
| 2008/0172983 A1 * | 7/2008 | Urmson | B27M 1/08 52/745.19 |
| 2010/0024345 A1 * | 2/2010 | McAdoo | B27F 7/155 52/690 |
| 2010/0024354 A1 * | 2/2010 | McAdoo | B27F 7/155 52/749.1 |
| 2010/0030363 A1 * | 2/2010 | McAdoo | E04C 3/17 901/50 |
| 2010/0030369 A1 * | 2/2010 | McAdoo | B27F 7/155 901/50 |
| 2010/0061829 A1 * | 3/2010 | McAdoo | E04C 3/17 901/14 |
| 2023/0364822 A1 * | 11/2023 | Jin | B27B 31/08 |

OTHER PUBLICATIONS

International Search Report and Written Opinion from PCT/US2022/017977 dated Jul. 7, 2022.
Communication pursuant to Article 94(3) EPC from EP Patent Application No. 22714950.7 dated Sep. 4, 2024, 3 pages.

* cited by examiner

AUTOMATED SYSTEMS AND METHODS FOR TRUSS ASSEMBLIES IN THE CONSTRUCTION OF MODULAR BUILDINGS

CROSS-REFERENCE TO RELATED APPLICATION

This application is a National Stage Application under 35 U.S.C. § 371 of PCT/US2022/017977 filed on Feb. 25, 2022, which claims priority benefit from U.S. Provisional Patent Application No. 63/154,553, filed on Feb. 26, 2021, the entire content of each of which is incorporated herein by reference.

TECHNICAL FIELD

The subject matter disclosed herein relates generally to the construction of modular construction units. In particular, the presently disclosed subject matter relates to a system for constructing geometric truss elements in an automated manner for use in a modular construction unit, as well as associated methods for the automated manufacture of such truss elements.

BACKGROUND

The production of modular, or prefabricated, buildings is a growing industry. In this type of manufacturing, sections of a building or structure are partially assembled at a remote location, and the sections are then delivered to the final building site, where final construction of the structure is ultimately completed by assembling the various sections together. Such modular structures can be used for a variety of purposes, including, for example, as temporary or permanent buildings, such as residential homes, commercial offices, educational or service facilities, etc.

Modular structures can have advantages over site-built structures in that they can often be built more rapidly and less expensively than structures built using such traditional construction techniques. In many cases, quality measurements such as squareness and structural integrity and strength can also be improved in modular constructed structures over traditional construction techniques, due to enhanced and/or automated processes available at the remote assembly location where the modular construction units are built and/or assembled before being transported to the final building site for final assembly. In particular, remote assembly can be advantageous in that it is more repeatable, offering greater accuracy and precision than is often possible using conventional construction techniques. This reduces the cost of the structure through by allowing for reduced safety factors to account for, due to the increased use of automation, decreased instances of human error, less material waste, and efficient process flow methods.

Nonetheless, opportunity still exists to improve modular building assembly systems. Existing modular building methods suffer from disadvantages related to process and/or tooling inflexibility. For example, a system might be limited to particular structural components or to particular material(s) and/or fastener type(s). In some cases, manual intervention by a human operator may be necessary with regularity at many steps of the process. Additionally, some systems are not capable of performing quality control checks. Thus, a need exists for improved systems, devices, and methods for the manufacture of modular construction units.

SUMMARY

This summary lists several embodiments of the presently disclosed subject matter, and in many cases lists variations and permutations of these embodiments. This summary is merely exemplary of the numerous and varied embodiments. Mention of one or more representative features of a given embodiment is likewise exemplary. Such an embodiment can typically exist with or without the feature(s) mentioned; likewise, those features can be applied to other embodiments of the presently disclosed subject matter, whether listed in this summary or not. To avoid excessive repetition, this summary does not list or suggest all possible combinations of such features.

According to an example embodiment, an automated system for manufacturing truss elements for use in modular construction units is provided herein, the system comprising an angled web grouping of stations configured to receive and cut dimensional lumber to form angled webs for use in assembly of the truss elements; an upright web grouping of stations configured to receive and cut dimensional lumber to form upright webs for use in assembly of the truss elements; a truss chord grouping of stations configured to receive and cut dimensional lumber to form truss chords for use in assembly of the truss elements; a finished lumber merge/transfer station, which is configured to receive the angled webs from the angled web grouping of stations, the upright webs from the upright web grouping of stations, and the truss chords from the truss chord grouping of stations, and to transfer the angled webs, the upright webs, and the truss chords onto an assembly jig at a finished lumber jig placement station; a bottom nail plate (BNP) grouping of stations configured to receive and position BNPs onto the assembly jig in designated positions for the truss elements being manufactured; a top nail plate (TN P) grouping of stations configured to receive and position TNPs onto the assembly jig in designated positions for the truss elements being manufactured; and a nail plate press station configured to press the BNPs and the TNPs through a corresponding one of the truss chords and into one or more of the angled webs and/or upright webs for rigidly interlocking the angled webs, the upright webs, and the truss chords together to form a finished truss element; the assembly jig comprising alignment and/or positioning features configured to hold the TNPs, the BNPs, the truss chords, the upright webs, and the angled webs in alignment with each other to form one of the truss elements.

According to an example embodiment, an automated system for manufacturing truss elements for use in modular construction units is provided herein, the system comprising an angled web grouping of stations configured to receive and cut dimensional lumber to form angled webs for use in assembly of the truss elements; an upright web grouping of stations configured to receive and cut dimensional lumber to form upright webs for use in assembly of the truss elements; a truss chord grouping of stations configured to receive and cut dimensional lumber to form truss chords for use in assembly of the truss elements; a finished lumber merge/transfer station, which is configured to receive the angled webs from the angled web grouping of stations, the upright webs from the upright web grouping of stations, and the truss chords from the truss chord grouping of stations, and to transfer the angled webs, the upright webs, and the truss chords onto an assembly jig at a finished lumber jig placement station; a bottom nail plate (BNP) grouping of stations configured to receive and position BNPs onto the assembly jig in designated positions for the truss elements being manufactured; a top nail plate (TNP) grouping of stations configured to receive and position TNPs onto the assembly jig in designated positions for the truss elements being manufactured; a nail plate press station configured to press the BNPs and the TNPs through a corresponding one of the truss chords and into one or more of the angled webs and/or upright webs for rigidly interlocking the angled webs, the upright webs, and the truss chords together to form a finished truss element; a finished truss storage station configured to store finished truss elements; and a finished truss unloading station configured to transfer finished truss elements from the assembly jig to the finished truss storage station; the assembly jig comprising alignment and/or positioning features configured to hold the TNPs, the BNPs, the truss chords, the upright webs, and the angled webs in alignment with each other to form one of the truss elements.

According to an example embodiment, an automated system for manufacturing truss elements for use in modular construction units is provided herein, the system comprising an angled web grouping of stations configured to receive and cut dimensional lumber to form angled webs for use in assembly of the truss elements; an upright web grouping of stations configured to receive and cut dimensional lumber to form upright webs for use in assembly of the truss elements; a truss chord grouping of stations configured to receive and cut dimensional lumber to form truss chords for use in assembly of the truss elements; a finished lumber merge/transfer station, which is configured to receive the angled webs from the angled web grouping of stations, the upright webs from the upright web grouping of stations, and the truss chords from the truss chord grouping of stations, and to transfer the angled webs, the upright webs, and the truss chords onto an assembly jig at a finished lumber jig placement station; a bottom nail plate (BNP) grouping of stations configured to receive and position BNPs onto the assembly jig in designated positions for the truss elements being manufactured; a top nail plate (TNP) grouping of stations configured to receive and position TNPs onto the assembly jig in designated positions for the truss elements being manufactured; a nail plate press station configured to press the BNPs and the TNPs through a corresponding one of the truss chords and into one or more of the angled webs and/or upright webs for rigidly interlocking the angled webs, the upright webs, and the truss chords together to form a finished truss element; a finished truss storage station configured to store finished truss elements; and a finished truss unloading station configured to transfer finished truss elements from the assembly jig to the finished truss storage station; the assembly jig comprising alignment and/or positioning features configured to hold the TNPs, the BNPs, the truss chords, the upright webs, and the angled webs in alignment with each other to form one of the truss elements; the finished truss storage station comprising a multi-level storage rack, which has at least an induction level and one or more upper levels, and a truss elevator; the induction level comprising an induction conveyor, which is configured to form the finished truss elements into a stack of finished truss elements, and a transport conveyor, which is configured to transfer the stack of finished truss elements onto the truss elevator; the induction conveyor is vertically movable between an induction position, in which a plane on which the finished truss elements are supported by the induction conveyor is above a plane defined by an upper surface of the transport conveyor, and a transport position, in which the plane on which the truss elements are supported by the induction conveyor is below the plane defined by the upper surface of the transport conveyor; and the truss elevator is configured to vertically move the stack of finished truss elements between the induction level and any of the one or more upper levels.

According to an example embodiment, an automated system for manufacturing truss elements for use in modular construction units is provided herein, the system comprising an angled web grouping of stations configured to receive and cut dimensional lumber to form angled webs for use in assembly of the truss elements; an upright web grouping of stations configured to receive and cut dimensional lumber to form upright webs for use in assembly of the truss elements; a truss chord grouping of stations configured to receive and cut dimensional lumber to form truss chords for use in assembly of the truss elements; a finished lumber merge/transfer station, which is configured to receive the angled webs from the angled web grouping of stations, the upright webs from the upright web grouping of stations, and the truss chords from the truss chord grouping of stations, and to transfer the angled webs, the upright webs, and the truss chords onto an assembly jig at a finished lumber jig placement station; a bottom nail plate (BNP) grouping of stations configured to receive and position BNPs onto the assembly jig in designated positions for the truss elements being manufactured; a top nail plate (TN P) grouping of stations configured to receive and position TNPs onto the assembly jig in designated positions for the truss elements being manufactured; a nail plate press station configured to press the BNPs and the TNPs through a corresponding one of the truss chords and into one or more of the angled webs and/or upright webs for rigidly interlocking the angled webs, the upright webs, and the truss chords together to form a finished truss element; a finished truss storage station configured to store finished truss elements; and a finished truss unloading station configured to transfer finished truss elements from the assembly jig to the finished truss storage station; the assembly jig comprising alignment and/or positioning features configured to hold the TNPs, the BNPs, the truss chords, the upright webs, and the angled webs in alignment with each other to form one of the truss elements; the finished truss storage station comprising a multi-level storage rack, which has at least an induction level and one or more upper levels, and a truss elevator; the induction level comprising an induction conveyor, which is configured to form the finished truss elements into a stack of finished truss elements, and a transport conveyor, which is configured to transfer the stack of finished truss elements onto the truss elevator; the induction conveyor is vertically movable between an induction position, in which a plane on which the finished truss elements are supported by the induction conveyor is above a plane defined by an upper surface of the transport conveyor, and a transport position, in which the plane on which the truss elements are supported by the induction conveyor is below the plane defined by the upper surface of the transport conveyor; the truss elevator is configured to vertically move the stack of finished truss elements between the induction level and any of the one or more upper levels; and the finished truss unloading station comprising an automated robot configured to lift the finished truss element off of the assembly jig and deposit the finished truss element onto the induction conveyor of the multi-level storage rack.

According to an example embodiment, an automated system for manufacturing truss elements for use in modular construction units is provided herein, the system comprising an angled web grouping of stations configured to receive and cut dimensional lumber to form angled webs for use in assembly of the truss elements; an upright web grouping of stations configured to receive and cut dimensional lumber to form upright webs for use in assembly of the truss elements; a truss chord grouping of stations configured to receive and cut dimensional lumber to form truss chords for use in assembly of the truss elements; a finished lumber merge/transfer station, which is configured to receive the angled webs from the angled web grouping of stations, the upright webs from the upright web grouping of stations, and the truss chords from the truss chord grouping of stations, and to transfer the angled webs, the upright webs, and the truss chords onto an assembly jig at a finished lumber jig placement station; a bottom nail plate (BNP) grouping of stations configured to receive and position BNPs onto the assembly jig in designated positions for the truss elements being manufactured; a top nail plate (TNP) grouping of stations configured to receive and position TNPs onto the assembly jig in designated positions for the truss elements being manufactured; a nail plate press station configured to press the BNPs and the TNPs through a corresponding one of the truss chords and into one or more of the angled webs and/or upright webs for rigidly interlocking the angled webs, the upright webs, and the truss chords together to form a finished truss element; a finished truss storage station configured to store finished truss elements; and a finished truss unloading station configured to transfer finished truss elements from the assembly jig to the finished truss storage station; the assembly jig comprising alignment and/or positioning features configured to hold the TNPs, the BNPs, the truss chords, the upright webs, and the angled webs in alignment with each other to form one of the truss elements; and the angled web grouping of stations comprising an angled web loading station, an angled web rough cut station, an angled web finish cut station, and an angled web delivery station.

According to an example embodiment, an automated system for manufacturing truss elements for use in modular construction units is provided herein, the system comprising an angled web grouping of stations configured to receive and cut dimensional lumber to form angled webs for use in assembly of the truss elements; an upright web grouping of stations configured to receive and cut dimensional lumber to form upright webs for use in assembly of the truss elements; a truss chord grouping of stations configured to receive and cut dimensional lumber to form truss chords for use in assembly of the truss elements; a finished lumber merge/transfer station, which is configured to receive the angled webs from the angled web grouping of stations, the upright webs from the upright web grouping of stations, and the truss chords from the truss chord grouping of stations, and to transfer the angled webs, the upright webs, and the truss chords onto an assembly jig at a finished lumber jig placement station; a bottom nail plate (BNP) grouping of stations configured to receive and position BNPs onto the assembly jig in designated positions for the truss elements being manufactured; a top nail plate (TNP) grouping of stations configured to receive and position TNPs onto the assembly jig in designated positions for the truss elements being manufactured; a nail plate press station configured to press the BNPs and the TNPs through a corresponding one of the truss chords and into one or more of the angled webs and/or upright webs for rigidly interlocking the angled webs, the upright webs, and the truss chords together to form a finished truss element; a finished truss storage station configured to store finished truss elements; and a finished truss unloading station configured to transfer finished truss elements from the assembly jig to the finished truss storage station; the assembly jig comprising alignment and/or positioning features configured to hold the TNPs, the BNPs, the truss chords, the upright webs, and the angled webs in alignment with each other to form one of the truss elements; the angled web grouping of stations comprising an angled web loading station, an angled web rough cut station, an angled web finish cut station, and an angled web delivery station; the angled web loading station comprising a conveyor configured to provide the dimensional lumber for use in forming the angled webs and an automated robot configured to transfer the dimensional lumber to the angled web rough cut station.

According to an example embodiment, an automated system for manufacturing truss elements for use in modular construction units is provided herein, the system comprising an angled web grouping of stations configured to receive and cut dimensional lumber to form angled webs for use in assembly of the truss elements; an upright web grouping of stations configured to receive and cut dimensional lumber to form upright webs for use in assembly of the truss elements; a truss chord grouping of stations configured to receive and cut dimensional lumber to form truss chords for use in assembly of the truss elements; a finished lumber merge/transfer station, which is configured to receive the angled webs from the angled web grouping of stations, the upright webs from the upright web grouping of stations, and the truss chords from the truss chord grouping of stations, and to transfer the angled webs, the upright webs, and the truss chords onto an assembly jig at a finished lumber jig placement station; a bottom nail plate (BNP) grouping of stations configured to receive and position BNPs onto the assembly jig in designated positions for the truss elements being manufactured; a top nail plate (TNP) grouping of stations configured to receive and position TNPs onto the assembly jig in designated positions for the truss elements being manufactured; a nail plate press station configured to press the BNPs and the TNPs through a corresponding one of the truss chords and into one or more of the angled webs and/or upright webs for rigidly interlocking the angled webs, the upright webs, and the truss chords together to form a finished truss element; a finished truss storage station configured to store finished truss elements; and a finished truss unloading station configured to transfer finished truss elements from the assembly jig to the finished truss storage station; the assembly jig comprising alignment and/or positioning features configured to hold the TNPs, the BNPs, the truss chords, the upright webs, and the angled webs in alignment with each other to form one of the truss elements; the angled web grouping of stations comprising an angled web loading station, an angled web rough cut station, an angled web finish cut station, and an angled web delivery station; the angled web loading station comprising a conveyor configured to provide the dimensional lumber for use in forming the angled webs and an automated robot configured to transfer the dimensional lumber to the angled web rough cut station; and the angled web rough cut station comprising a saw for cutting the dimensional lumber into angled web segments and a feed trough configured to receive the dimensional lumber from the robot of the angled web loading station and to move the dimensional lumber relative to the saw; the system comprising a controller configured to control a movement of the dimensional lumber along the feed trough and an actuation of the saw to produce the angled web segments having a length specified in instructions stored in a database associated with the controller for the truss elements being manufactured.

According to an example embodiment, an automated system for manufacturing truss elements for use in modular construction units is provided herein, the system comprising an angled web grouping of stations configured to receive and cut dimensional lumber to form angled webs for use in assembly of the truss elements; an upright web grouping of stations configured to receive and cut dimensional lumber to form upright webs for use in assembly of the truss elements; a truss chord grouping of stations configured to receive and cut dimensional lumber to form truss chords for use in assembly of the truss elements; a finished lumber merge/transfer station, which is configured to receive the angled webs from the angled web grouping of stations, the upright webs from the upright web grouping of stations, and the truss chords from the truss chord grouping of stations, and to transfer the angled webs, the upright webs, and the truss chords onto an assembly jig at a finished lumber jig placement station; a bottom nail plate (BNP) grouping of stations configured to receive and position BNPs onto the assembly jig in designated positions for the truss elements being manufactured; a top nail plate (TNP) grouping of stations configured to receive and position TNPs onto the assembly jig in designated positions for the truss elements being manufactured; a nail plate press station configured to press the BNPs and the TNPs through a corresponding one of the truss chords and into one or more of the angled webs and/or upright webs for rigidly interlocking the angled webs, the upright webs, and the truss chords together to form a finished truss element; a finished truss storage station configured to store finished truss elements; and a finished truss unloading station configured to transfer finished truss elements from the assembly jig to the finished truss storage station; the assembly jig comprising alignment and/or positioning features configured to hold the TNPs, the BNPs, the truss chords, the upright webs, and the angled webs in alignment with each other to form one of the truss elements; the angled web grouping of stations comprising an angled web loading station, an angled web rough cut station, an angled web finish cut station, and an angled web delivery station; the angled web loading station comprising a conveyor configured to provide the dimensional lumber for use in forming the angled webs and an automated robot configured to transfer the dimensional lumber to the angled web rough cut station; the angled web rough cut station comprising a saw for cutting the dimensional lumber into angled web segments and a feed trough configured to receive the dimensional lumber from the robot of the angled web loading station and to move the dimensional lumber relative to the saw; and the angled web finish cut station comprising a cutting machine for forming an end profile on opposing ends of each of the angled web segments to produce a finished angled web and a conveyor configured to transport the angled web segment into the cutting machine and to transport the finished angled web to a delivery trough of the angled web delivery station; the system comprising a controller configured to control a movement of the dimensional lumber along the feed trough and an actuation of the saw to produce the angled web segments having a length specified in instructions stored in a database associated with the controller for the truss elements being manufactured.

According to an example embodiment, an automated system for manufacturing truss elements for use in modular construction units is provided herein, the system comprising an angled web grouping of stations configured to receive and cut dimensional lumber to form angled webs for use in assembly of the truss elements; an upright web grouping of stations configured to receive and cut dimensional lumber to form upright webs for use in assembly of the truss elements; a truss chord grouping of stations configured to receive and cut dimensional lumber to form truss chords for use in assembly of the truss elements; a finished lumber merge/transfer station, which is configured to receive the angled webs from the angled web grouping of stations, the upright webs from the upright web grouping of stations, and the truss chords from the truss chord grouping of stations, and to transfer the angled webs, the upright webs, and the truss chords onto an assembly jig at a finished lumber jig placement station; a bottom nail plate (BNP) grouping of stations configured to receive and position BNPs onto the assembly jig in designated positions for the truss elements being manufactured; a top nail plate (TNP) grouping of stations configured to receive and position TNPs onto the assembly jig in designated positions for the truss elements being manufactured; a nail plate press station configured to press the BNPs and the TNPs through a corresponding one of the truss chords and into one or more of the angled webs and/or upright webs for rigidly interlocking the angled webs, the upright webs, and the truss chords together to form a finished truss element; a finished truss storage station configured to store finished truss elements; and a finished truss unloading station configured to transfer finished truss elements from the assembly jig to the finished truss storage station; the assembly jig comprising alignment and/or positioning features configured to hold the TNPs, the BNPs, the truss chords, the upright webs, and the angled webs in alignment with each other to form one of the truss elements; the angled web grouping of stations comprising an angled web loading station, an angled web rough cut station, an angled web finish cut station, and an angled web delivery station; the angled web loading station comprising a conveyor configured to provide the dimensional lumber for use in forming the angled webs and an automated robot configured to transfer the dimensional lumber to the angled web rough cut station; the angled web rough cut station comprising a saw for cutting the dimensional lumber into angled web segments and a feed trough configured to receive the dimensional lumber from the robot of the angled web loading station and to move the dimensional lumber relative to the saw; and the angled web finish cut station comprising a cutting machine for forming an end profile on opposing ends of each of the angled web segments to produce a finished angled web and a conveyor configured to transport the angled web segment into the cutting machine and to transport the finished angled web to a delivery trough of the angled web delivery station; the delivery trough of the angled web delivery station being configured to transport the finished angled webs to the finished lumber merge/transfer station; the system comprising a controller configured to control a movement of the dimensional lumber along the feed trough and an actuation of the saw to produce the angled web segments having a length specified in instructions stored in a database associated with the controller for the truss elements being manufactured.

According to an example embodiment, an automated system for manufacturing truss elements for use in modular construction units is provided herein, the system comprising an angled web grouping of stations configured to receive and cut dimensional lumber to form angled webs for use in assembly of the truss elements; an upright web grouping of stations configured to receive and cut dimensional lumber to form upright webs for use in assembly of the truss elements; a truss chord grouping of stations configured to receive and cut dimensional lumber to form truss chords for use in assembly of the truss elements; a finished lumber merge/transfer station, which is configured to receive the angled webs from the angled web grouping of stations, the upright webs from the upright web grouping of stations, and the truss chords from the truss chord grouping of stations, and to transfer the angled webs, the upright webs, and the truss chords onto an assembly jig at a finished lumber jig placement station; a bottom nail plate (BNP) grouping of stations configured to receive and position BNPs onto the assembly jig in designated positions for the truss elements being manufactured; a top nail plate (TN P) grouping of stations configured to receive and position TNPs onto the assembly jig in designated positions for the truss elements being manufactured; and a nail plate press station configured to press the BNPs and the TNPs through a corresponding one of the truss chords and into one or more of the angled webs and/or upright webs for rigidly interlocking the angled webs, the upright webs, and the truss chords together to form a finished truss element; the assembly jig comprising alignment and/or positioning features configured to hold the TNPs, the BNPs, the truss chords, the upright webs, and the angled webs in alignment with each other to form one of the truss elements; and the upright web grouping of stations comprising an upright web loading station, an upright web cut station, and an upright web delivery station.

According to an example embodiment, an automated system for manufacturing truss elements for use in modular construction units is provided herein, the system comprising an angled web grouping of stations configured to receive and cut dimensional lumber to form angled webs for use in assembly of the truss elements; an upright web grouping of stations configured to receive and cut dimensional lumber to form upright webs for use in assembly of the truss elements; a truss chord grouping of stations configured to receive and cut dimensional lumber to form truss chords for use in assembly of the truss elements; a finished lumber merge/transfer station, which is configured to receive the angled webs from the angled web grouping of stations, the upright webs from the upright web grouping of stations, and the truss chords from the truss chord grouping of stations, and to transfer the angled webs, the upright webs, and the truss chords onto an assembly jig at a finished lumber jig placement station; a bottom nail plate (BNP) grouping of stations configured to receive and position BNPs onto the assembly jig in designated positions for the truss elements being manufactured; a top nail plate (TNP) grouping of stations configured to receive and position TNPs onto the assembly jig in designated positions for the truss elements being manufactured; and a nail plate press station configured to press the BNPs and the TNPs through a corresponding one of the truss chords and into one or more of the angled webs and/or upright webs for rigidly interlocking the angled webs, the upright webs, and the truss chords together to form a finished truss element; the assembly jig comprising alignment and/or positioning features configured to hold the TNPs, the BNPs, the truss chords, the upright webs, and the angled webs in alignment with each other to form one of the truss elements; the upright web grouping of stations comprising an upright web loading station, an upright web cut station, and an upright web delivery station; and the upright web loading station comprising a conveyor configured to provide the dimensional lumber for use in forming the upright webs and an automated robot configured to transfer the dimensional lumber to the upright web cut station.

According to an example embodiment, an automated system for manufacturing truss elements for use in modular construction units is provided herein, the system comprising an angled web grouping of stations configured to receive and cut dimensional lumber to form angled webs for use in assembly of the truss elements; an upright web grouping of stations configured to receive and cut dimensional lumber to form upright webs for use in assembly of the truss elements; a truss chord grouping of stations configured to receive and cut dimensional lumber to form truss chords for use in assembly of the truss elements; a finished lumber merge/transfer station, which is configured to receive the angled webs from the angled web grouping of stations, the upright webs from the upright web grouping of stations, and the truss chords from the truss chord grouping of stations, and to transfer the angled webs, the upright webs, and the truss chords onto an assembly jig at a finished lumber jig placement station; a bottom nail plate (BNP) grouping of stations configured to receive and position BNPs onto the assembly jig in designated positions for the truss elements being manufactured; a top nail plate (TNP) grouping of stations configured to receive and position TNPs onto the assembly jig in designated positions for the truss elements being manufactured; and a nail plate press station configured to press the BNPs and the TNPs through a corresponding one of the truss chords and into one or more of the angled webs and/or upright webs for rigidly interlocking the angled webs, the upright webs, and the truss chords together to form a finished truss element; the assembly jig comprising alignment and/or positioning features configured to hold the TNPs, the BNPs, the truss chords, the upright webs, and the angled webs in alignment with each other to form one of the truss elements; the upright web grouping of stations comprising an upright web loading station, an upright web cut station, and an upright web delivery station; the upright web loading station comprising a conveyor configured to provide the dimensional lumber for use in forming the upright webs and an automated robot configured to transfer the dimensional lumber to the upright web cut station; and the upright web cut station comprising a saw for cutting the dimensional lumber into finished upright webs and a feed trough configured to receive the dimensional lumber from the robot of the upright web loading station and to move the dimensional lumber relative to the saw; the system comprising a controller configured to control a movement of the dimensional lumber along the feed trough and an actuation of the saw to produce the finished upright webs having a length specified in instructions stored in a database associated with the controller for the truss elements being manufactured; and the finished upright webs being transferred, after cutting of the dimensional lumber by the saw, to a delivery trough of the upright web delivery station.

According to an example embodiment, an automated system for manufacturing truss elements for use in modular construction units is provided herein, the system comprising an angled web grouping of stations configured to receive and cut dimensional lumber to form angled webs for use in assembly of the truss elements; an upright web grouping of stations configured to receive and cut dimensional lumber to form upright webs for use in assembly of the truss elements; a truss chord grouping of stations configured to receive and cut dimensional lumber to form truss chords for use in assembly of the truss elements; a finished lumber merge/transfer station, which is configured to receive the angled webs from the angled web grouping of stations, the upright webs from the upright web grouping of stations, and the truss chords from the truss chord grouping of stations, and to transfer the angled webs, the upright webs, and the truss chords onto an assembly jig at a finished lumber jig placement station; a bottom nail plate (BNP) grouping of stations configured to receive and position BNPs onto the assembly jig in designated positions for the truss elements being manufactured; a top nail plate (TNP) grouping of stations configured to receive and position TNPs onto the assembly jig in designated positions for the truss elements being manufactured; and a nail plate press station configured to press the BNPs and the TNPs through a corresponding one of the truss chords and into one or more of the angled webs and/or upright webs for rigidly interlocking the angled webs, the upright webs, and the truss chords together to form a finished truss element; the assembly jig comprising alignment and/or positioning features configured to hold the TNPs, the BNPs, the truss chords, the upright webs, and the angled webs in alignment with each other to form one of the truss elements; the upright web grouping of stations comprising an upright web loading station, an upright web cut station, and an upright web delivery station; the upright web loading station comprising a conveyor configured to provide the dimensional lumber for use in forming the upright webs and an automated robot configured to transfer the dimensional lumber to the upright web cut station; and the upright web cut station comprising a saw for cutting the dimensional lumber into finished upright webs and a feed trough configured to receive the dimensional lumber from the robot of the upright web loading station and to move the dimensional lumber relative to the saw; the system comprising a controller configured to control a movement of the dimensional lumber along the feed trough and an actuation of the saw to produce the finished upright webs having a length specified in instructions stored in a database associated with the controller for the truss elements being manufactured; the finished upright webs being transferred, after cutting of the dimensional lumber by the saw, to a delivery trough of the upright web delivery station; and the delivery trough of the upright web delivery station being configured to transport the finished upright webs to the finished lumber merge/transfer station.

According to an example embodiment, an automated system for manufacturing truss elements for use in modular construction units is provided herein, the system comprising an angled web grouping of stations configured to receive and cut dimensional lumber to form angled webs for use in assembly of the truss elements; an upright web grouping of stations configured to receive and cut dimensional lumber to form upright webs for use in assembly of the truss elements; a truss chord grouping of stations configured to receive and cut dimensional lumber to form truss chords for use in assembly of the truss elements; a finished lumber merge/transfer station, which is configured to receive the angled webs from the angled web grouping of stations, the upright webs from the upright web grouping of stations, and the truss chords from the truss chord grouping of stations, and to transfer the angled webs, the upright webs, and the truss chords onto an assembly jig at a finished lumber jig placement station; a bottom nail plate (BNP) grouping of stations configured to receive and position BNPs onto the assembly jig in designated positions for the truss elements being manufactured; a top nail plate (TNP) grouping of stations configured to receive and position TNPs onto the assembly jig in designated positions for the truss elements being manufactured; and a nail plate press station configured to press the BNPs and the TNPs through a corresponding one of the truss chords and into one or more of the angled webs and/or upright webs for rigidly interlocking the angled webs, the upright webs, and the truss chords together to form a finished truss element; the assembly jig comprising alignment and/or positioning features configured to hold the TNPs, the BNPs, the truss chords, the upright webs, and the angled webs in alignment with each other to form one of the truss elements; and the truss chord grouping of stations comprising a truss chord loading station, a truss chord cut station, and a truss chord delivery station. According to an example embodiment, an automated system for manufacturing truss elements for use in modular construction units is provided herein, the system comprising an angled web grouping of stations configured to receive and cut dimensional lumber to form angled webs for use in assembly of the truss elements; an upright web grouping of stations configured to receive and cut dimensional lumber to form upright webs for use in assembly of the truss elements; a truss chord grouping of stations configured to receive and cut dimensional lumber to form truss chords for use in assembly of the truss elements; a finished lumber merge/transfer station, which is configured to receive the angled webs from the angled web grouping of stations, the upright webs from the upright web grouping of stations, and the truss chords from the truss chord grouping of stations, and to transfer the angled webs, the upright webs, and the truss chords onto an assembly jig at a finished lumber jig placement station; a bottom nail plate (BNP) grouping of stations configured to receive and position BNPs onto the assembly jig in designated positions for the truss elements being manufactured; a top nail plate (TNP) grouping of stations configured to receive and position TNPs onto the assembly jig in designated positions for the truss elements being manufactured; and a nail plate press station configured to press the BNPs and the TNPs through a corresponding one of the truss chords and into one or more of the angled webs and/or upright webs for rigidly interlocking the angled webs, the upright webs, and the truss chords together to form a finished truss element; the assembly jig comprising alignment and/or positioning features configured to hold the TNPs, the BNPs, the truss chords, the upright webs, and the angled webs in alignment with each other to form one of the truss elements; the truss chord grouping of stations comprising a truss chord loading station, a truss chord cut station, and a truss chord delivery station; and the truss chord loading station comprising a conveyor configured to provide the dimensional lumber for use in forming the truss chords and an automated robot configured to transfer the dimensional lumber to the truss chord cut station.

According to an example embodiment, an automated system for manufacturing truss elements for use in modular construction units is provided herein, the system comprising an angled web grouping of stations configured to receive and cut dimensional lumber to form angled webs for use in assembly of the truss elements; an upright web grouping of stations configured to receive and cut dimensional lumber to form upright webs for use in assembly of the truss elements; a truss chord grouping of stations configured to receive and cut dimensional lumber to form truss chords for use in assembly of the truss elements; a finished lumber merge/transfer station, which is configured to receive the angled webs from the angled web grouping of stations, the upright webs from the upright web grouping of stations, and the truss chords from the truss chord grouping of stations, and to transfer the angled webs, the upright webs, and the truss chords onto an assembly jig at a finished lumber jig placement station; a bottom nail plate (BNP) grouping of stations configured to receive and position BNPs onto the assembly jig in designated positions for the truss elements being manufactured; a top nail plate (TN P) grouping of stations configured to receive and position TNPs onto the assembly jig in designated positions for the truss elements being manufactured; and a nail plate press station configured to press the BNPs and the TNPs through a corresponding one of the truss chords and into one or more of the angled webs and/or upright webs for rigidly interlocking the angled webs, the upright webs, and the truss chords together to form a finished truss element; the assembly jig comprising alignment and/or positioning features configured to hold the TNPs, the BNPs, the truss chords, the upright webs, and the angled webs in alignment with each other to form one of the truss elements; the truss chord grouping of stations comprising a truss chord loading station, a truss chord cut station, and a truss chord delivery station; the truss chord loading station comprising a conveyor configured to provide the dimensional lumber for use in forming the truss chords and an automated robot configured to transfer the dimensional lumber to the truss chord cut station; and the truss chord cut station comprising a saw for cutting the dimensional lumber into finished truss chords and a feed trough configured to receive the dimensional lumber from the robot of the truss chord loading station and to move the dimensional lumber relative to the saw; the system comprising a controller configured to control a movement of the dimensional lumber along the feed trough and an actuation of the saw to produce the finished truss chords having a length specified in instructions stored in a database associated with the controller for the truss elements being manufactured; the finished truss chords being transferred, after cutting of the dimensional lumber by the saw, to a delivery trough of the truss chord delivery station.

According to an example embodiment, an automated system for manufacturing truss elements for use in modular construction units is provided herein, the system comprising an angled web grouping of stations configured to receive and cut dimensional lumber to form angled webs for use in assembly of the truss elements; an upright web grouping of stations configured to receive and cut dimensional lumber to form upright webs for use in assembly of the truss elements; a truss chord grouping of stations configured to receive and cut dimensional lumber to form truss chords for use in assembly of the truss elements; a finished lumber merge/transfer station, which is configured to receive the angled webs from the angled web grouping of stations, the upright webs from the upright web grouping of stations, and the truss chords from the truss chord grouping of stations, and to transfer the angled webs, the upright webs, and the truss chords onto an assembly jig at a finished lumber jig placement station; a bottom nail plate (BNP) grouping of stations configured to receive and position BNPs onto the assembly jig in designated positions for the truss elements being manufactured; a top nail plate (TNP) grouping of stations configured to receive and position TNPs onto the assembly jig in designated positions for the truss elements being manufactured; and a nail plate press station configured to press the BNPs and the TNPs through a corresponding one of the truss chords and into one or more of the angled webs and/or upright webs for rigidly interlocking the angled webs, the upright webs, and the truss chords together to form a finished truss element; the assembly jig comprising alignment and/or positioning features configured to hold the TNPs, the BNPs, the truss chords, the upright webs, and the angled webs in alignment with each other to form one of the truss elements; the truss chord grouping of stations comprising a truss chord loading station, a truss chord cut station, and a truss chord delivery station; the truss chord loading station comprising a conveyor configured to provide the dimensional lumber for use in forming the truss chords and an automated robot configured to transfer the dimensional lumber to the truss chord cut station; the truss chord cut station comprising a saw for cutting the dimensional lumber into finished truss chords and a feed trough configured to receive the dimensional lumber from the robot of the truss chord loading station and to move the dimensional lumber relative to the saw; the system comprising a controller configured to control a movement of the dimensional lumber along the feed trough and an actuation of the saw to produce the finished truss chords having a length specified in instructions stored in a database associated with the controller for the truss elements being manufactured; the finished truss chords being transferred, after cutting of the dimensional lumber by the saw, to a delivery trough of the truss chord delivery station; and the delivery trough of the truss chord delivery station being configured to transport the finished truss chords to the finished lumber merge/transfer station.

According to an example embodiment, an automated system for manufacturing truss elements for use in modular construction units is provided herein, the system comprising an angled web grouping of stations configured to receive and cut dimensional lumber to form angled webs for use in assembly of the truss elements; an upright web grouping of stations configured to receive and cut dimensional lumber to form upright webs for use in assembly of the truss elements; a truss chord grouping of stations configured to receive and cut dimensional lumber to form truss chords for use in assembly of the truss elements; a finished lumber merge/transfer station, which is configured to receive the angled webs from the angled web grouping of stations, the upright webs from the upright web grouping of stations, and the truss chords from the truss chord grouping of stations, and to transfer the angled webs, the upright webs, and the truss chords onto an assembly jig at a finished lumber jig placement station; a bottom nail plate (BNP) grouping of stations configured to receive and position BNPs onto the assembly jig in designated positions for the truss elements being manufactured; a top nail plate (TNP) grouping of stations configured to receive and position TNPs onto the assembly jig in designated positions for the truss elements being manufactured; and a nail plate press station configured to press the BNPs and the TNPs through a corresponding one of the truss chords and into one or more of the angled webs and/or upright webs for rigidly interlocking the angled webs, the upright webs, and the truss chords together to form a finished truss element; the assembly jig comprising alignment and/or positioning features configured to hold the TNPs, the BNPs, the truss chords, the upright webs, and the angled webs in alignment with each other to form one of the truss elements; and the finished lumber merge/transfer station comprising at least one robot configured to transfer finished angled webs, finished upright webs, and finished truss chords onto the assembly jig at the finished lumber jig placement station according to instructions stored in a database for the truss elements being manufactured.

According to an example embodiment, an automated system for manufacturing truss elements for use in modular construction units is provided herein, the system comprising an angled web grouping of stations configured to receive and cut dimensional lumber to form angled webs for use in assembly of the truss elements; an upright web grouping of stations configured to receive and cut dimensional lumber to form upright webs for use in assembly of the truss elements; a truss chord grouping of stations configured to receive and cut dimensional lumber to form truss chords for use in assembly of the truss elements; a finished lumber merge/transfer station, which is configured to receive the angled webs from the angled web grouping of stations, the upright webs from the upright web grouping of stations, and the truss chords from the truss chord grouping of stations, and to transfer the angled webs, the upright webs, and the truss chords onto an assembly jig at a finished lumber jig placement station; a bottom nail plate (BNP) grouping of stations configured to receive and position BNPs onto the assembly jig in designated positions for the truss elements being manufactured; a top nail plate (TN P) grouping of stations configured to receive and position TNPs onto the assembly jig in designated positions for the truss elements being manufactured; and a nail plate press station configured to press the BNPs and the TNPs through a corresponding one of the truss chords and into one or more of the angled webs and/or upright webs for rigidly interlocking the angled webs, the upright webs, and the truss chords together to form a finished truss element; the assembly jig comprising alignment and/or positioning features configured to hold the TNPs, the BNPs, the truss chords, the upright webs, and the angled webs in alignment with each other to form one of the truss elements; the finished lumber merge/transfer station comprising at least one robot configured to transfer finished angled webs, finished upright webs, and finished truss chords onto the assembly jig at the finished lumber jig placement station according to instructions stored in a database for the truss elements being manufactured; and the BNP grouping of stations being configured to, before the finished angled webs, finished upright webs, and finished truss chords are transferred onto the assembly jig at the finished lumber jog placement station, place BNPs at prescribed locations on the assembly jig according to the instructions for the truss elements being manufactured.

According to an example embodiment, an automated system for manufacturing truss elements for use in modular construction units is provided herein, the system comprising an angled web grouping of stations configured to receive and cut dimensional lumber to form angled webs for use in assembly of the truss elements; an upright web grouping of stations configured to receive and cut dimensional lumber to form upright webs for use in assembly of the truss elements; a truss chord grouping of stations configured to receive and cut dimensional lumber to form truss chords for use in assembly of the truss elements; a finished lumber merge/transfer station, which is configured to receive the angled webs from the angled web grouping of stations, the upright webs from the upright web grouping of stations, and the truss chords from the truss chord grouping of stations, and to transfer the angled webs, the upright webs, and the truss chords onto an assembly jig at a finished lumber jig placement station; a bottom nail plate (BNP) grouping of stations configured to receive and position BNPs onto the assembly jig in designated positions for the truss elements being manufactured; a top nail plate (TNP) grouping of stations configured to receive and position TNPs onto the assembly jig in designated positions for the truss elements being manufactured; a nail plate press station configured to press the BNPs and the TNPs through a corresponding one of the truss chords and into one or more of the angled webs and/or upright webs for rigidly interlocking the angled webs, the upright webs, and the truss chords together to form a finished truss element; and a conveyor configured to move the assembly jig from the finished lumber jig placement station to a TNP jig placement station of the TNP grouping of stations, which is configured to place TNPs at prescribed locations on the assembly jig according to the instructions for the truss elements being manufactured; the assembly jig comprising alignment and/or positioning features configured to hold the TNPs, the BNPs, the truss chords, the upright webs, and the angled webs in alignment with each other to form one of the truss elements; and the finished lumber merge/transfer station comprising at least one robot configured to transfer finished angled webs, finished upright webs, and finished truss chords onto the assembly jig at the finished lumber jig placement station according to instructions stored in a database for the truss elements being manufactured.

According to an example embodiment, an automated system for manufacturing truss elements for use in modular construction units is provided herein, the system comprising an angled web grouping of stations configured to receive and cut dimensional lumber to form angled webs for use in assembly of the truss elements; an upright web grouping of stations configured to receive and cut dimensional lumber to form upright webs for use in assembly of the truss elements; a truss chord grouping of stations configured to receive and cut dimensional lumber to form truss chords for use in assembly of the truss elements; a finished lumber merge/transfer station, which is configured to receive the angled webs from the angled web grouping of stations, the upright webs from the upright web grouping of stations, and the truss chords from the truss chord grouping of stations, and to transfer the angled webs, the upright webs, and the truss chords onto an assembly jig at a finished lumber jig placement station; a bottom nail plate (BNP) grouping of stations configured to receive and position BNPs onto the assembly jig in designated positions for the truss elements being manufactured; a top nail plate (TNP) grouping of stations configured to receive and position TNPs onto the assembly jig in designated positions for the truss elements being manufactured; a nail plate press station configured to press the BNPs and the TNPs through a corresponding one of the truss chords and into one or more of the angled webs and/or upright webs for rigidly interlocking the angled webs, the upright webs, and the truss chords together to form a finished truss element; a conveyor configured to move the assembly jig from the finished lumber jig placement station to a TNP jig placement station of the TNP grouping of stations, which is configured to place TNPs at prescribed locations on the assembly jig according to the instructions for the truss elements being manufactured; and one or more conveyors configured to move the assembly jig from the TNP jig placement station to the nail plate press station and, after the nail plate press station has formed the finished truss element, from the nail plate press station to the finished truss unloading station; the assembly jig comprising alignment and/or positioning features configured to hold the TNPs, the BNPs, the truss chords, the upright webs, and the angled webs in alignment with each other to form one of the truss elements; and the finished lumber merge/transfer station comprising at least one robot configured to transfer finished angled webs, finished upright webs, and finished truss chords onto the assembly jig at the finished lumber jig placement station according to instructions stored in a database for the truss elements being manufactured.

According to an example embodiment, an automated system for manufacturing truss elements for use in modular construction units is provided herein, the system comprising an angled web grouping of stations configured to receive and cut dimensional lumber to form angled webs for use in assembly of the truss elements; an upright web grouping of stations configured to receive and cut dimensional lumber to form upright webs for use in assembly of the truss elements; a truss chord grouping of stations configured to receive and cut dimensional lumber to form truss chords for use in assembly of the truss elements; a finished lumber merge/transfer station, which is configured to receive the angled webs from the angled web grouping of stations, the upright webs from the upright web grouping of stations, and the truss chords from the truss chord grouping of stations, and to transfer the angled webs, the upright webs, and the truss chords onto an assembly jig at a finished lumber jig placement station; a bottom nail plate (BNP) grouping of stations configured to receive and position BNPs onto the assembly jig in designated positions for the truss elements being manufactured; a top nail plate (TNP) grouping of stations configured to receive and position TNPs onto the assembly jig in designated positions for the truss elements being manufactured; a nail plate press station configured to press the BNPs and the TNPs through a corresponding one of the truss chords and into one or more of the angled webs and/or upright webs for rigidly interlocking the angled webs, the upright webs, and the truss chords together to form a finished truss element; a conveyor configured to move the assembly jig from the finished lumber jig placement station to a TNP jig placement station of the TNP grouping of stations, which is configured to place TNPs at prescribed locations on the assembly jig according to the instructions for the truss elements being manufactured; one or more conveyors configured to move the assembly jig from the TNP jig placement station to the nail plate press station and, after the nail plate press station has formed the finished truss element, from the nail plate press station to the finished truss unloading station; and a further conveyor configured to move the assembly jig from the finished truss unloading station to a BNP jig placement station of the BNP grouping of stations, which is configured to place BNPs at prescribed locations on the assembly jig according to the instructions for manufacture of another of the truss elements; the assembly jig comprising alignment and/or positioning features configured to hold the TNPs, the BNPs, the truss chords, the upright webs, and the angled webs in alignment with each other to form one of the truss elements; and the finished lumber merge/transfer station comprising at least one robot configured to transfer finished angled webs, finished upright webs, and finished truss chords onto the assembly jig at the finished lumber jig placement station according to instructions stored in a database for the truss elements being manufactured.

According to an example embodiment, an automated system for manufacturing truss elements for use in modular construction units is provided herein, the system comprising an angled web grouping of stations configured to receive and cut dimensional lumber to form angled webs for use in assembly of the truss elements; an upright web grouping of stations configured to receive and cut dimensional lumber to form upright webs for use in assembly of the truss elements; a truss chord grouping of stations configured to receive and cut dimensional lumber to form truss chords for use in assembly of the truss elements; a finished lumber merge/transfer station, which is configured to receive the angled webs from the angled web grouping of stations, the upright webs from the upright web grouping of stations, and the truss chords from the truss chord grouping of stations, and to transfer the angled webs, the upright webs, and the truss chords onto an assembly jig at a finished lumber jig placement station; a bottom nail plate (BNP) grouping of stations configured to receive and position BNPs onto the assembly jig in designated positions for the truss elements being manufactured; a top nail plate (TN P) grouping of stations configured to receive and position TNPs onto the assembly jig in designated positions for the truss elements being manufactured; and a nail plate press station configured to press the BNPs and the TNPs through a corresponding one of the truss chords and into one or more of the angled webs and/or upright webs for rigidly interlocking the angled webs, the upright webs, and the truss chords together to form a finished truss element; the assembly jig comprising alignment and/or positioning features configured to hold the TNPs, the BNPs, the truss chords, the upright webs, and the angled webs in alignment with each other to form one of the truss elements; and the system being configured such that truss elements can be assembled on a plurality of assembly jigs simultaneously.

According to an example embodiment, a method for automated manufacture of truss elements for use in modular construction units is provided, the method comprising: receiving and cutting, at an angled web grouping of stations, dimensional lumber to form angled webs for use in assembly of the truss elements; receiving and cutting, at an upright web grouping of stations, dimensional lumber to form upright webs for use in assembly of the truss elements; receiving and cutting, at a truss chord grouping of stations, dimensional lumber to form truss chords for use in assembly of the truss elements; receiving, at a finished lumber merge/transfer station, the angled webs from the angled web grouping of stations, the upright webs from the upright web grouping of stations, and the truss chords from the truss chord grouping of stations; transferring, at the finished lumber merge/transfer station, the angled webs, the upright webs, and the truss chords onto an assembly jig at a finished lumber jig placement station; receiving and positioning, at a bottom nail plate (BNP) grouping of stations, BNPs onto the assembly jig in designated positions for the truss elements being manufactured; receiving and positioning, at a top nail plate (TNP) grouping of stations, TNPs onto the assembly jig in designated positions for the truss elements being manufactured; and pressing, at a nail plate press station, the BNPs and the TNPs through a corresponding one of the truss chords and into one or more of the angled webs and/or upright webs for rigidly interlocking the angled webs, the upright webs, and the truss chords together to form a finished truss element; the assembly jig comprising alignment and/or positioning features configured to hold the TNPs, the BNPs, the truss chords, the upright webs, and the angled webs in alignment with each other to form one of the truss elements.

According to an example embodiment, a method for automated manufacture of truss elements for use in modular construction units is provided, the method comprising: receiving and cutting, at an angled web grouping of stations, dimensional lumber to form angled webs for use in assembly of the truss elements; receiving and cutting, at an upright web grouping of stations, dimensional lumber to form upright webs for use in assembly of the truss elements; receiving and cutting, at a truss chord grouping of stations, dimensional lumber to form truss chords for use in assembly of the truss elements; receiving, at a finished lumber merge/transfer station, the angled webs from the angled web grouping of stations, the upright webs from the upright web grouping of stations, and the truss chords from the truss chord grouping of stations; transferring, at the finished lumber merge/transfer station, the angled webs, the upright webs, and the truss chords onto an assembly jig at a finished lumber jig placement station; receiving and positioning, at a bottom nail plate (BNP) grouping of stations, BNPs onto the assembly jig in designated positions for the truss elements being manufactured; receiving and positioning, at a top nail plate (TNP) grouping of stations, TNPs onto the assembly jig in designated positions for the truss elements being manufactured; pressing, at a nail plate press station, the BNPs and the TNPs through a corresponding one of the truss chords and into one or more of the angled webs and/or upright webs for rigidly interlocking the angled webs, the upright webs, and the truss chords together to form a finished truss element; storing, at a finished truss storage station, finished truss elements; and transferring, at a finished truss unloading station, finished truss elements from the assembly jig to the finished truss storage station; the assembly jig comprising alignment and/or positioning features configured to hold the TNPs, the BNPs, the truss chords, the upright webs, and the angled webs in alignment with each other to form one of the truss elements.

According to an example embodiment, a method for automated manufacture of truss elements for use in modular construction units is provided, the method comprising: receiving and cutting, at an angled web grouping of stations, dimensional lumber to form angled webs for use in assembly of the truss elements; receiving and cutting, at an upright web grouping of stations, dimensional lumber to form upright webs for use in assembly of the truss elements; receiving and cutting, at a truss chord grouping of stations, dimensional lumber to form truss chords for use in assembly of the truss elements; receiving, at a finished lumber merge/transfer station, the angled webs from the angled web grouping of stations, the upright webs from the upright web grouping of stations, and the truss chords from the truss chord grouping of stations; transferring, at the finished lumber merge/transfer station, the angled webs, the upright webs, and the truss chords onto an assembly jig at a finished lumber jig placement station; receiving and positioning, at a bottom nail plate (BNP) grouping of stations, BNPs onto the assembly jig in designated positions for the truss elements being manufactured; receiving and positioning, at a top nail plate (TNP) grouping of stations, TNPs onto the assembly jig in designated positions for the truss elements being manufactured; pressing, at a nail plate press station, the BNPs and the TNPs through a corresponding one of the truss chords and into one or more of the angled webs and/or upright webs for rigidly interlocking the angled webs, the upright webs, and the truss chords together to form a finished truss element; storing, at a finished truss storage station, finished truss elements; and transferring, at a finished truss unloading station, finished truss elements from the assembly jig to the finished truss storage station; the assembly jig comprising alignment and/or positioning features configured to hold the TNPs, the BNPs, the truss chords, the upright webs, and the angled webs in alignment with each other to form one of the truss elements; and the finished truss storage station comprising a multi-level storage rack, which has at least an induction level and one or more upper levels, and a truss elevator, the method comprising: forming, using an induction conveyor of the induction level, the finished truss elements into a stack of finished truss elements; transferring, using a transport conveyor of the induction level, the stack of finished truss elements onto the truss elevator; moving the induction conveyor vertically between an induction position, in which a plane on which the finished truss elements are supported by the induction conveyor is above a plane defined by an upper surface of the transport conveyor, and a transport position, in which the plane on which the truss elements are supported by the induction conveyor is below the plane defined by the upper surface of the transport conveyor; and moving, using the truss elevator, the stack of finished truss elements vertically between the induction level and any of the one or more upper levels.

According to an example embodiment, a method for automated manufacture of truss elements for use in modular construction units is provided, the method comprising: receiving and cutting, at an angled web grouping of stations, dimensional lumber to form angled webs for use in assembly of the truss elements; receiving and cutting, at an upright web grouping of stations, dimensional lumber to form upright webs for use in assembly of the truss elements; receiving and cutting, at a truss chord grouping of stations, dimensional lumber to form truss chords for use in assembly of the truss elements; receiving, at a finished lumber merge/transfer station, the angled webs from the angled web grouping of stations, the upright webs from the upright web grouping of stations, and the truss chords from the truss chord grouping of stations; transferring, at the finished lumber merge/transfer station, the angled webs, the upright webs, and the truss chords onto an assembly jig at a finished lumber jig placement station; receiving and positioning, at a bottom nail plate (BNP) grouping of stations, BNPs onto the assembly jig in designated positions for the truss elements being manufactured; receiving and positioning, at a top nail plate (TNP) grouping of stations, TNPs onto the assembly jig in designated positions for the truss elements being manufactured; pressing, at a nail plate press station, the BNPs and the TNPs through a corresponding one of the truss chords and into one or more of the angled webs and/or upright webs for rigidly interlocking the angled webs, the upright webs, and the truss chords together to form a finished truss element; storing, at a finished truss storage station, finished truss elements; and transferring, at a finished truss unloading station, finished truss elements from the assembly jig to the finished truss storage station; the assembly jig comprising alignment and/or positioning features configured to hold the TNPs, the BNPs, the truss chords, the upright webs, and the angled webs in alignment with each other to form one of the truss elements; and the finished truss storage station comprising a multi-level storage rack, which has at least an induction level and one or more upper levels, and a truss elevator, the method comprising: forming, using an induction conveyor of the induction level, the finished truss elements into a stack of finished truss elements; transferring, using a transport conveyor of the induction level, the stack of finished truss elements onto the truss elevator; moving the induction conveyor vertically between an induction position, in which a plane on which the finished truss elements are supported by the induction conveyor is above a plane defined by an upper surface of the transport conveyor, and a transport position, in which the plane on which the truss elements are supported by the induction conveyor is below the plane defined by the upper surface of the transport conveyor; and moving, using the truss elevator, the stack of finished truss elements vertically between the induction level and any of the one or more upper levels; the finished truss unloading station comprising an automated robot, the method comprising: lifting, using the automated robot, the finished truss element off of the assembly jig; and depositing, using the automated robot, the finished truss element onto the induction conveyor of the multi-level storage rack.

According to an example embodiment, a method for automated manufacture of truss elements for use in modular construction units is provided, the method comprising: receiving and cutting, at an angled web grouping of stations, dimensional lumber to form angled webs for use in assembly of the truss elements; receiving and cutting, at an upright web grouping of stations, dimensional lumber to form upright webs for use in assembly of the truss elements; receiving and cutting, at a truss chord grouping of stations, dimensional lumber to form truss chords for use in assembly of the truss elements; receiving, at a finished lumber merge/transfer station, the angled webs from the angled web grouping of stations, the upright webs from the upright web grouping of stations, and the truss chords from the truss chord grouping of stations; transferring, at the finished lumber merge/transfer station, the angled webs, the upright webs, and the truss chords onto an assembly jig at a finished lumber jig placement station; receiving and positioning, at a bottom nail plate (BNP) grouping of stations, BNPs onto the assembly jig in designated positions for the truss elements being manufactured; receiving and positioning, at a top nail plate (TNP) grouping of stations, TNPs onto the assembly jig in designated positions for the truss elements being manufactured; and pressing, at a nail plate press station, the BNPs and the TNPs through a corresponding one of the truss chords and into one or more of the angled webs and/or upright webs for rigidly interlocking the angled webs, the upright webs, and the truss chords together to form a finished truss element; the assembly jig comprising alignment and/or positioning features configured to hold the TNPs, the BNPs, the truss chords, the upright webs, and the angled webs in alignment with each other to form one of the truss elements; and the angled web grouping of stations comprising an angled web loading station, an angled web rough cut station, an angled web finish cut station, and an angled web delivery station.

According to an example embodiment, a method for automated manufacture of truss elements for use in modular construction units is provided, the method comprising: receiving and cutting, at an angled web grouping of stations, dimensional lumber to form angled webs for use in assembly of the truss elements; receiving and cutting, at an upright web grouping of stations, dimensional lumber to form upright webs for use in assembly of the truss elements; receiving and cutting, at a truss chord grouping of stations, dimensional lumber to form truss chords for use in assembly of the truss elements; receiving, at a finished lumber merge/transfer station, the angled webs from the angled web grouping of stations, the upright webs from the upright web grouping of stations, and the truss chords from the truss chord grouping of stations; transferring, at the finished lumber merge/transfer station, the angled webs, the upright webs, and the truss chords onto an assembly jig at a finished lumber jig placement station; receiving and positioning, at a bottom nail plate (BNP) grouping of stations, BNPs onto the assembly jig in designated positions for the truss elements being manufactured; receiving and positioning, at a top nail plate (TNP) grouping of stations, TNPs onto the assembly jig in designated positions for the truss elements being manufactured; and pressing, at a nail plate press station, the BNPs and the TNPs through a corresponding one of the truss chords and into one or more of the angled webs and/or upright webs for rigidly interlocking the angled webs, the upright webs, and the truss chords together to form a finished truss element; the assembly jig comprising alignment and/or positioning features configured to hold the TNPs, the BNPs, the truss chords, the upright webs, and the angled webs in alignment with each other to form one of the truss elements; and the angled web grouping of stations comprising an angled web loading station, an angled web rough cut station, an angled web finish cut station, and an angled web delivery station; the angled web loading station comprising a conveyor and an automated robot, the method comprising: providing, via the conveyor, the dimensional lumber for use in forming the angled webs; and transferring, using the automated robot, the dimensional lumber to the angled web rough cut station.

According to an example embodiment, a method for automated manufacture of truss elements for use in modular construction units is provided, the method comprising: receiving and cutting, at an angled web grouping of stations, dimensional lumber to form angled webs for use in assembly of the truss elements; receiving and cutting, at an upright web grouping of stations, dimensional lumber to form upright webs for use in assembly of the truss elements; receiving and cutting, at a truss chord grouping of stations, dimensional lumber to form truss chords for use in assembly of the truss elements; receiving, at a finished lumber merge/transfer station, the angled webs from the angled web grouping of stations, the upright webs from the upright web grouping of stations, and the truss chords from the truss chord grouping of stations; transferring, at the finished lumber merge/transfer station, the angled webs, the upright webs, and the truss chords onto an assembly jig at a finished lumber jig placement station; receiving and positioning, at a bottom nail plate (BNP) grouping of stations, BNPs onto the assembly jig in designated positions for the truss elements being manufactured; receiving and positioning, at a top nail plate (TNP) grouping of stations, TNPs onto the assembly jig in designated positions for the truss elements being manufactured; and pressing, at a nail plate press station, the BNPs and the TNPs through a corresponding one of the truss chords and into one or more of the angled webs and/or upright webs for rigidly interlocking the angled webs, the upright webs, and the truss chords together to form a finished truss element; the assembly jig comprising alignment and/or positioning features configured to hold the TNPs, the BNPs, the truss chords, the upright webs, and the angled webs in alignment with each other to form one of the truss elements; and the angled web grouping of stations comprising an angled web loading station, an angled web rough cut station, an angled web finish cut station, and an angled web delivery station; the angled web loading station comprising a conveyor and an automated robot, the method comprising: providing, via the conveyor, the dimensional lumber for use in forming the angled webs; and transferring, using the automated robot, the dimensional lumber to the angled web rough cut station; the angled web rough cut station comprising a saw and a feed trough, the method comprising: receiving, in the feed trough, the dimensional lumber from the robot of the angled web loading station; moving, via the feed trough, the dimensional lumber relative to the saw; cutting, using the saw, the dimensional lumber into angled web segments; and controlling, via a controller, a movement of the dimensional lumber along the feed trough and an actuation of the saw to produce the angled web segments having a length specified in instructions stored in a database associated with the controller for the truss elements being manufactured.

According to an example embodiment, a method for automated manufacture of truss elements for use in modular construction units is provided, the method comprising: receiving and cutting, at an angled web grouping of stations, dimensional lumber to form angled webs for use in assembly of the truss elements; receiving and cutting, at an upright web grouping of stations, dimensional lumber to form upright webs for use in assembly of the truss elements; receiving and cutting, at a truss chord grouping of stations, dimensional lumber to form truss chords for use in assembly of the truss elements; receiving, at a finished lumber merge/transfer station, the angled webs from the angled web grouping of stations, the upright webs from the upright web grouping of stations, and the truss chords from the truss chord grouping of stations; transferring, at the finished lumber merge/transfer station, the angled webs, the upright webs, and the truss chords onto an assembly jig at a finished lumber jig placement station; receiving and positioning, at a bottom nail plate (BNP) grouping of stations, BNPs onto the assembly jig in designated positions for the truss elements being manufactured; receiving and positioning, at a top nail plate (TNP) grouping of stations, TNPs onto the assembly jig in designated positions for the truss elements being manufactured; and pressing, at a nail plate press station, the BNPs and the TNPs through a corresponding one of the truss chords and into one or more of the angled webs and/or upright webs for rigidly interlocking the angled webs, the upright webs, and the truss chords together to form a finished truss element; the assembly jig comprising alignment and/or positioning features configured to hold the TNPs, the BNPs, the truss chords, the upright webs, and the angled webs in alignment with each other to form one of the truss elements; and the angled web grouping of stations comprising an angled web loading station, an angled web rough cut station, an angled web finish cut station, and an angled web delivery station; the angled web loading station comprising a conveyor and an automated robot, the method comprising: providing, via the conveyor, the dimensional lumber for use in forming the angled webs; and transferring, using the automated robot, the dimensional lumber to the angled web rough cut station; the angled web rough cut station comprising a saw and a feed trough, the method comprising: receiving, in the feed trough, the dimensional lumber from the robot of the angled web loading station; moving, via the feed trough, the dimensional lumber relative to the saw; cutting, using the saw, the dimensional lumber into angled web segments; and controlling, via a controller, a movement of the dimensional lumber along the feed trough and an actuation of the saw to produce the angled web segments having a length specified in instructions stored in a database associated with the controller for the truss elements being manufactured; the angled web finish cut station comprising a cutting machine and a conveyor, the method comprising: forming, via the cutting machine, an end profile on opposing ends of each of the angled web segments to produce a finished angled web; transporting, via the conveyor, the angled web segment into the cutting machine; and transporting, via the conveyor, the finished angled web to a delivery trough of the angled web delivery station.

According to an example embodiment, a method for automated manufacture of truss elements for use in modular construction units is provided, the method comprising: receiving and cutting, at an angled web grouping of stations, dimensional lumber to form angled webs for use in assembly of the truss elements; receiving and cutting, at an upright web grouping of stations, dimensional lumber to form upright webs for use in assembly of the truss elements; receiving and cutting, at a truss chord grouping of stations, dimensional lumber to form truss chords for use in assembly of the truss elements; receiving, at a finished lumber merge/transfer station, the angled webs from the angled web grouping of stations, the upright webs from the upright web grouping of stations, and the truss chords from the truss chord grouping of stations; transferring, at the finished lumber merge/transfer station, the angled webs, the upright webs, and the truss chords onto an assembly jig at a finished lumber jig placement station; receiving and positioning, at a bottom nail plate (BNP) grouping of stations, BNPs onto the assembly jig in designated positions for the truss elements being manufactured; receiving and positioning, at a top nail plate (TNP) grouping of stations, TNPs onto the assembly jig in designated positions for the truss elements being manufactured; and pressing, at a nail plate press station, the BNPs and the TNPs through a corresponding one of the truss chords and into one or more of the angled webs and/or upright webs for rigidly interlocking the angled webs, the upright webs, and the truss chords together to form a finished truss element; the assembly jig comprising alignment and/or positioning features configured to hold the TNPs, the BNPs, the truss chords, the upright webs, and the angled webs in alignment with each other to form one of the truss elements; and the angled web grouping of stations comprising an angled web loading station, an angled web rough cut station, an angled web finish cut station, and an angled web delivery station; the angled web loading station comprising a conveyor and an automated robot, the method comprising: providing, via the conveyor, the dimensional lumber for use in forming the angled webs; and transferring, using the automated robot, the dimensional lumber to the angled web rough cut station; the angled web rough cut station comprising a saw and a feed trough, the method comprising: receiving, in the feed trough, the dimensional lumber from the robot of the angled web loading station; moving, via the feed trough, the dimensional lumber relative to the saw; cutting, using the saw, the dimensional lumber into angled web segments; and controlling, via a controller, a movement of the dimensional lumber along the feed trough and an actuation of the saw to produce the angled web segments having a length specified in instructions stored in a database associated with the controller for the truss elements being manufactured; the angled web finish cut station comprising a cutting machine and a conveyor, the method comprising: forming, via the cutting machine, an end profile on opposing ends of each of the angled web segments to produce a finished angled web; transporting, via the conveyor, the angled web segment into the cutting machine; and transporting, via the conveyor, the finished angled web to a delivery trough of the angled web delivery station; the method comprising transporting, via the delivery trough of the angled web delivery station, the finished angled webs to the finished lumber merge/transfer station.

According to an example embodiment, a method for automated manufacture of truss elements for use in modular construction units is provided, the method comprising: receiving and cutting, at an angled web grouping of stations, dimensional lumber to form angled webs for use in assembly of the truss elements; receiving and cutting, at an upright web grouping of stations, dimensional lumber to form upright webs for use in assembly of the truss elements; receiving and cutting, at a truss chord grouping of stations, dimensional lumber to form truss chords for use in assembly of the truss elements; receiving, at a finished lumber merge/transfer station, the angled webs from the angled web grouping of stations, the upright webs from the upright web grouping of stations, and the truss chords from the truss chord grouping of stations; transferring, at the finished lumber merge/transfer station, the angled webs, the upright webs, and the truss chords onto an assembly jig at a finished lumber jig placement station; receiving and positioning, at a bottom nail plate (BNP) grouping of stations, BNPs onto the assembly jig in designated positions for the truss elements being manufactured; receiving and positioning, at a top nail plate (TNP) grouping of stations, TNPs onto the assembly jig in designated positions for the truss elements being manufactured; and pressing, at a nail plate press station, the BNPs and the TNPs through a corresponding one of the truss chords and into one or more of the angled webs and/or upright webs for rigidly interlocking the angled webs, the upright webs, and the truss chords together to form a finished truss element; the assembly jig comprising alignment and/or positioning features configured to hold the TNPs, the BNPs, the truss chords, the upright webs, and the angled webs in alignment with each other to form one of the truss elements; and the upright web grouping of stations comprising an upright web loading station, an upright web cut station, and an upright web delivery station.

According to an example embodiment, a method for automated manufacture of truss elements for use in modular construction units is provided, the method comprising: receiving and cutting, at an angled web grouping of stations, dimensional lumber to form angled webs for use in assembly of the truss elements; receiving and cutting, at an upright web grouping of stations, dimensional lumber to form upright webs for use in assembly of the truss elements; receiving and cutting, at a truss chord grouping of stations, dimensional lumber to form truss chords for use in assembly of the truss elements; receiving, at a finished lumber merge/transfer station, the angled webs from the angled web grouping of stations, the upright webs from the upright web grouping of stations, and the truss chords from the truss chord grouping of stations; transferring, at the finished lumber merge/transfer station, the angled webs, the upright webs, and the truss chords onto an assembly jig at a finished lumber jig placement station; receiving and positioning, at a bottom nail plate (BNP) grouping of stations, BNPs onto the assembly jig in designated positions for the truss elements being manufactured; receiving and positioning, at a top nail plate (TNP) grouping of stations, TNPs onto the assembly jig in designated positions for the truss elements being manufactured; and pressing, at a nail plate press station, the BNPs and the TNPs through a corresponding one of the truss chords and into one or more of the angled webs and/or upright webs for rigidly interlocking the angled webs, the upright webs, and the truss chords together to form a finished truss element; the assembly jig comprising alignment and/or positioning features configured to hold the TNPs, the BNPs, the truss chords, the upright webs, and the angled webs in alignment with each other to form one of the truss elements; the upright web grouping of stations comprising an upright web loading station, an upright web cut station, and an upright web delivery station; and the upright web loading station comprising a conveyor and an automated robot, the method comprising: providing, via the conveyor, the dimensional lumber for use in forming the upright webs; and transferring, via the automated robot, the dimensional lumber to the upright web cut station.

According to an example embodiment, a method for automated manufacture of truss elements for use in modular construction units is provided, the method comprising: receiving and cutting, at an angled web grouping of stations, dimensional lumber to form angled webs for use in assembly of the truss elements; receiving and cutting, at an upright web grouping of stations, dimensional lumber to form upright webs for use in assembly of the truss elements; receiving and cutting, at a truss chord grouping of stations, dimensional lumber to form truss chords for use in assembly of the truss elements; receiving, at a finished lumber merge/transfer station, the angled webs from the angled web grouping of stations, the upright webs from the upright web grouping of stations, and the truss chords from the truss chord grouping of stations; transferring, at the finished lumber merge/transfer station, the angled webs, the upright webs, and the truss chords onto an assembly jig at a finished lumber jig placement station; receiving and positioning, at a bottom nail plate (BNP) grouping of stations, BNPs onto the assembly jig in designated positions for the truss elements being manufactured; receiving and positioning, at a top nail plate (TNP) grouping of stations, TNPs onto the assembly jig in designated positions for the truss elements being manufactured; and pressing, at a nail plate press station, the BNPs and the TNPs through a corresponding one of the truss chords and into one or more of the angled webs and/or upright webs for rigidly interlocking the angled webs, the upright webs, and the truss chords together to form a finished truss element; the assembly jig comprising alignment and/or positioning features configured to hold the TNPs, the BNPs, the truss chords, the upright webs, and the angled webs in alignment with each other to form one of the truss elements; the upright web grouping of stations comprising an upright web loading station, an upright web cut station, and an upright web delivery station; the upright web loading station comprising a conveyor and an automated robot, the method comprising: providing, via the conveyor, the dimensional lumber for use in forming the upright webs; and transferring, via the automated robot, the dimensional lumber to the upright web cut station; the upright web cut station comprising a saw and a feed trough, the method comprising: receiving, in the feed trough, the dimensional lumber from the robot of the upright web loading station; moving, via the feed trough, the dimensional lumber relative to the saw; the method comprising: cutting, using the saw, the dimensional lumber into finished upright webs; controlling, via a controller, a movement of the dimensional lumber along the feed trough and an actuation of the saw to produce the finished upright webs having a length specified in instructions stored in a database associated with the controller for the truss elements being manufactured; and transferring, after cutting of the dimensional lumber by the saw, the finished upright webs to a delivery trough of the upright web delivery station.

According to an example embodiment, a method for automated manufacture of truss elements for use in modular construction units is provided, the method comprising: receiving and cutting, at an angled web grouping of stations, dimensional lumber to form angled webs for use in assembly of the truss elements; receiving and cutting, at an upright web grouping of stations, dimensional lumber to form upright webs for use in assembly of the truss elements; receiving and cutting, at a truss chord grouping of stations, dimensional lumber to form truss chords for use in assembly of the truss elements; receiving, at a finished lumber merge/transfer station, the angled webs from the angled web grouping of stations, the upright webs from the upright web grouping of stations, and the truss chords from the truss chord grouping of stations; transferring, at the finished lumber merge/transfer station, the angled webs, the upright webs, and the truss chords onto an assembly jig at a finished lumber jig placement station; receiving and positioning, at a bottom nail plate (BNP) grouping of stations, BNPs onto the assembly jig in designated positions for the truss elements being manufactured; receiving and positioning, at a top nail plate (TNP) grouping of stations, TNPs onto the assembly jig in designated positions for the truss elements being manufactured; and pressing, at a nail plate press station, the BNPs and the TNPs through a corresponding one of the truss chords and into one or more of the angled webs and/or upright webs for rigidly interlocking the angled webs, the upright webs, and the truss chords together to form a finished truss element; the assembly jig comprising alignment and/or positioning features configured to hold the TNPs, the BNPs, the truss chords, the upright webs, and the angled webs in alignment with each other to form one of the truss elements; the upright web grouping of stations comprising an upright web loading station, an upright web cut station, and an upright web delivery station; the upright web loading station comprising a conveyor and an automated robot, the method comprising: providing, via the conveyor, the dimensional lumber for use in forming the upright webs; and transferring, via the automated robot, the dimensional lumber to the upright web cut station; the upright web cut station comprising a saw and a feed trough, the method comprising: receiving, in the feed trough, the dimensional lumber from the robot of the upright web loading station; moving, via the feed trough, the dimensional lumber relative to the saw; the method comprising: cutting, using the saw, the dimensional lumber into finished upright webs; controlling, via a controller, a movement of the dimensional lumber along the feed trough and an actuation of the saw to produce the finished upright webs having a length specified in instructions stored in a database associated with the controller for the truss elements being manufactured; transferring, after cutting of the dimensional lumber by the saw, the finished upright webs to a delivery trough of the upright web delivery station; and transporting, via the delivery trough of the upright web delivery station, the finished upright webs to the finished lumber merge/transfer station.

According to an example embodiment, a method for automated manufacture of truss elements for use in modular construction units is provided, the method comprising: receiving and cutting, at an angled web grouping of stations, dimensional lumber to form angled webs for use in assembly of the truss elements; receiving and cutting, at an upright web grouping of stations, dimensional lumber to form upright webs for use in assembly of the truss elements; receiving and cutting, at a truss chord grouping of stations, dimensional lumber to form truss chords for use in assembly of the truss elements; receiving, at a finished lumber merge/transfer station, the angled webs from the angled web grouping of stations, the upright webs from the upright web grouping of stations, and the truss chords from the truss chord grouping of stations; transferring, at the finished lumber merge/transfer station, the angled webs, the upright webs, and the truss chords onto an assembly jig at a finished lumber jig placement station; receiving and positioning, at a bottom nail plate (BNP) grouping of stations, BNPs onto the assembly jig in designated positions for the truss elements being manufactured; receiving and positioning, at a top nail plate (TNP) grouping of stations, TNPs onto the assembly jig in designated positions for the truss elements being manufactured; and pressing, at a nail plate press station, the BNPs and the TNPs through a corresponding one of the truss chords and into one or more of the angled webs and/or upright webs for rigidly interlocking the angled webs, the upright webs, and the truss chords together to form a finished truss element; the assembly jig comprising alignment and/or positioning features configured to hold the TNPs, the BNPs, the truss chords, the upright webs, and the angled webs in alignment with each other to form one of the truss elements; and the truss chord grouping of stations comprising a truss chord loading station, a truss chord cut station, and a truss chord delivery station.

According to an example embodiment, a method for automated manufacture of truss elements for use in modular construction units is provided, the method comprising: receiving and cutting, at an angled web grouping of stations, dimensional lumber to form angled webs for use in assembly of the truss elements; receiving and cutting, at an upright web grouping of stations, dimensional lumber to form upright webs for use in assembly of the truss elements; receiving and cutting, at a truss chord grouping of stations, dimensional lumber to form truss chords for use in assembly of the truss elements; receiving, at a finished lumber merge/transfer station, the angled webs from the angled web grouping of stations, the upright webs from the upright web grouping of stations, and the truss chords from the truss chord grouping of stations; transferring, at the finished lumber merge/transfer station, the angled webs, the upright webs, and the truss chords onto an assembly jig at a finished lumber jig placement station; receiving and positioning, at a bottom nail plate (BNP) grouping of stations, BNPs onto the assembly jig in designated positions for the truss elements being manufactured; receiving and positioning, at a top nail plate (TNP) grouping of stations, TNPs onto the assembly jig in designated positions for the truss elements being manufactured; and pressing, at a nail plate press station, the BNPs and the TNPs through a corresponding one of the truss chords and into one or more of the angled webs and/or upright webs for rigidly interlocking the angled webs, the upright webs, and the truss chords together to form a finished truss element; the assembly jig comprising alignment and/or positioning features configured to hold the TNPs, the BNPs, the truss chords, the upright webs, and the angled webs in alignment with each other to form one of the truss elements; the truss chord grouping of stations comprising a truss chord loading station, a truss chord cut station, and a truss chord delivery station; and the truss chord loading station comprising a conveyor and an automated robot, the method comprising: providing, via the conveyor, the dimensional lumber for use in forming the truss chords; and transferring, using the automated robot, the dimensional lumber to the truss chord cut station.

According to an example embodiment, a method for automated manufacture of truss elements for use in modular construction units is provided, the method comprising: receiving and cutting, at an angled web grouping of stations, dimensional lumber to form angled webs for use in assembly of the truss elements; receiving and cutting, at an upright web grouping of stations, dimensional lumber to form upright webs for use in assembly of the truss elements; receiving and cutting, at a truss chord grouping of stations, dimensional lumber to form truss chords for use in assembly of the truss elements; receiving, at a finished lumber merge/transfer station, the angled webs from the angled web grouping of stations, the upright webs from the upright web grouping of stations, and the truss chords from the truss chord grouping of stations; transferring, at the finished lumber merge/transfer station, the angled webs, the upright webs, and the truss chords onto an assembly jig at a finished lumber jig placement station; receiving and positioning, at a bottom nail plate (BNP) grouping of stations, BNPs onto the assembly jig in designated positions for the truss elements being manufactured; receiving and positioning, at a top nail plate (TNP) grouping of stations, TNPs onto the assembly jig in designated positions for the truss elements being manufactured; and pressing, at a nail plate press station, the BNPs and the TNPs through a corresponding one of the truss chords and into one or more of the angled webs and/or upright webs for rigidly interlocking the angled webs, the upright webs, and the truss chords together to form a finished truss element; the assembly jig comprising alignment and/or positioning features configured to hold the TNPs, the BNPs, the truss chords, the upright webs, and the angled webs in alignment with each other to form one of the truss elements; the truss chord grouping of stations comprising a truss chord loading station, a truss chord cut station, and a truss chord delivery station; the truss chord loading station comprising a conveyor and an automated robot, the method comprising: providing, via the conveyor, the dimensional lumber for use in forming the truss chords; and transferring, using the automated robot, the dimensional lumber to the truss chord cut station; the truss chord cut station comprising a saw and a feed trough, the method comprising: receiving, in the feed trough, the dimensional lumber from the robot of the truss chord loading station; moving, via the feed trough, the dimensional lumber relative to the saw; cutting, using the saw, the dimensional lumber into finished truss chords; controlling, using a controller, a movement of the dimensional lumber along the feed trough and an actuation of the saw to produce the finished truss chords having a length specified in instructions stored in a database associated with the controller for the truss elements being manufactured; and transferring, after cutting of the dimensional lumber by the saw, the finished truss chords to a delivery trough of the truss chord delivery station.

According to an example embodiment, a method for automated manufacture of truss elements for use in modular construction units is provided, the method comprising: receiving and cutting, at an angled web grouping of stations, dimensional lumber to form angled webs for use in assembly of the truss elements; receiving and cutting, at an upright web grouping of stations, dimensional lumber to form upright webs for use in assembly of the truss elements; receiving and cutting, at a truss chord grouping of stations, dimensional lumber to form truss chords for use in assembly of the truss elements; receiving, at a finished lumber merge/transfer station, the angled webs from the angled web grouping of stations, the upright webs from the upright web grouping of stations, and the truss chords from the truss chord grouping of stations; transferring, at the finished lumber merge/transfer station, the angled webs, the upright webs, and the truss chords onto an assembly jig at a finished lumber jig placement station; receiving and positioning, at a bottom nail plate (BNP) grouping of stations, BNPs onto the assembly jig in designated positions for the truss elements being manufactured; receiving and positioning, at a top nail plate (TNP) grouping of stations, TNPs onto the assembly jig in designated positions for the truss elements being manufactured; and pressing, at a nail plate press station, the BNPs and the TNPs through a corresponding one of the truss chords and into one or more of the angled webs and/or upright webs for rigidly interlocking the angled webs, the upright webs, and the truss chords together to form a finished truss element; the assembly jig comprising alignment and/or positioning features configured to hold the TNPs, the BNPs, the truss chords, the upright webs, and the angled webs in alignment with each other to form one of the truss elements; the truss chord grouping of stations comprising a truss chord loading station, a truss chord cut station, and a truss chord delivery station; the truss chord loading station comprising a conveyor and an automated robot, the method comprising: providing, via the conveyor, the dimensional lumber for use in forming the truss chords; and transferring, using the automated robot, the dimensional lumber to the truss chord cut station; the truss chord cut station comprising a saw and a feed trough, the method comprising: receiving, in the feed trough, the dimensional lumber from the robot of the truss chord loading station; moving, via the feed trough, the dimensional lumber relative to the saw; cutting, using the saw, the dimensional lumber into finished truss chords; controlling, using a controller, a movement of the dimensional lumber along the feed trough and an actuation of the saw to produce the finished truss chords having a length specified in instructions stored in a database associated with the controller for the truss elements being manufactured; transferring, after cutting of the dimensional lumber by the saw, the finished truss chords to a delivery trough of the truss chord delivery station; and transporting, via the delivery trough of the truss chord delivery station, the finished truss chords to the finished lumber merge/transfer station.

According to an example embodiment, a method for automated manufacture of truss elements for use in modular construction units is provided, the method comprising: receiving and cutting, at an angled web grouping of stations, dimensional lumber to form angled webs for use in assembly of the truss elements; receiving and cutting, at an upright web grouping of stations, dimensional lumber to form upright webs for use in assembly of the truss elements; receiving and cutting, at a truss chord grouping of stations, dimensional lumber to form truss chords for use in assembly of the truss elements; receiving, at a finished lumber merge/transfer station, the angled webs from the angled web grouping of stations, the upright webs from the upright web grouping of stations, and the truss chords from the truss chord grouping of stations; transferring, at the finished lumber merge/transfer station, the angled webs, the upright webs, and the truss chords onto an assembly jig at a finished lumber jig placement station; receiving and positioning, at a bottom nail plate (BNP) grouping of stations, BNPs onto the assembly jig in designated positions for the truss elements being manufactured; receiving and positioning, at a top nail plate (TNP) grouping of stations, TNPs onto the assembly jig in designated positions for the truss elements being manufactured; and pressing, at a nail plate press station, the BNPs and the TNPs through a corresponding one of the truss chords and into one or more of the angled webs and/or upright webs for rigidly interlocking the angled webs, the upright webs, and the truss chords together to form a finished truss element; the assembly jig comprising alignment and/or positioning features configured to hold the TNPs, the BNPs, the truss chords, the upright webs, and the angled webs in alignment with each other to form one of the truss elements; and the finished lumber merge/transfer station comprising at least one robot, the method comprising transferring, using the at least one robot, finished angled webs, finished upright webs, and finished truss chords onto the assembly jig at the finished lumber jig placement station according to instructions stored in a database for the truss elements being manufactured.

According to an example embodiment, a method for automated manufacture of truss elements for use in modular construction units is provided, the method comprising: receiving and cutting, at an angled web grouping of stations, dimensional lumber to form angled webs for use in assembly of the truss elements; receiving and cutting, at an upright web grouping of stations, dimensional lumber to form upright webs for use in assembly of the truss elements; receiving and cutting, at a truss chord grouping of stations, dimensional lumber to form truss chords for use in assembly of the truss elements; receiving, at a finished lumber merge/transfer station, the angled webs from the angled web grouping of stations, the upright webs from the upright web grouping of stations, and the truss chords from the truss chord grouping of stations; transferring, at the finished lumber merge/transfer station, the angled webs, the upright webs, and the truss chords onto an assembly jig at a finished lumber jig placement station; receiving and positioning, at a bottom nail plate (BNP) grouping of stations, BNPs onto the assembly jig in designated positions for the truss elements being manufactured; receiving and positioning, at a top nail plate (TNP) grouping of stations, TNPs onto the assembly jig in designated positions for the truss elements being manufactured; and pressing, at a nail plate press station, the BNPs and the TNPs through a corresponding one of the truss chords and into one or more of the angled webs and/or upright webs for rigidly interlocking the angled webs, the upright webs, and the truss chords together to form a finished truss element; the assembly jig comprising alignment and/or positioning features configured to hold the TNPs, the BNPs, the truss chords, the upright webs, and the angled webs in alignment with each other to form one of the truss elements; and the finished lumber merge/transfer station comprising at least one robot, the method comprising transferring, using the at least one robot, finished angled webs, finished upright webs, and finished truss chords onto the assembly jig at the finished lumber jig placement station according to instructions stored in a database for the truss elements being manufactured; and comprising placing, using the BNP grouping of stations, BNPs at prescribed locations on the assembly jig according to the instructions for the truss elements being manufactured before the finished angled webs, finished upright webs, and finished truss chords are transferred onto the assembly jig at the finished lumber jog placement station.

According to an example embodiment, a method for automated manufacture of truss elements for use in modular construction units is provided, the method comprising: receiving and cutting, at an angled web grouping of stations, dimensional lumber to form angled webs for use in assembly of the truss elements; receiving and cutting, at an upright web grouping of stations, dimensional lumber to form upright webs for use in assembly of the truss elements; receiving and cutting, at a truss chord grouping of stations, dimensional lumber to form truss chords for use in assembly of the truss elements; receiving, at a finished lumber merge/transfer station, the angled webs from the angled web grouping of stations, the upright webs from the upright web grouping of stations, and the truss chords from the truss chord grouping of stations; transferring, at the finished lumber merge/transfer station, the angled webs, the upright webs, and the truss chords onto an assembly jig at a finished lumber jig placement station; receiving and positioning, at a bottom nail plate (BNP) grouping of stations, BNPs onto the assembly jig in designated positions for the truss elements being manufactured; receiving and positioning, at a top nail plate (TNP) grouping of stations, TNPs onto the assembly jig in designated positions for the truss elements being manufactured; and pressing, at a nail plate press station, the BNPs and the TNPs through a corresponding one of the truss chords and into one or more of the angled webs and/or upright webs for rigidly interlocking the angled webs, the upright webs, and the truss chords together to form a finished truss element; the assembly jig comprising alignment and/or positioning features configured to hold the TNPs, the BNPs, the truss chords, the upright webs, and the angled webs in alignment with each other to form one of the truss elements; and the finished lumber merge/transfer station comprising at least one robot, the method comprising transferring, using the at least one robot, finished angled webs, finished upright webs, and finished truss chords onto the assembly jig at the finished lumber jig placement station according to instructions stored in a database for the truss elements being manufactured; moving, using a conveyor, the assembly jig from the finished lumber jig placement station to a TNP jig placement station of the TNP grouping of stations; and placing, using the TNP jig placement station, TNPs at prescribed locations on the assembly jig according to the instructions for the truss elements being manufactured.

According to an example embodiment, a method for automated manufacture of truss elements for use in modular construction units is provided, the method comprising: receiving and cutting, at an angled web grouping of stations, dimensional lumber to form angled webs for use in assembly of the truss elements; receiving and cutting, at an upright web grouping of stations, dimensional lumber to form upright webs for use in assembly of the truss elements; receiving and cutting, at a truss chord grouping of stations, dimensional lumber to form truss chords for use in assembly of the truss elements; receiving, at a finished lumber merge/transfer station, the angled webs from the angled web grouping of stations, the upright webs from the upright web grouping of stations, and the truss chords from the truss chord grouping of stations; transferring, at the finished lumber merge/transfer station, the angled webs, the upright webs, and the truss chords onto an assembly jig at a finished lumber jig placement station; receiving and positioning, at a bottom nail plate (BNP) grouping of stations, BNPs onto the assembly jig in designated positions for the truss elements being manufactured; receiving and positioning, at a top nail plate (TNP) grouping of stations, TNPs onto the assembly jig in designated positions for the truss elements being manufactured; and pressing, at a nail plate press station, the BNPs and the TNPs through a corresponding one of the truss chords and into one or more of the angled webs and/or upright webs for rigidly interlocking the angled webs, the upright webs, and the truss chords together to form a finished truss element; the assembly jig comprising alignment and/or positioning features configured to hold the TNPs, the BNPs, the truss chords, the upright webs, and the angled webs in alignment with each other to form one of the truss elements; and the finished lumber merge/transfer station comprising at least one robot, the method comprising transferring, using the at least one robot, finished angled webs, finished upright webs, and finished truss chords onto the assembly jig at the finished lumber jig placement station according to instructions stored in a database for the truss elements being manufactured; moving, using a conveyor, the assembly jig from the finished lumber jig placement station to a TNP jig placement station of the TNP grouping of stations; placing, using the TNP jig placement station, TNPs at prescribed locations on the assembly jig according to the instructions for the truss elements being manufactured; and moving, using one or more conveyors, the assembly jig from the TNP jig placement station to the nail plate press station and, after the nail plate press station has formed the finished truss element, from the nail plate press station to the finished truss unloading station.

According to an example embodiment, a method for automated manufacture of truss elements for use in modular construction units is provided, the method comprising: receiving and cutting, at an angled web grouping of stations, dimensional lumber to form angled webs for use in assembly of the truss elements; receiving and cutting, at an upright web grouping of stations, dimensional lumber to form upright webs for use in assembly of the truss elements; receiving and cutting, at a truss chord grouping of stations, dimensional lumber to form truss chords for use in assembly of the truss elements; receiving, at a finished lumber merge/transfer station, the angled webs from the angled web grouping of stations, the upright webs from the upright web grouping of stations, and the truss chords from the truss chord grouping of stations; transferring, at the finished lumber merge/transfer station, the angled webs, the upright webs, and the truss chords onto an assembly jig at a finished lumber jig placement station; receiving and positioning, at a bottom nail plate (BNP) grouping of stations, BNPs onto the assembly jig in designated positions for the truss elements being manufactured; receiving and positioning, at a top nail plate (TNP) grouping of stations, TNPs onto the assembly jig in designated positions for the truss elements being manufactured; and pressing, at a nail plate press station, the BNPs and the TNPs through a corresponding one of the truss chords and into one or more of the angled webs and/or upright webs for rigidly interlocking the angled webs, the upright webs, and the truss chords together to form a finished truss element; the assembly jig comprising alignment and/or positioning features configured to hold the TNPs, the BNPs, the truss chords, the upright webs, and the angled webs in alignment with each other to form one of the truss elements; and the finished lumber merge/transfer station comprising at least one robot, the method comprising transferring, using the at least one robot, finished angled webs, finished upright webs, and finished truss chords onto the assembly jig at the finished lumber jig placement station according to instructions stored in a database for the truss elements being manufactured; moving, using a conveyor, the assembly jig from the finished lumber jig placement station to a TNP jig placement station of the TNP grouping of stations; placing, using the TNP jig placement station, TNPs at prescribed locations on the assembly jig according to the instructions for the truss elements being manufactured; moving, using one or more conveyors, the assembly jig from the TNP jig placement station to the nail plate press station and, after the nail plate press station has formed the finished truss element, from the nail plate press station to the finished truss unloading station; moving, using a further conveyor, the assembly jig from the finished truss unloading station to a BNP jig placement station of the BNP grouping of stations; and placing, using the BNP jig placement station, BNPs at prescribed locations on the assembly jig according to the instructions for manufacture of another of the truss elements.

According to an example embodiment, a method for automated manufacture of truss elements for use in modular construction units is provided, the method comprising: receiving and cutting, at an angled web grouping of stations, dimensional lumber to form angled webs for use in assembly of the truss elements; receiving and cutting, at an upright web grouping of stations, dimensional lumber to form upright webs for use in assembly of the truss elements; receiving and cutting, at a truss chord grouping of stations, dimensional lumber to form truss chords for use in assembly of the truss elements; receiving, at a finished lumber merge/transfer station, the angled webs from the angled web grouping of stations, the upright webs from the upright web grouping of stations, and the truss chords from the truss chord grouping of stations; transferring, at the finished lumber merge/transfer station, the angled webs, the upright webs, and the truss chords onto an assembly jig at a finished lumber jig placement station; receiving and positioning, at a bottom nail plate (BNP) grouping of stations, BNPs onto the assembly jig in designated positions for the truss elements being manufactured; receiving and positioning, at a top nail plate (TNP) grouping of stations, TNPs onto the assembly jig in designated positions for the truss elements being manufactured; pressing, at a nail plate press station, the BNPs and the TNPs through a corresponding one of the truss chords and into one or more of the angled webs and/or upright webs for rigidly interlocking the angled webs, the upright webs, and the truss chords together to form a finished truss element; and using a plurality of assembly jigs to simultaneously manufacture a plurality of truss elements in a sequential manner; the plurality of assembly jigs each comprising alignment and/or positioning features configured to hold the TNPs, the BNPs, the truss chords, the upright webs, and the angled webs in alignment with each other to form one of the truss elements.

BRIEF DESCRIPTION OF THE DRAWINGS

The presently disclosed subject matter can be better understood by referring to the following figures. The components in the figures are not necessarily to scale, emphasis instead being placed upon illustrating the principles of the presently disclosed subject matter (often schematically). In the figures, like reference numerals designate corresponding parts throughout the different views. A further understanding of the presently disclosed subject matter can be obtained by reference to an embodiment set forth in the illustrations of the accompanying drawings. Although the illustrated embodiment is merely exemplary of systems for carrying out the presently disclosed subject matter, both the organization and method of operation of the presently disclosed subject matter, in general, together with further objectives and advantages thereof, can be more easily understood by reference to the drawings and the following description. The drawings are not intended to limit the scope of this presently disclosed subject matter, which is set forth with particularity in the claims as appended or as subsequently amended, but merely to clarify and exemplify the presently disclosed subject matter.

Like numbers refer to like elements throughout. In the figures, the thickness of certain lines, layers, components, elements or features can be exaggerated for clarity. Where used, broken lines illustrate optional features or operations unless specified otherwise.

For a more complete understanding of the presently disclosed subject matter, reference is now made to the drawings submitted herewith.

Figure 1:
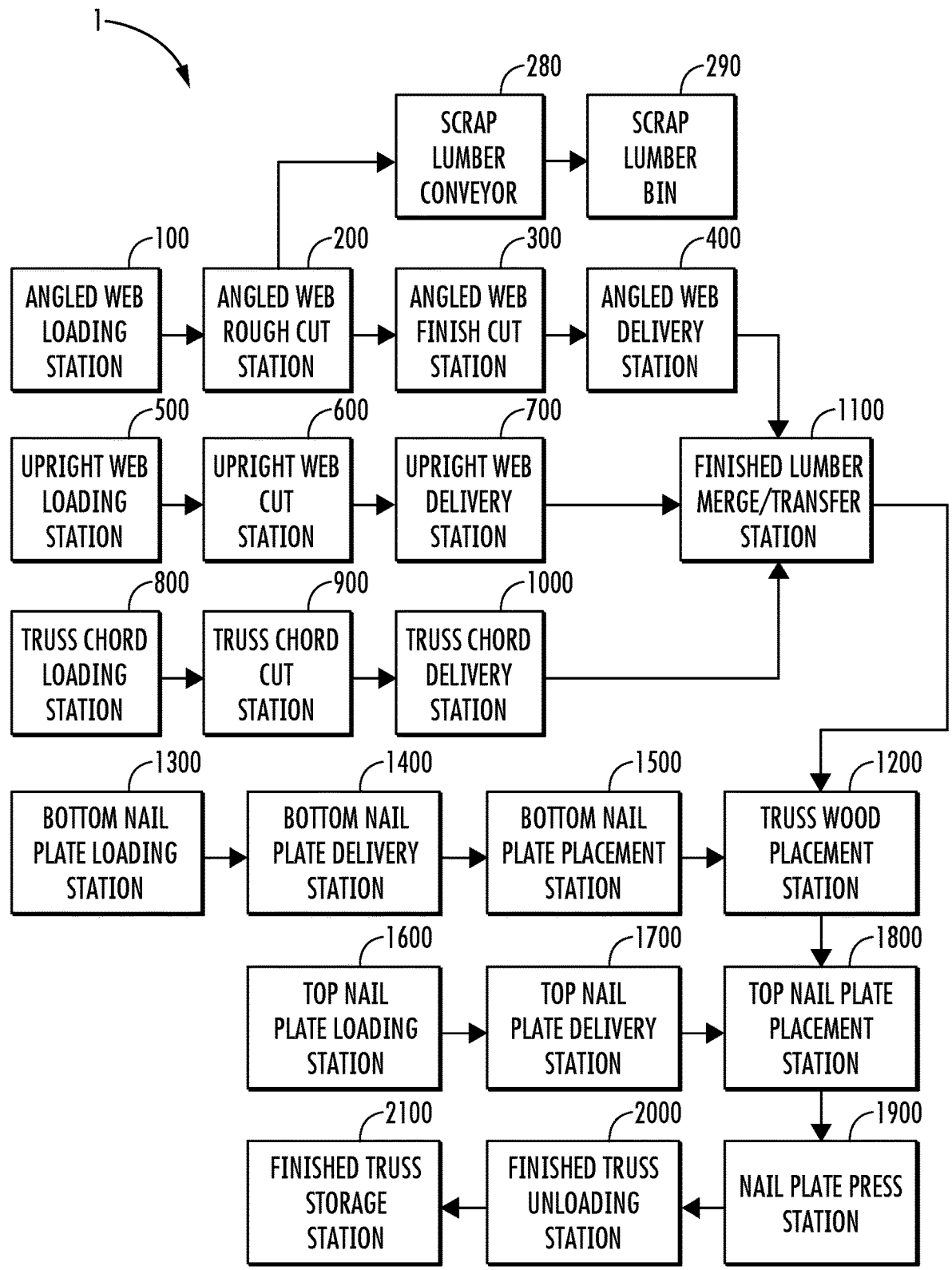

FIG. 1 is a schematic illustration of an example embodiment of a system for constructing geometric truss elements for use in assembly of a modular building unit.

Figure 2:
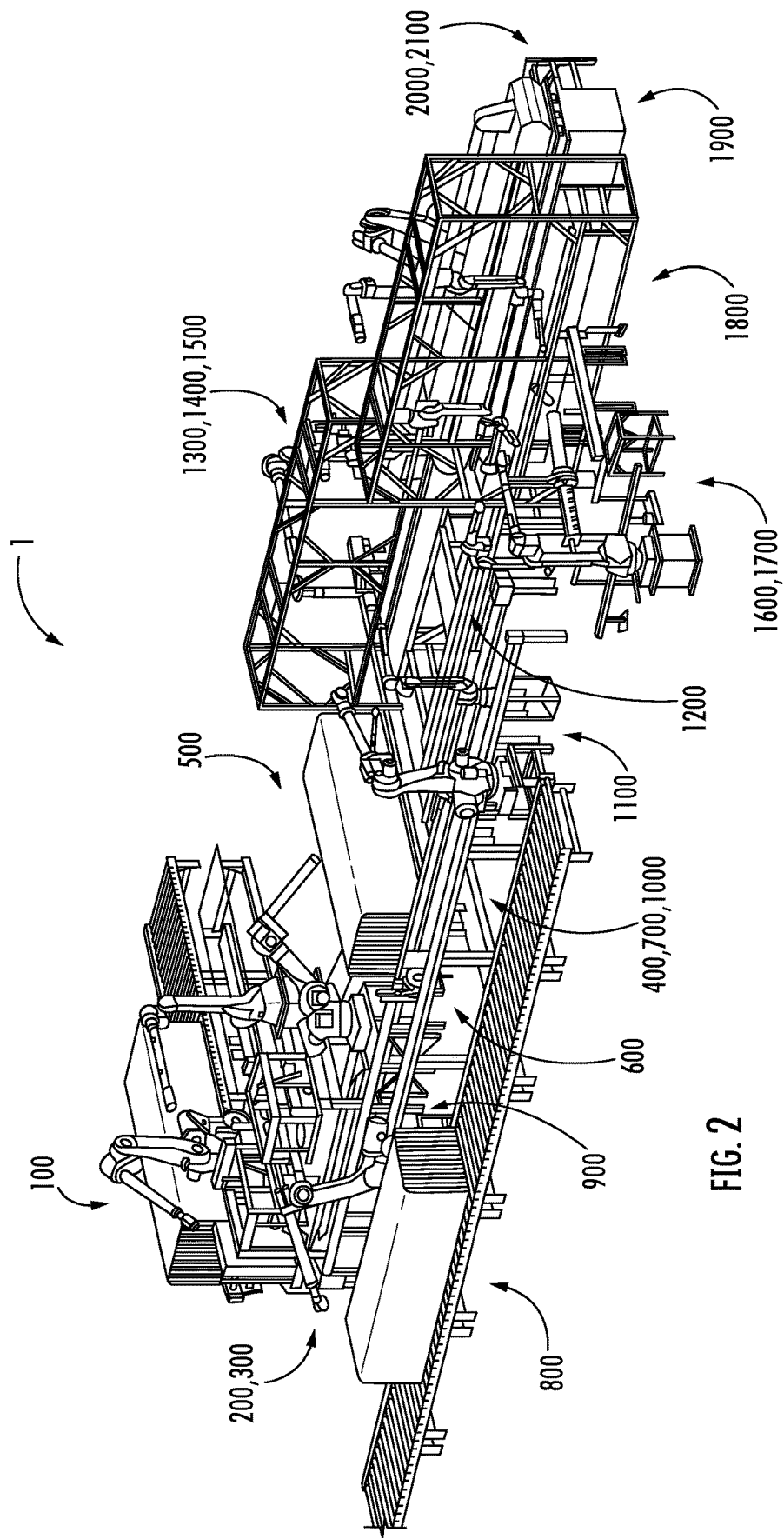

FIG. 2 is an isometric view of the example embodiment of the system shown schematically in FIG. 1.

Figure 3:
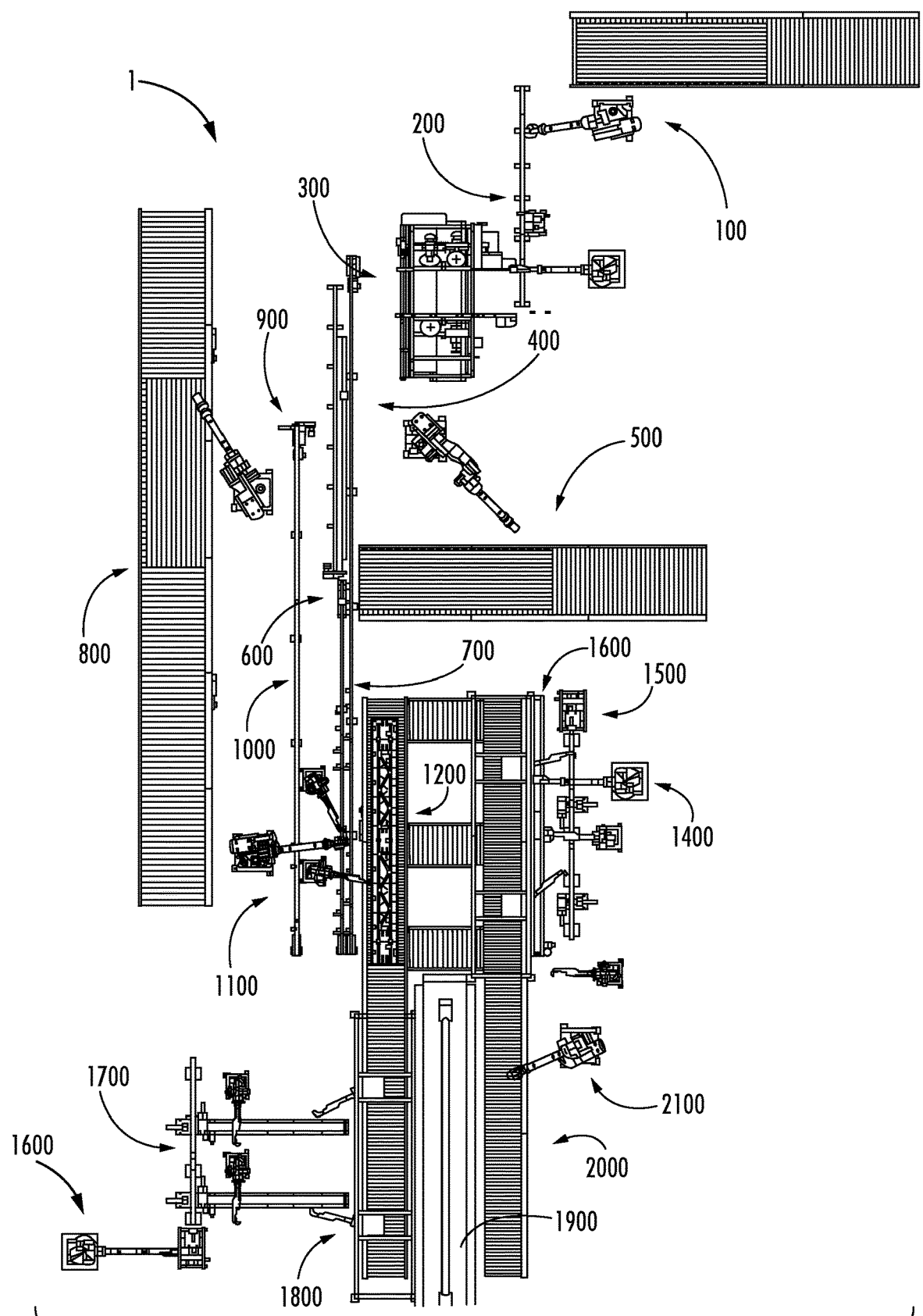

FIG. 3 is a top plan view of the example embodiment of the system shown in FIGS. 1 and 2.

Figure 4:
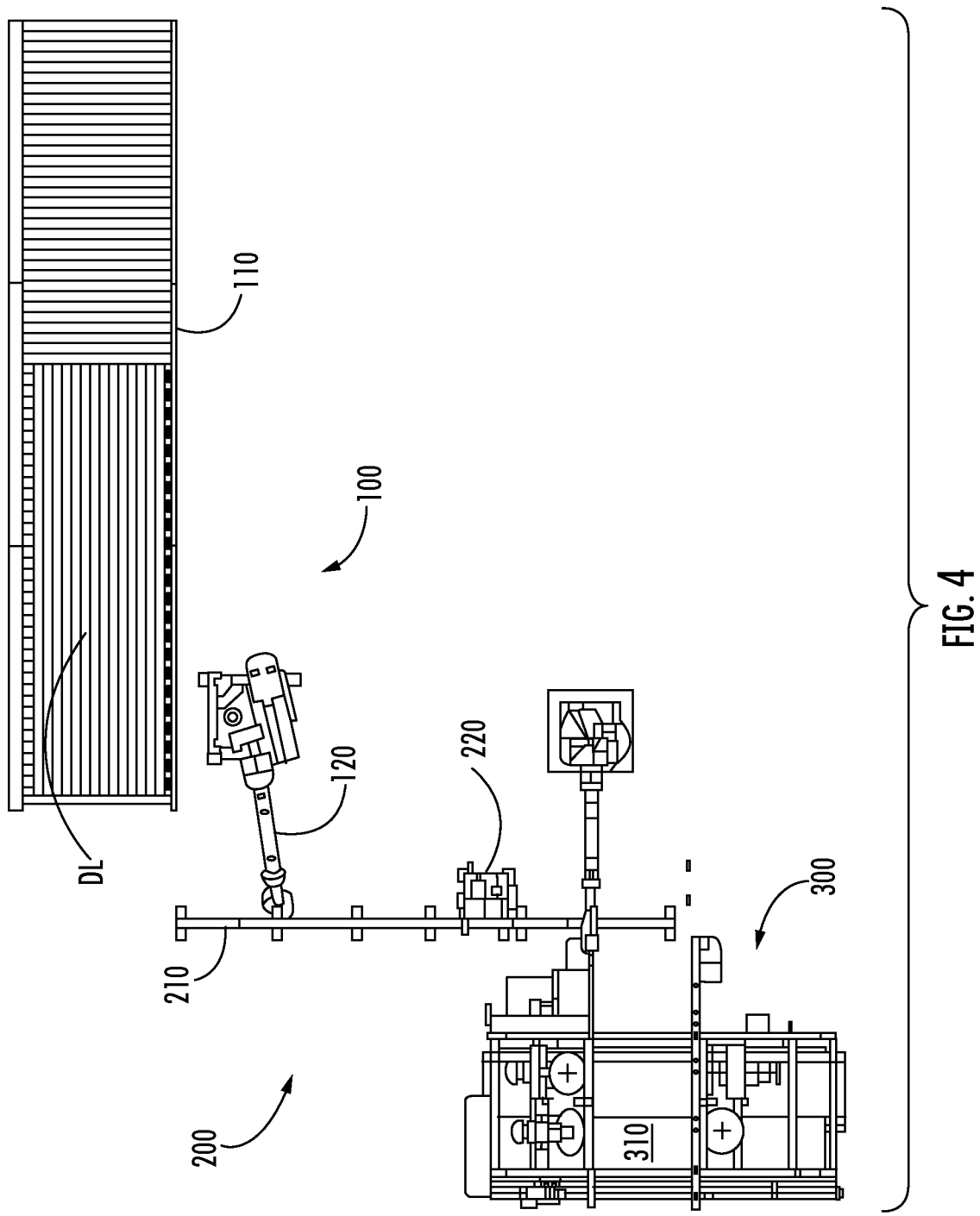

FIG. 4 is a top plan view of a portion of the system shown in FIGS. 1-3, according to an example embodiment.

Figure 5:
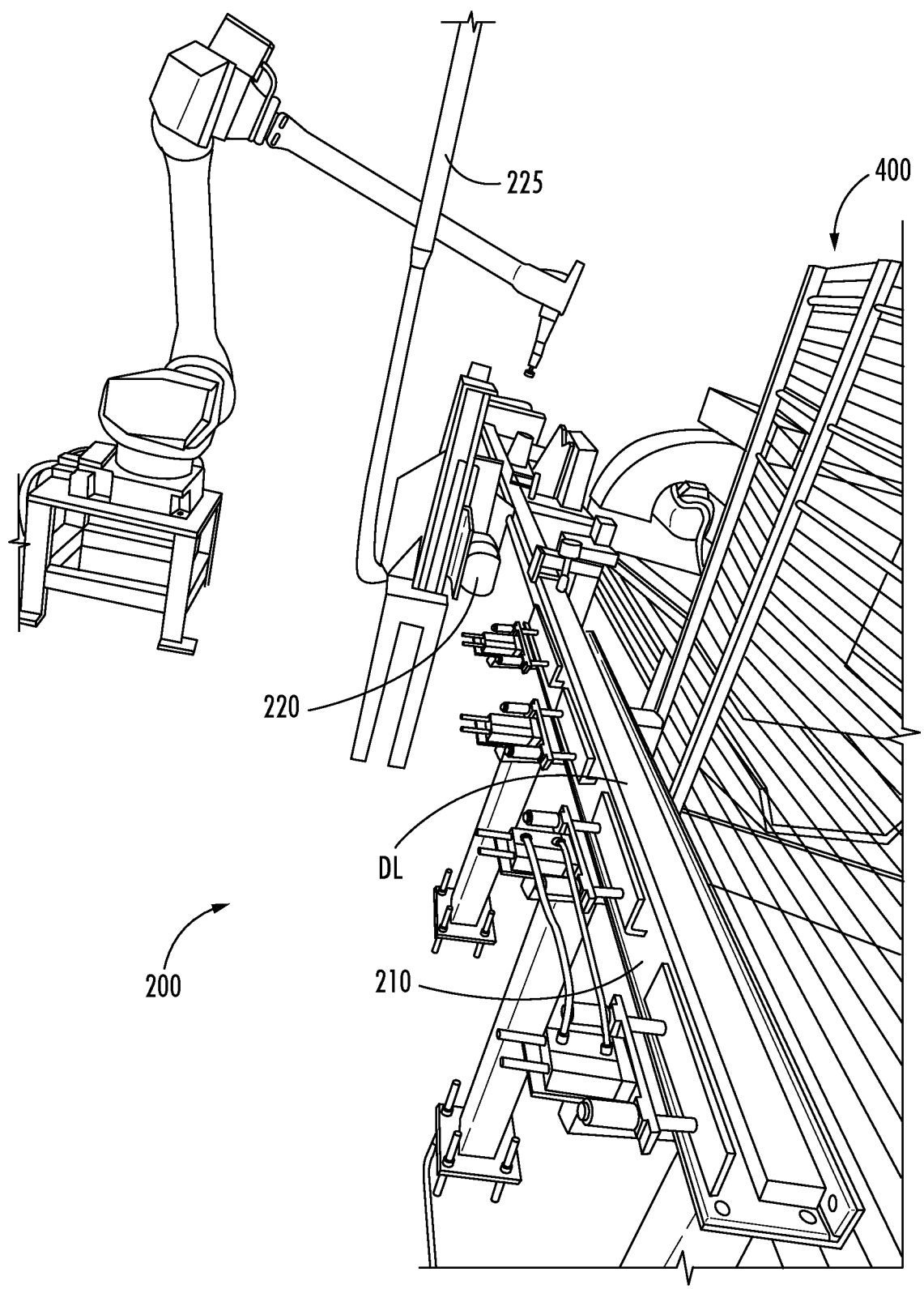
Figure 6:
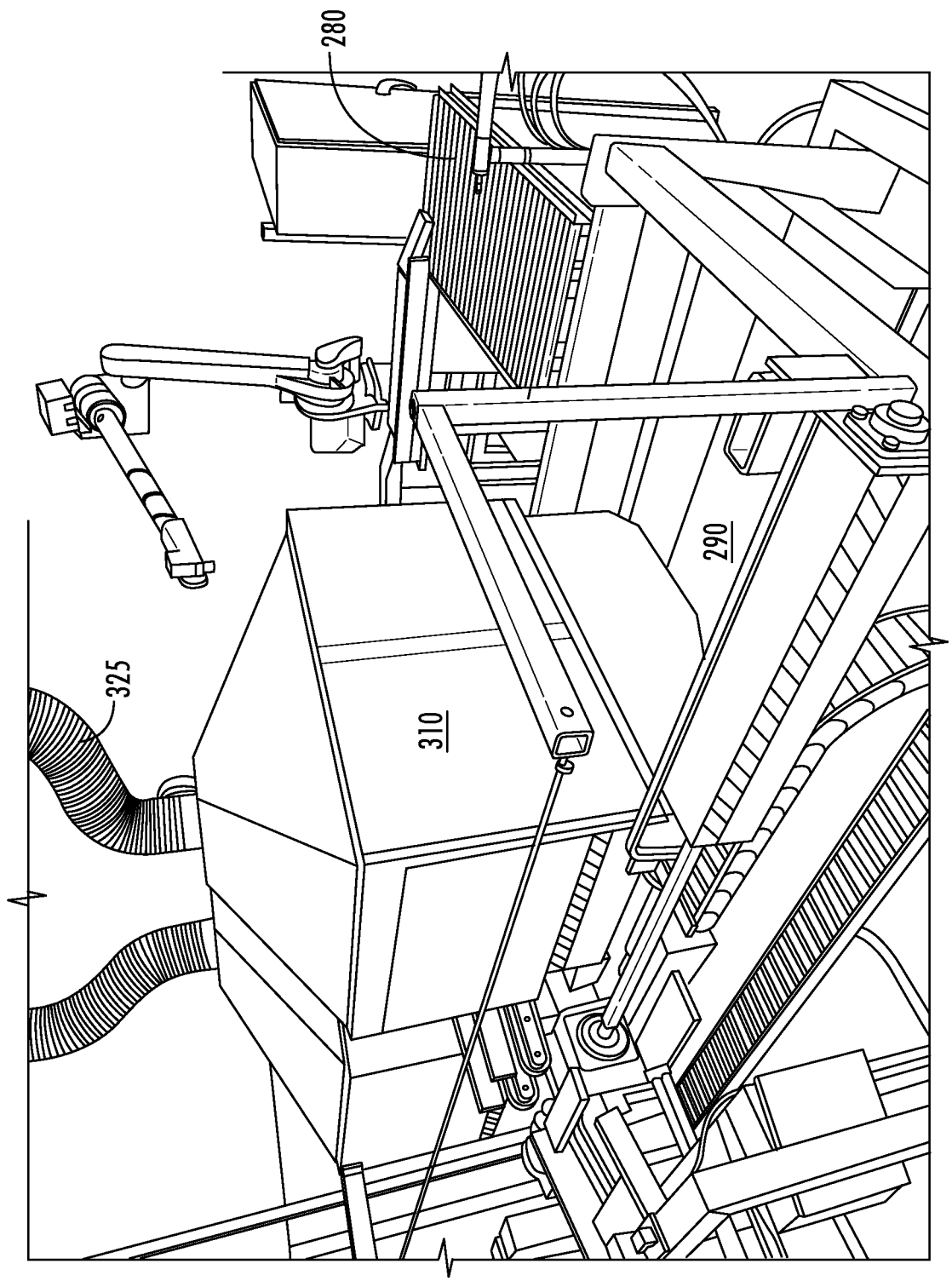

FIGS. 5 and 6 are respective perspective views of portions of the system shown in FIGS. 1-3, according to an example embodiment.

Figure 7:
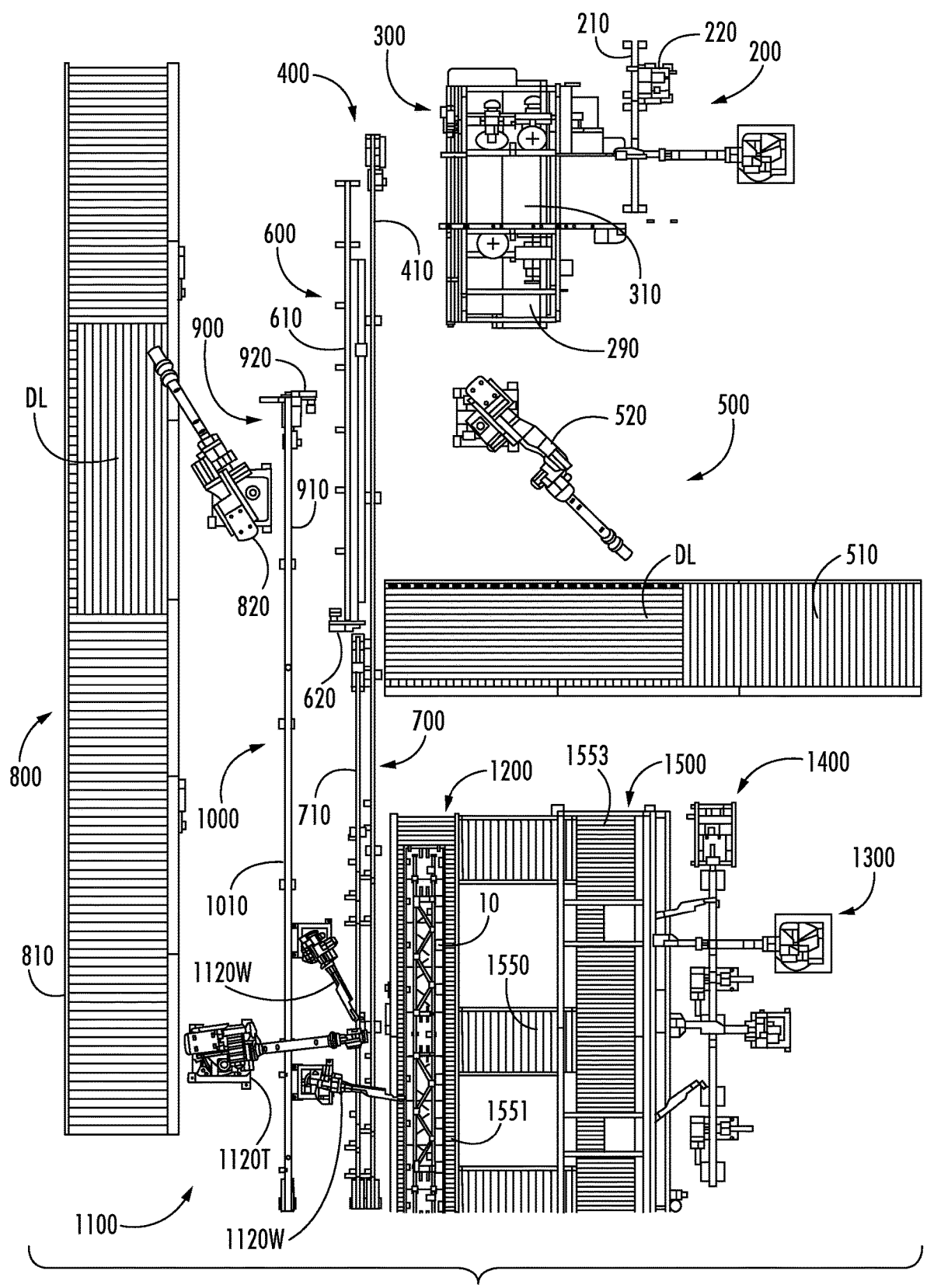

FIG. 7 is a top plan view of a portion of the system shown in FIGS. 1-3, according to an example embodiment.

Figure 8:
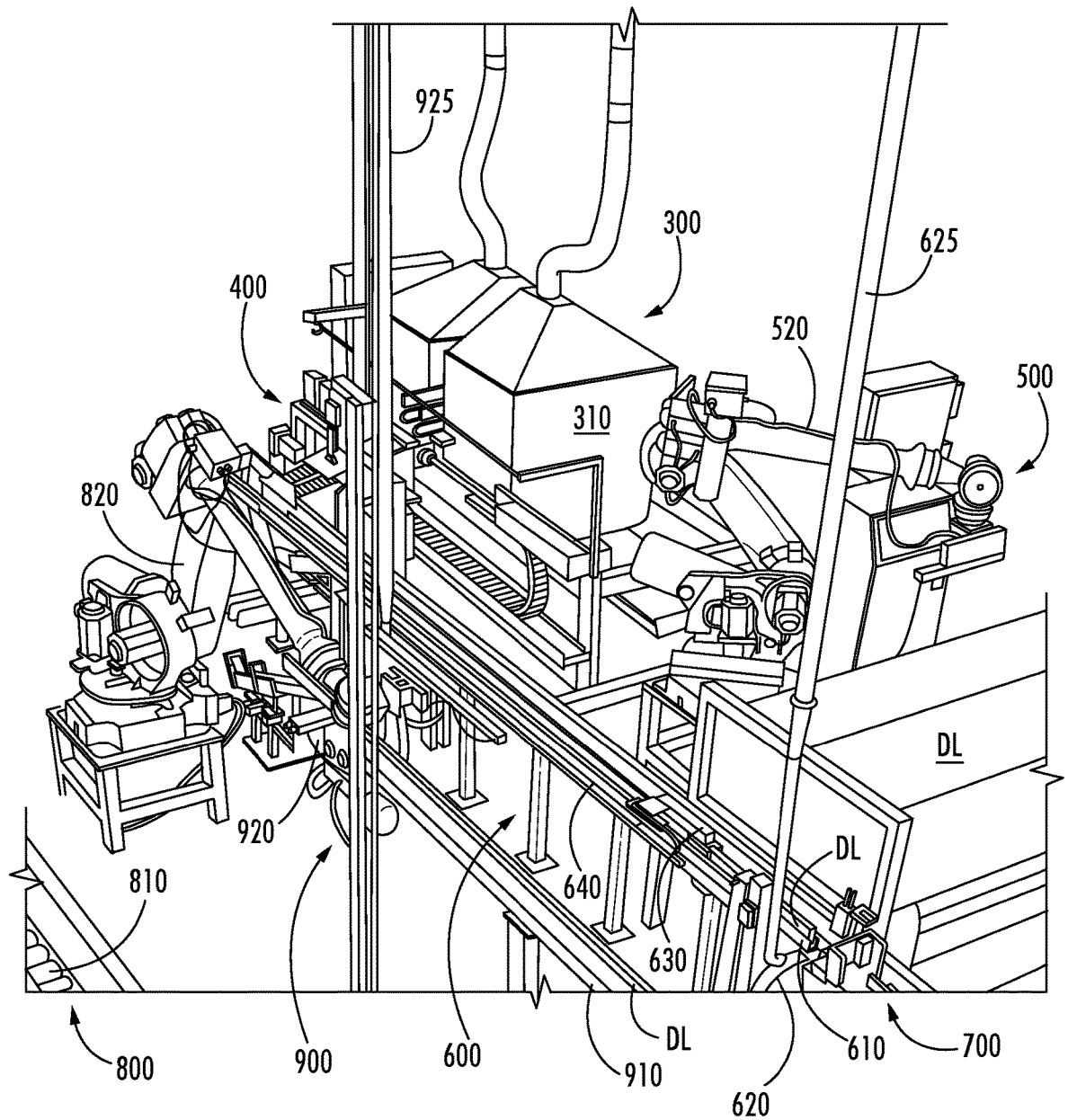
Figure 9:
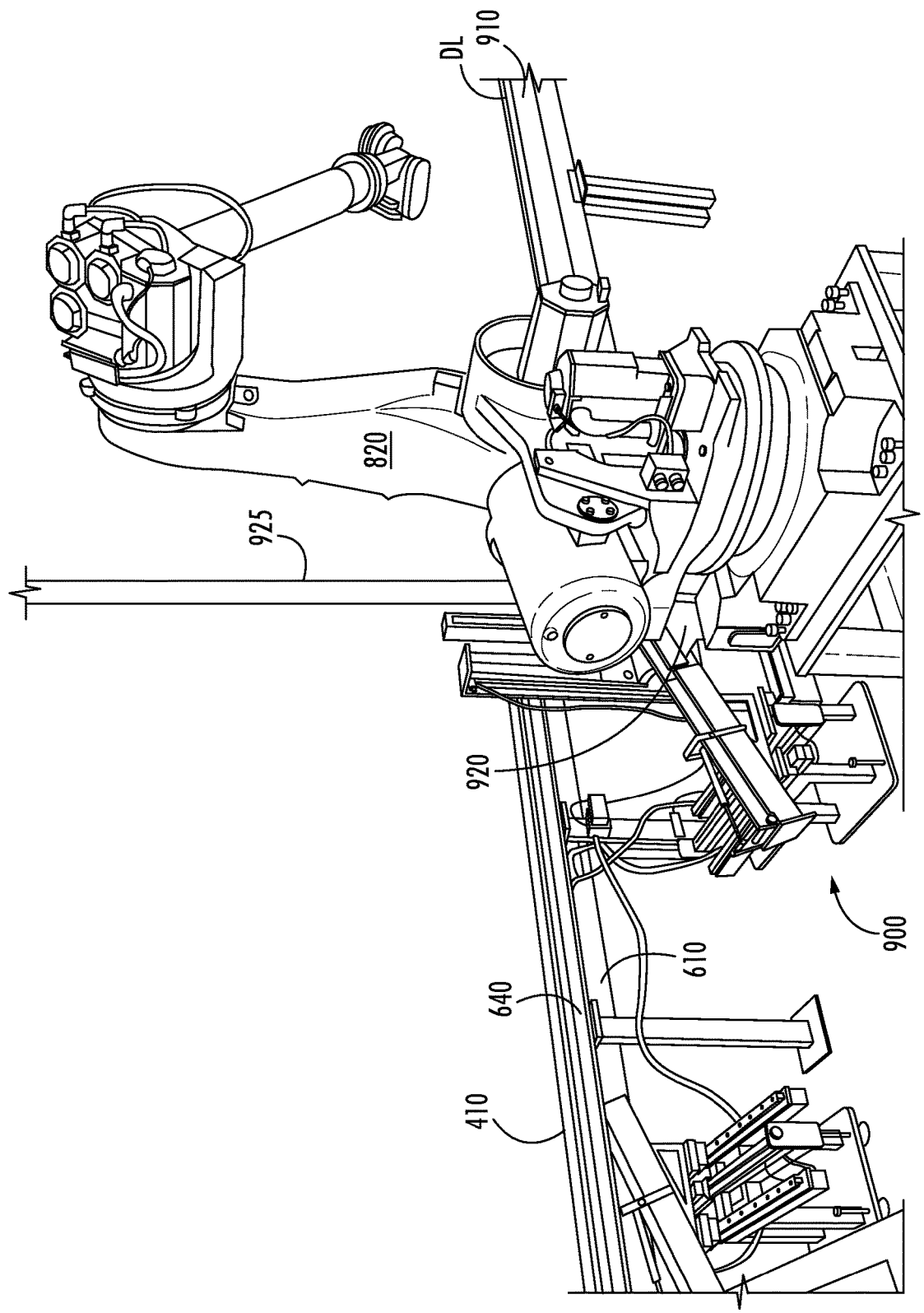

FIGS. 8 and 9 are respective perspective views of portions of the system shown in FIGS. 1-3, according to an example embodiment.

Figure 10:
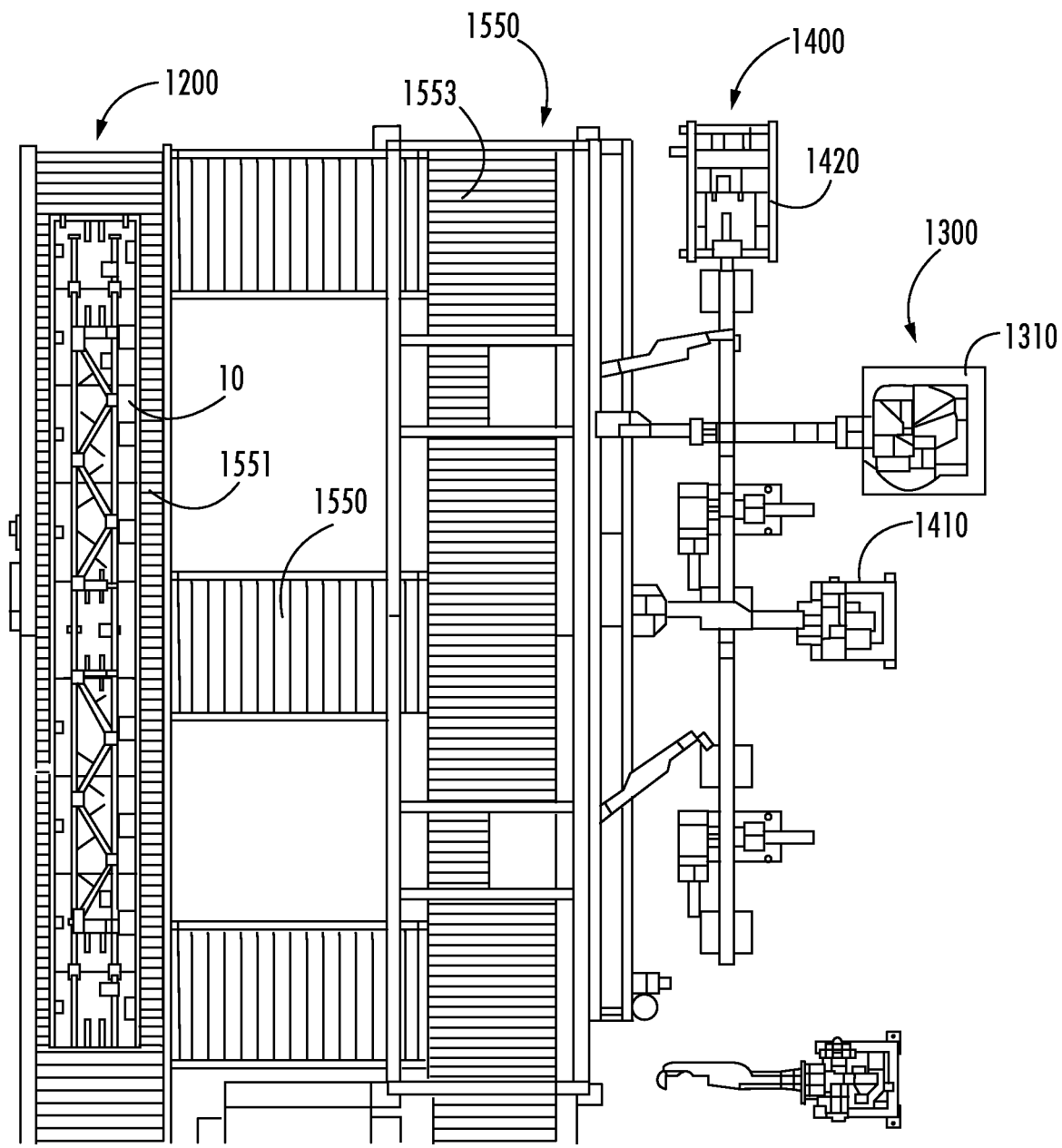

FIG. 10 is a top plan view of a portion of the system shown in FIGS. 1-3, according to an example embodiment.

Figure 11:
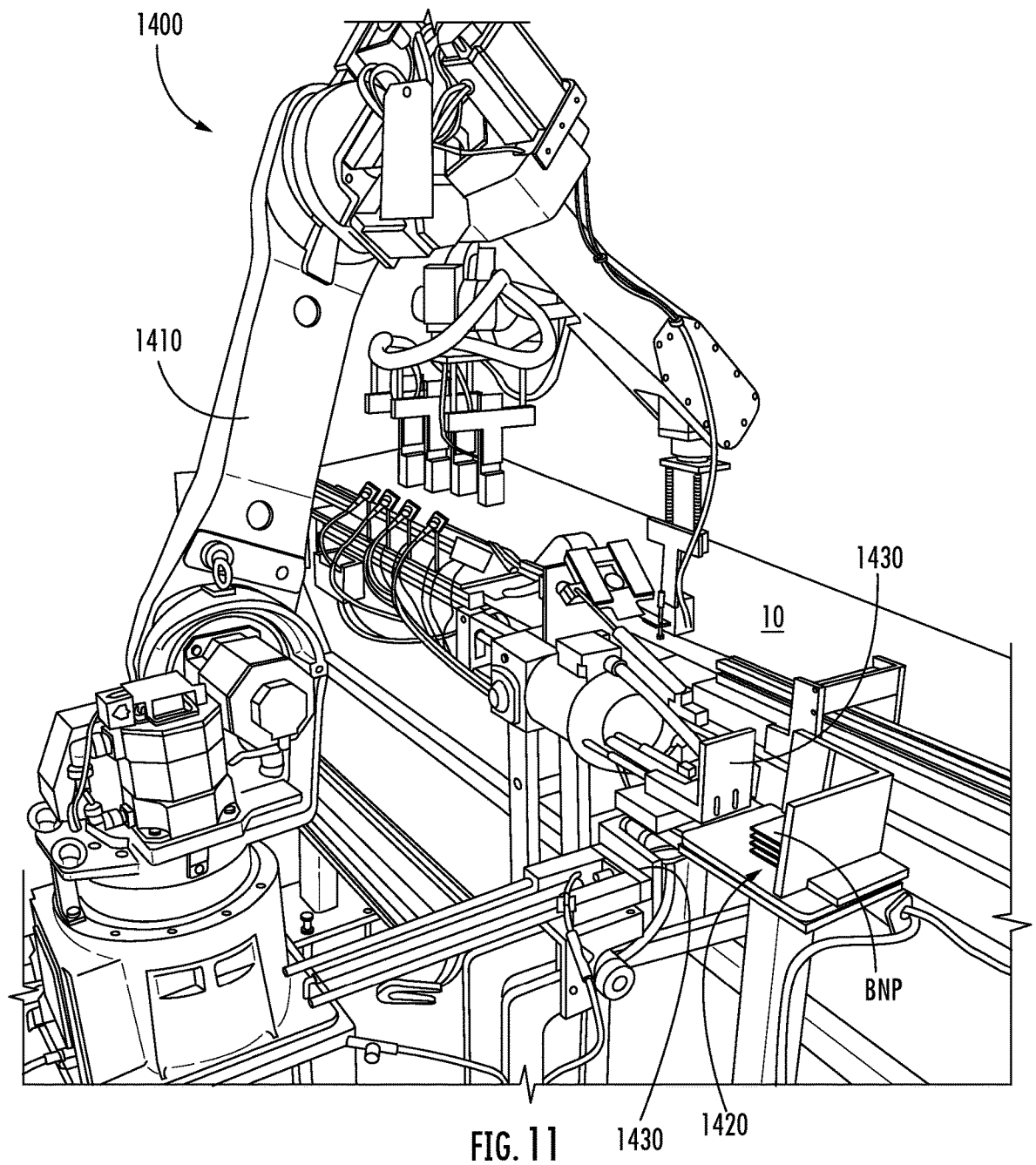
Figure 12:
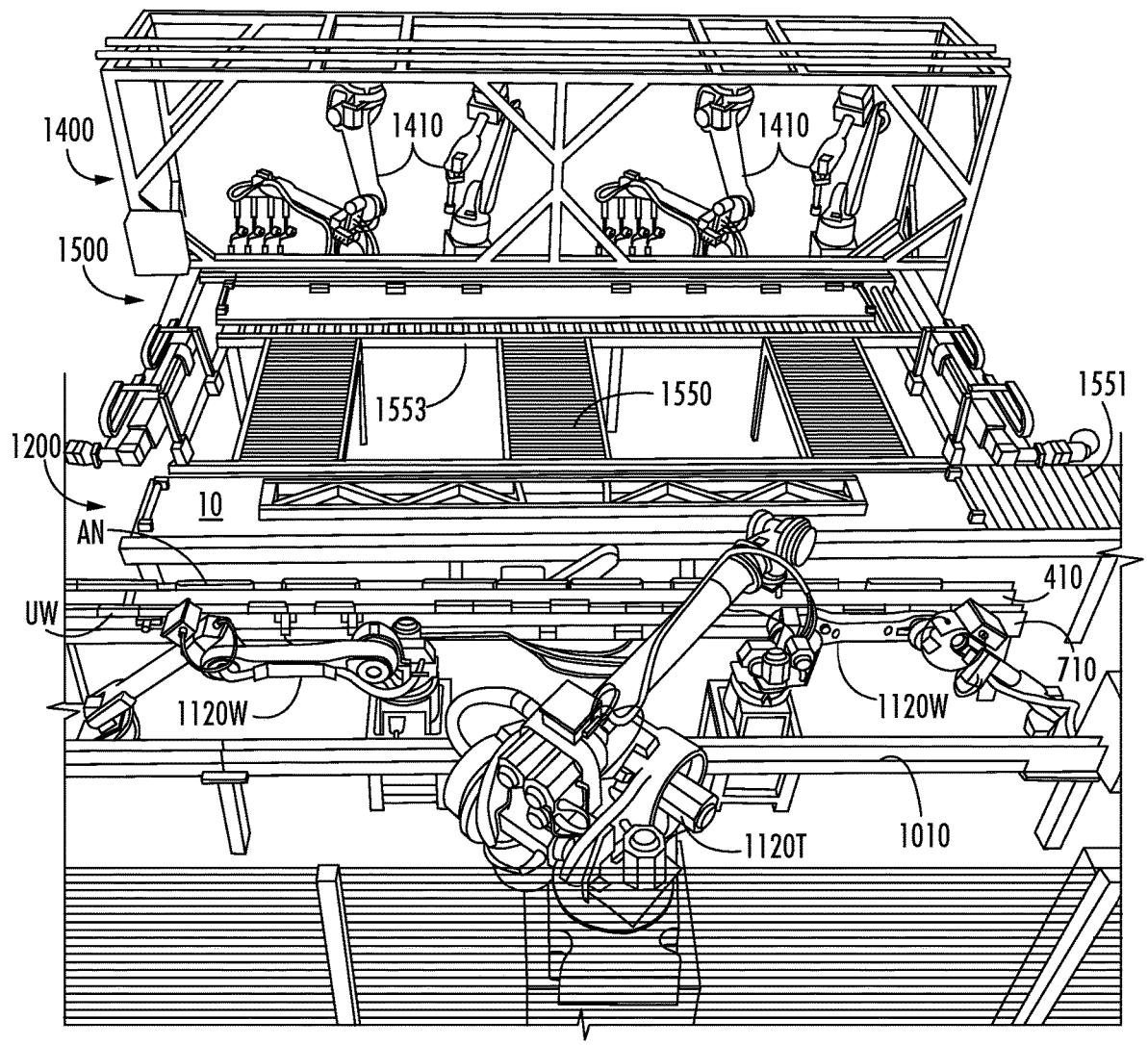

FIGS. 11 and 12 are respective perspective views of portions of the system shown in FIGS. 1-3, according to an example embodiment.

Figure 13:
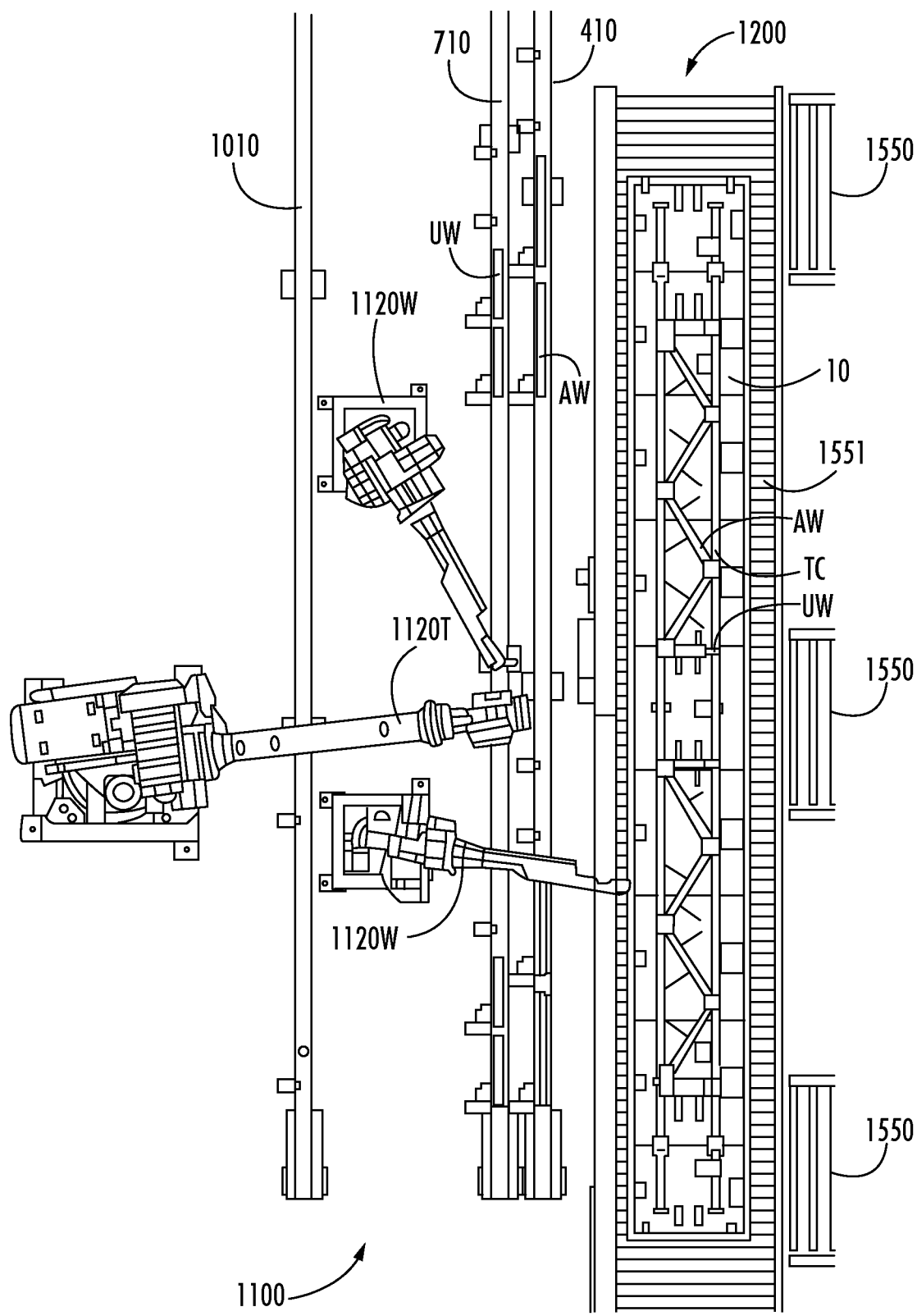

FIG. 13 is a top plan view of a portion of the system shown in FIGS. 1-3, according to an example embodiment.

Figure 14:
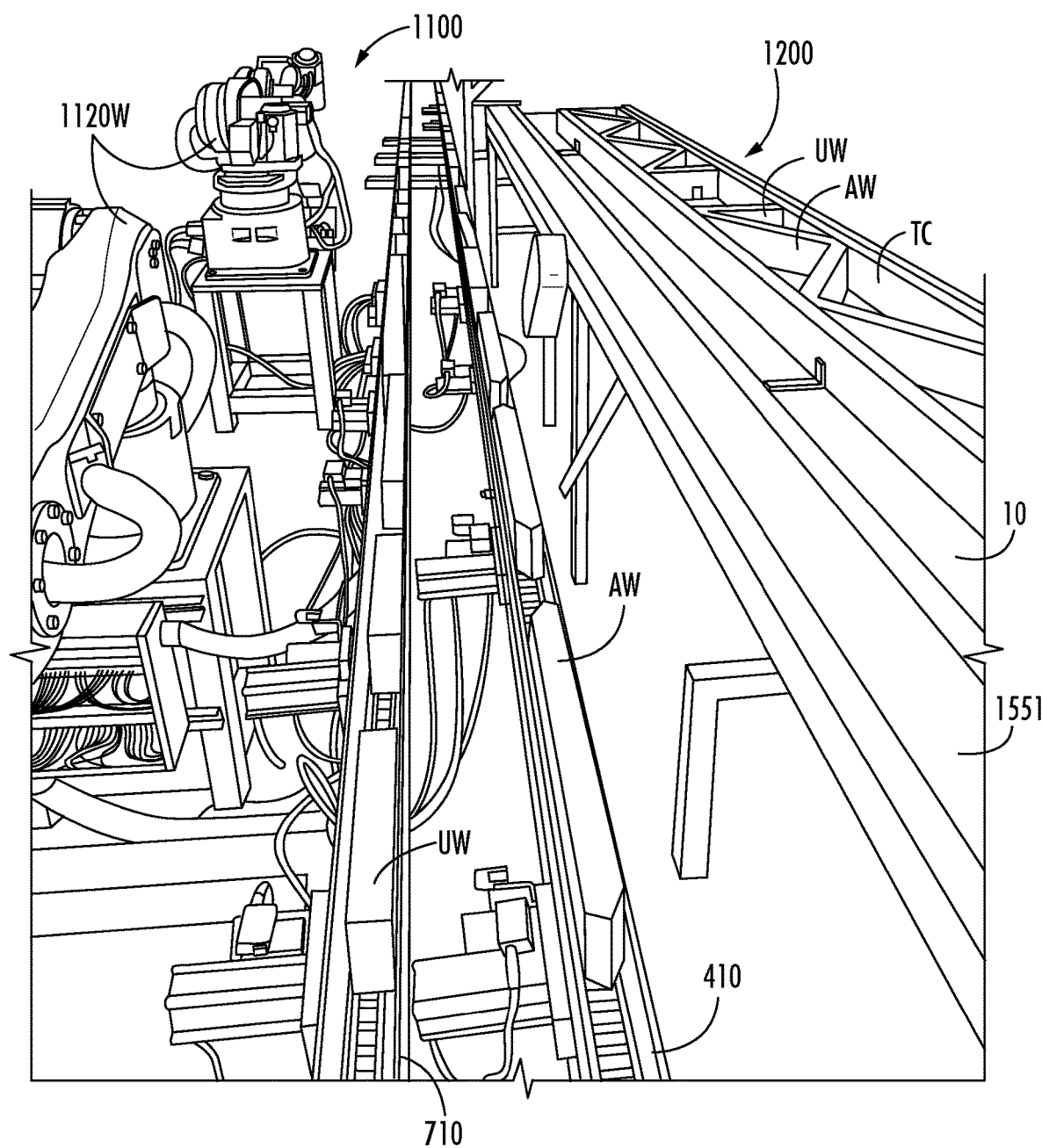

FIG. 14 is a perspective view of a portion of the system shown in FIGS. 1-3, according to an example embodiment.

Figure 15:
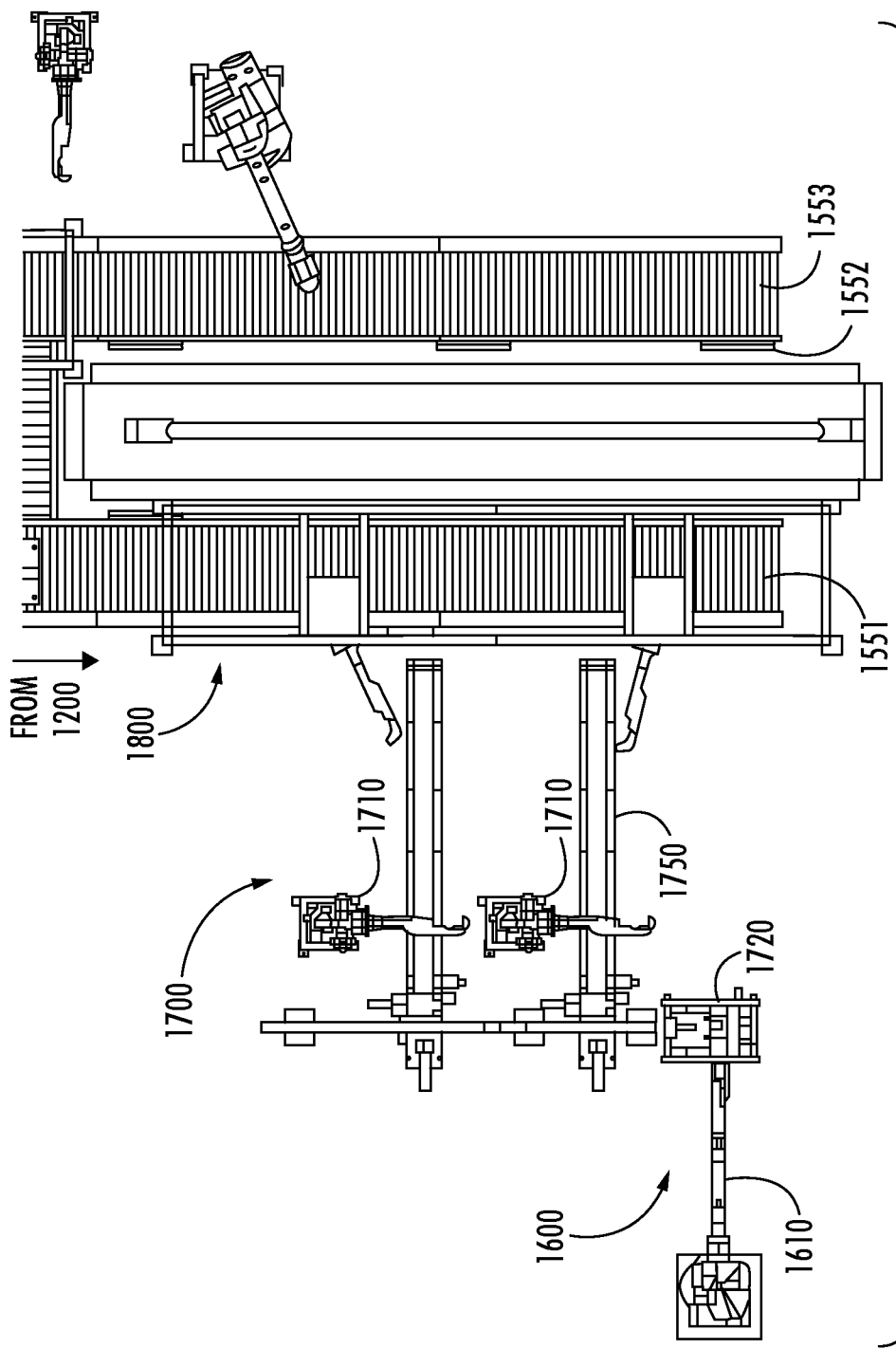

FIG. 15 is a top plan view of a portion of the system shown in FIGS. 1-3, according to an example embodiment.

FIGS. 16-19 are respective perspective views of portions of the system shown in FIGS. 1-3, according to an example embodiment.

Figure 20:
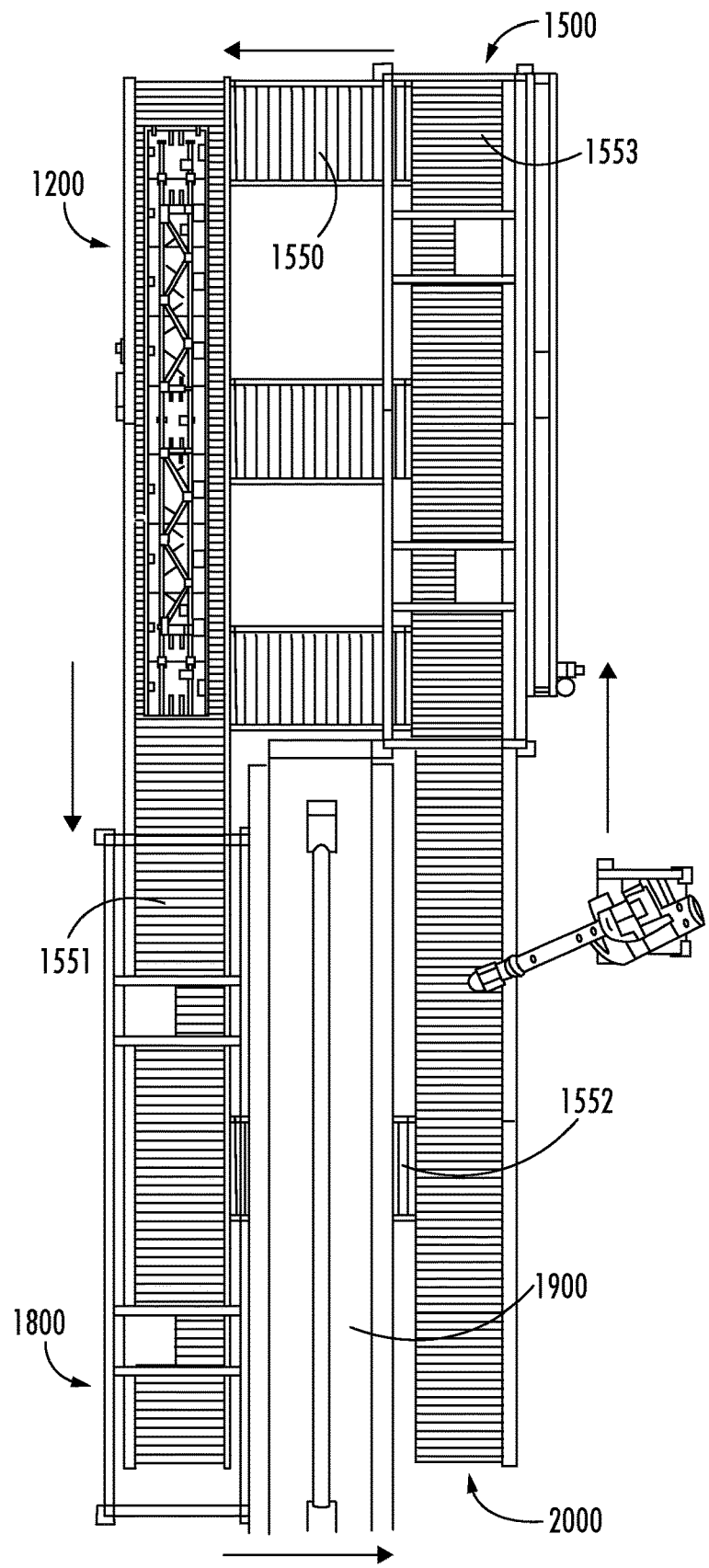

FIG. 20 is a top plan view of a portion of the system shown in FIGS. 1-3, in which an assembly direction of the truss elements is illustrated schematically.

Figure 21:
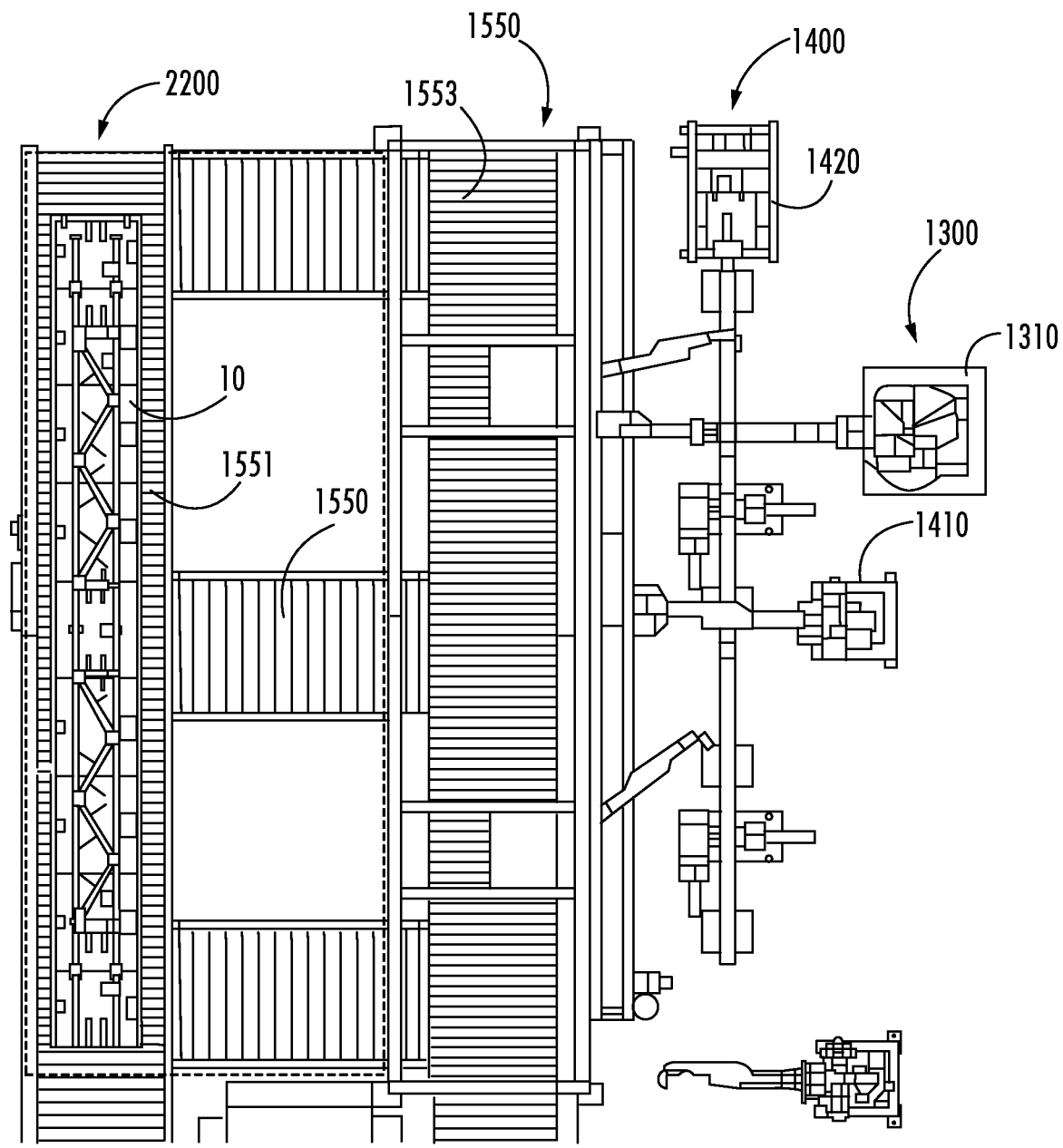

FIG. 21 is a top plan view of another example embodiment of a portion of the system shown in FIGS. 1-3.

Figure 22:
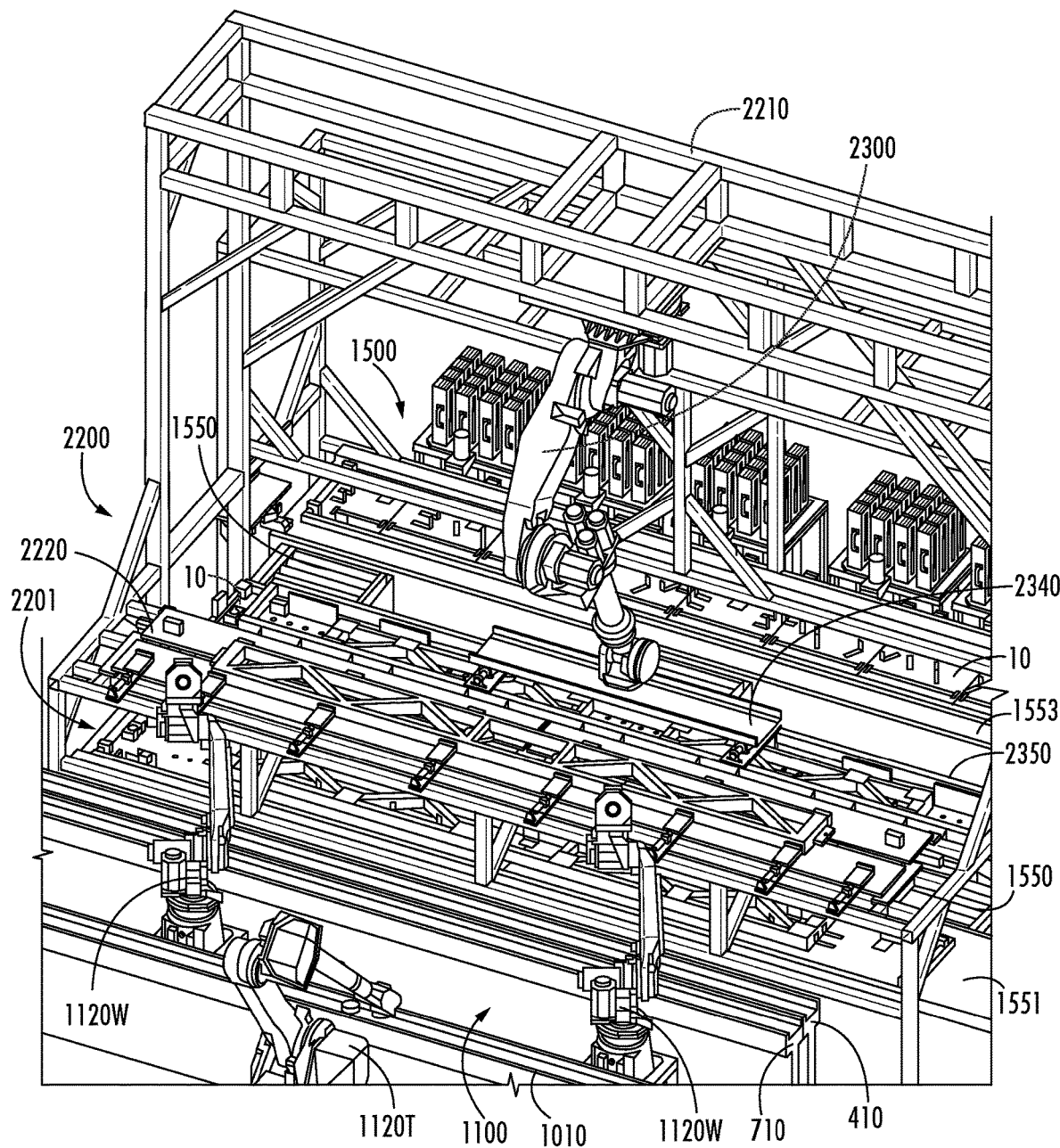

FIG. 22 is a perspective view of the portion of the system shown in the top plan view of FIG. 21.

Figure 23:
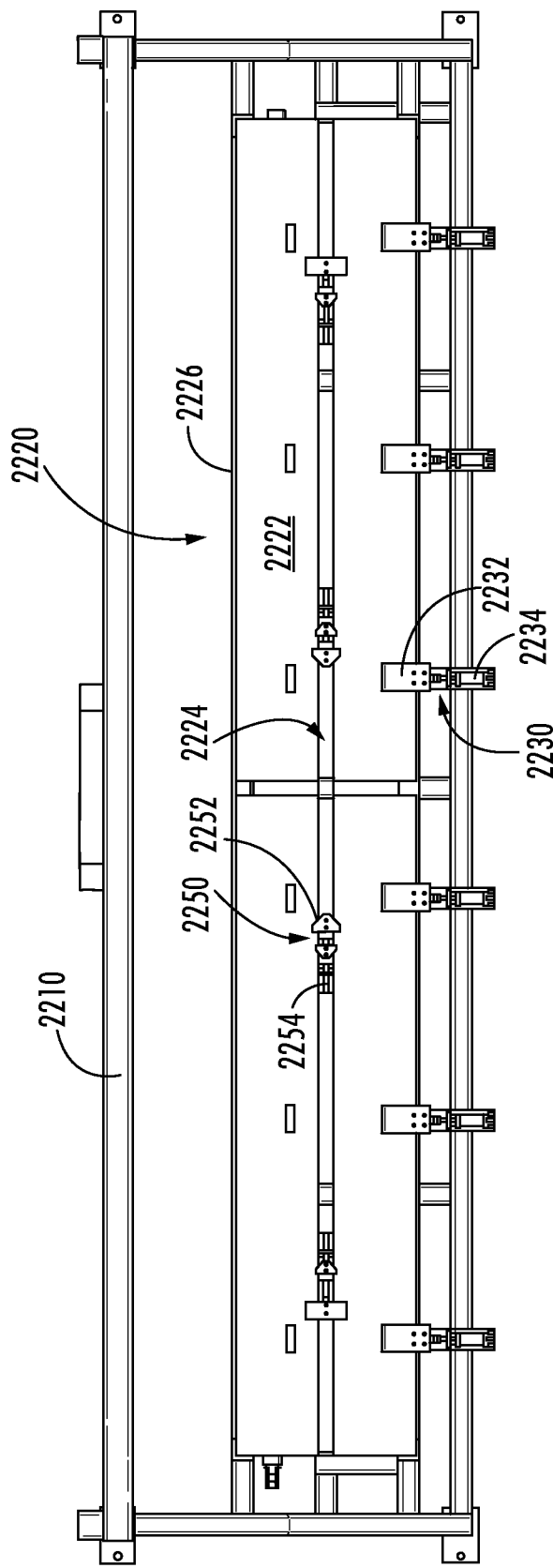

FIG. 23 is a top view of an assembly shelf shown in FIG. 22.

Figure 24:
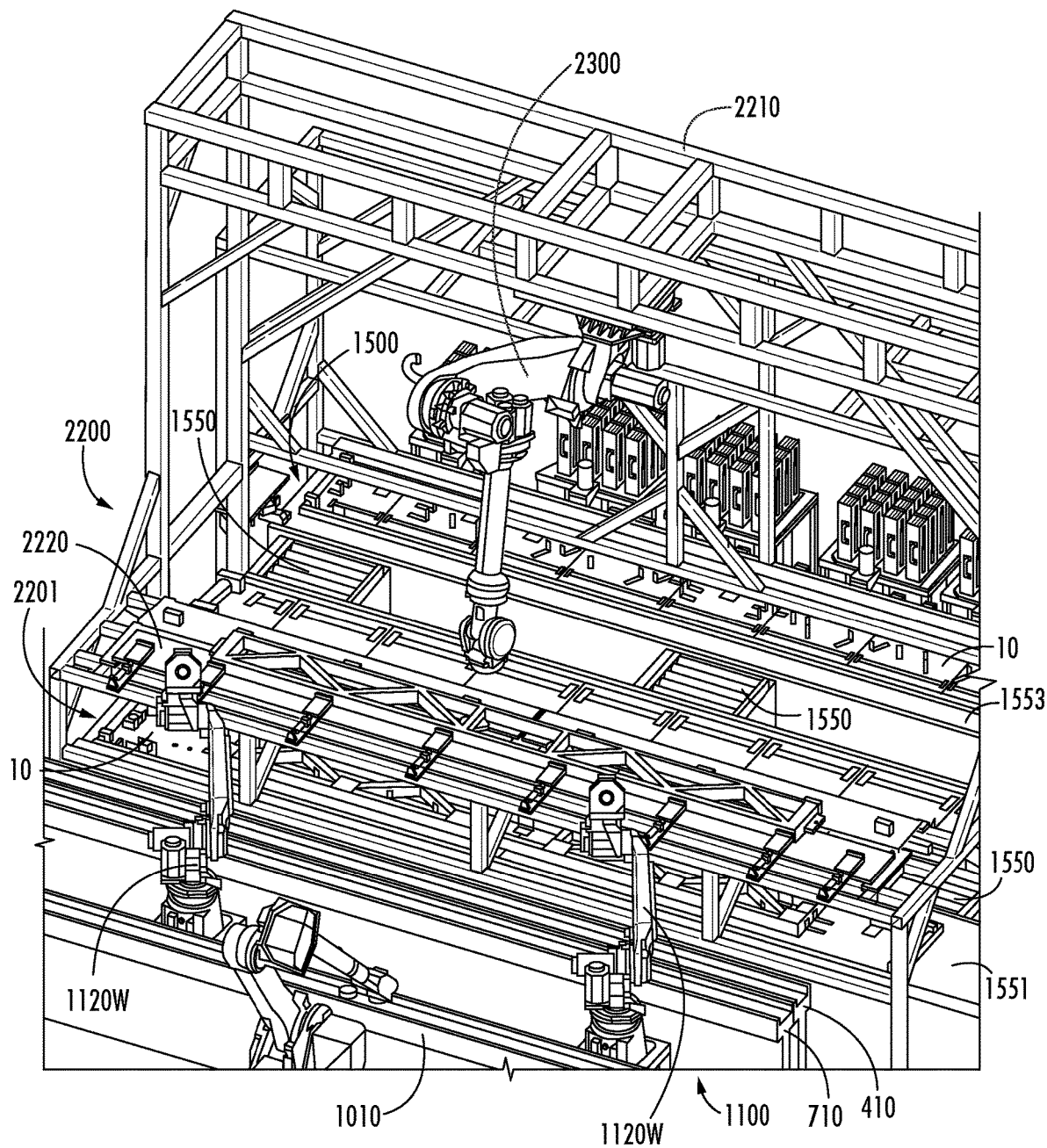

FIG. 24 is another perspective view of the portion of the system shown in FIG. 22.

Figure 25:
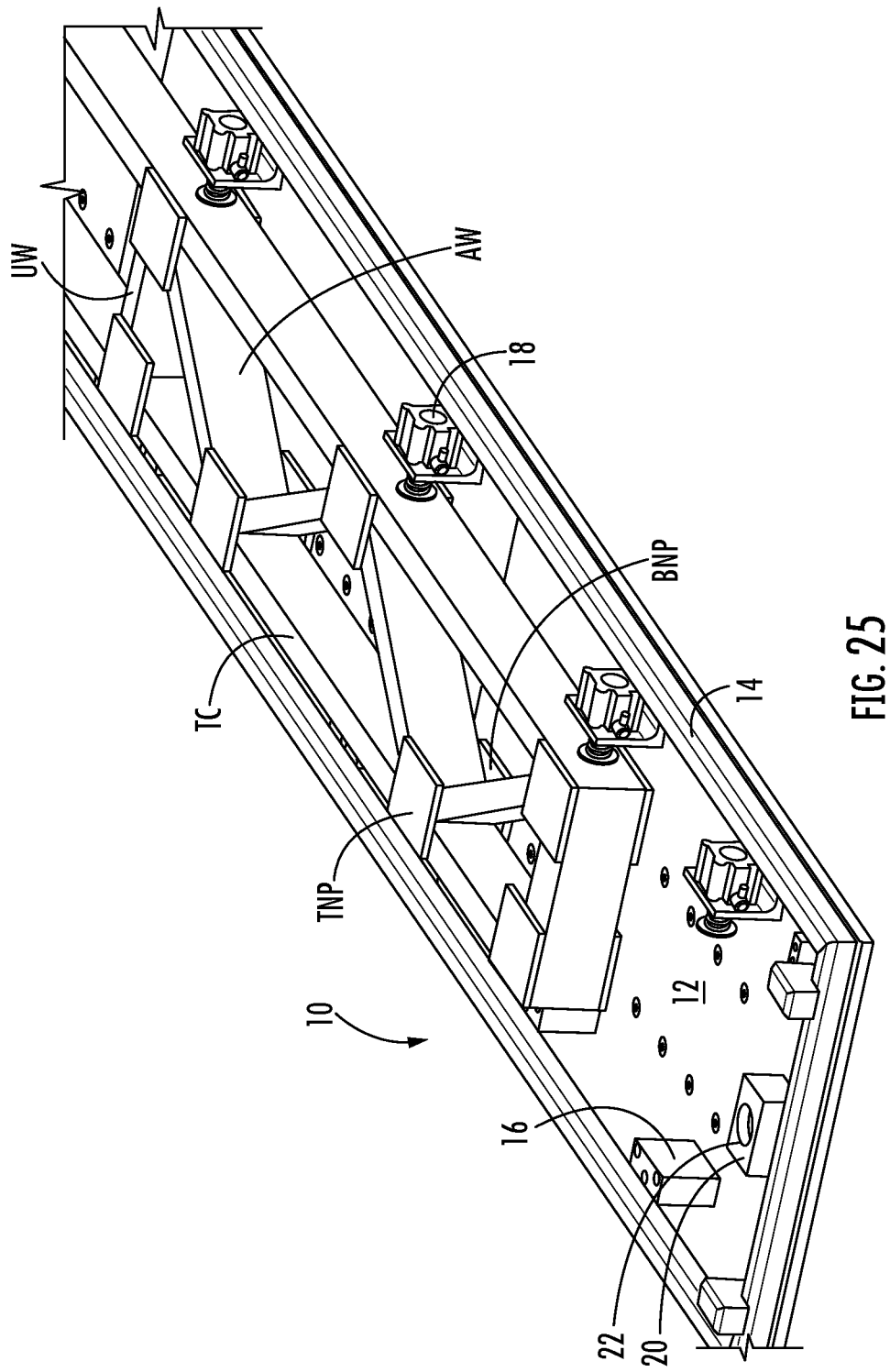

FIG. 25 is a perspective view of an example embodiment of an assembly jig with structural components of a truss element positioned thereon.

Figure 26:
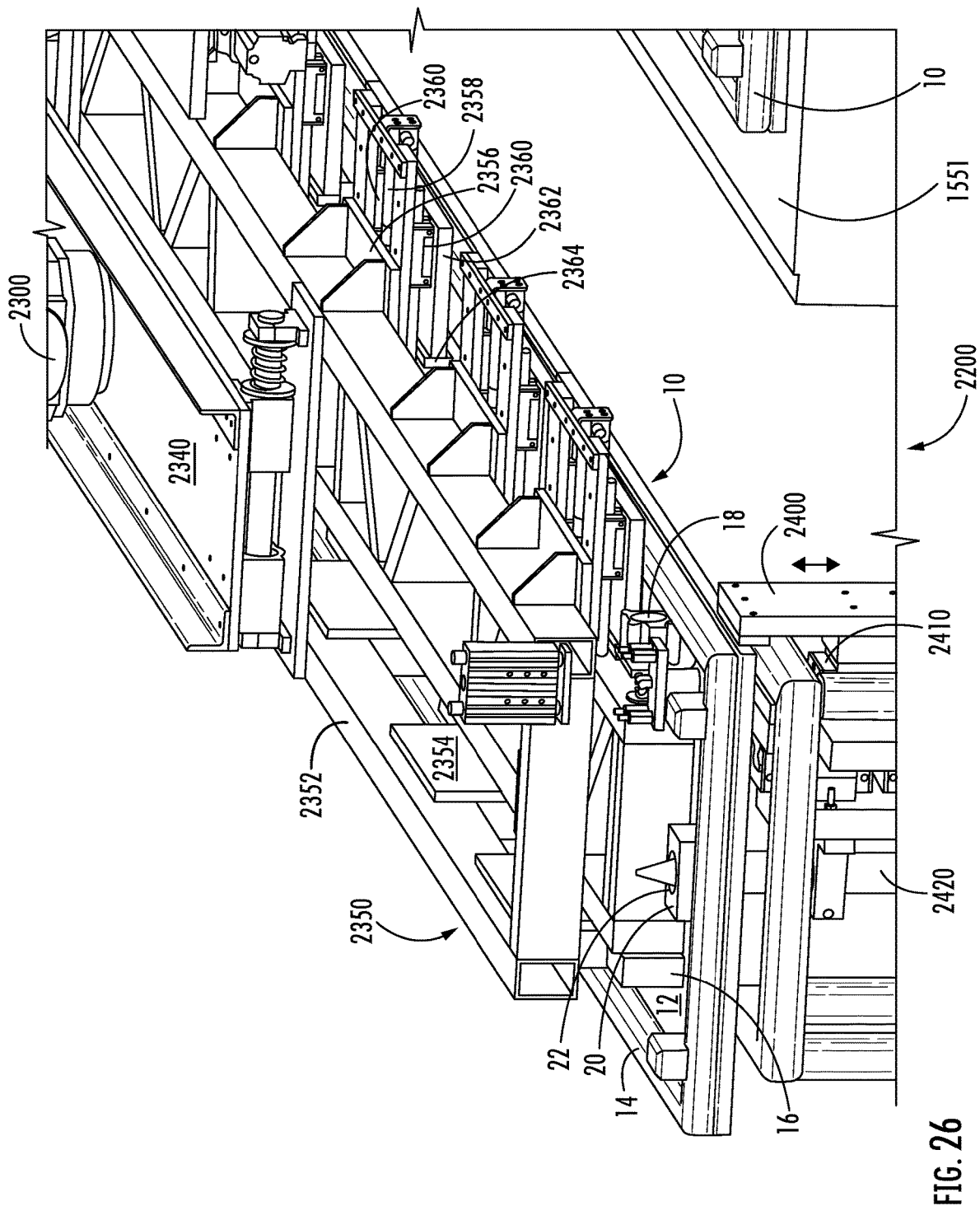

FIG. 26 is another perspective partial view of the portion of the system shown in FIGS. 22 and 24.

DETAILED DESCRIPTION

Unless defined otherwise, all technical and scientific terms used herein have the same meaning as commonly understood to one having ordinary skill in the art to which the presently disclosed subject matter belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless so defined herein. Although, any methods, devices, and materials similar or equivalent to those described herein can be used in the practice or testing of the presently disclosed subject matter, representative methods, devices, and materials are now described.

The terminology used herein is for the purpose of describing particular embodiments only and is not intended to be limiting of the invention. Although, any methods, devices, and materials similar or equivalent to those described herein can be used in the practice or testing of the presently disclosed subject matter, representative methods, devices, and materials are now described.

In describing the invention, it will be understood that a number of individual devices, systems, stations, and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Following long-standing patent law convention, the terms "a", "an", and "the" refer to "one or more" when used in this application, including the claims. As used herein, the singular forms "a," "an," and "the" are intended to include the plural forms as well as the singular forms, unless the context clearly indicates otherwise. Thus, for example, reference to "a vial" can include a plurality of such vials, and so forth.

Unless otherwise indicated, all numbers expressing quantities of length, diameter, width, and so forth used in the specification and claims are to be understood as being modified in all instances by the terms "about" or "approximately". Accordingly, unless indicated to the contrary, the numerical parameters set forth in this specification and attached claims are approximations that can vary depending upon the desired properties sought to be obtained by the presently disclosed subject matter.

As used herein, the term "and/or" includes any and all combinations of one or more of the associated listed items. Thus, for example, a recitation of "A and/or B" would include embodiments having A alone, B alone, or A and B together.

As used herein, the terms "about" and "approximately," when referring to a value or to a length, width, diameter, temperature, time, volume, concentration, percentage, etc., is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate for the disclosed apparatuses and devices.

As used herein, the term "substantially," when referring to a value, an activity, or to an amount of a composition, mass, weight, temperature, time, volume, concentration, percentage, etc., is meant to encompass variations of in some embodiments ±40%, in some embodiments ±30%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed systems.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

The term "comprising", which is synonymous with "including" "containing" or "characterized by" is inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed and claimed subject matter can include the use of either of the other two terms.

As used herein, the term "and/or" when used in the context of a listing of entities, refers to the entities being present singly or in combination. Thus, for example, the phrase "A, B, C, and/or D" includes A, B, C, and D individually, but also includes any and all combinations and sub-combinations of A, B, C, and D.

A non-limiting example embodiment of a system and method for the automated manufacturing of trusses suitable for use in building modularly-constructed structures are disclosed herein. Reference may be made to FIGS. 1-20 for additional details regarding the presently disclosed systems and methods.

FIGS. 1-3 are various illustrations of an example embodiment of a system, generally designated 1, for constructing geometric truss elements in an automated manner (e.g., without any manual intervention by a human) for use in assembly of a modular building unit (e.g., a floor or ceiling structure thereof). As shown in FIGS. 1-3, the system 1 comprises an angled web loading station, generally designated 100, an angled web rough cut station, generally designated 200, an angled web finish cut station, generally designated 300, an angled web delivery station, generally designated 400, an upright web loading station, generally designated 500, an upright web cut station, generally designated 600, an upright web delivery station, generally designated 700, a truss chord loading station, generally designated 800, a truss chord cut station, generally designated 900, a truss chord delivery station, generally designated 1000, a finished lumber merge/transfer station, generally designated 1100, a finished lumber jig placement station, generally designated 1200, a bottom nail plate (BNP) loading station, generally designated 1300, a BNP delivery station, generally designated 1400, a BNP jig placement station, generally designated 1500, top nail plate (TNP) loading station, generally designated 1600, a TNP delivery station, generally designated 1700, a TNP jig placement station, generally designated 1800, a nail plate press station, generally designated 1900, a finished truss unloading station, generally designated 2000, and a finished truss storage station, generally designated 2100.

Many of the stations referred to herein can logically be thought of as belonging to one or more groupings of such sections, which can be operated independently of one or more other groupings. The angled web loading station 100, the angled web rough cut station 200, the angled web finish cut station 300, and the angled web delivery station 400 collectively define what is referred to as the angled web production grouping. The upright web loading station 500, the upright web cut station 600, and the upright web delivery station 700 collectively define what is referred to as the upright web production grouping. The truss chord loading station 800, the truss chord cut station 900, and the truss chord delivery station 1000 collectively define what is referred to as the truss chord production grouping. The BNP loading station 1300 and the BNP delivery station 1400 collectively define what is referred to as the BNP grouping. The TNP loading station 1600 and the TNP delivery station 1700 collectively define what is referred to as the TNP grouping. The BNP jig placement station 1500, the finished lumber jig placement station 1200, the TNP jig placement station 1800, the nail plate press station 1900, and the finished truss unloading station 2000 collectively define the truss element assembly grouping.

Each of the angled web production grouping, the upright web production grouping, and the truss chord production grouping output their respective types of finished lumber (e.g., finished angle webs 2, finished upright webs 3, and finished truss chords 4) into an area referred to as the finished lumber merge/transfer station 1100 for transfer onto an assembly jig 1 at the finished lumber jig placement station 1200.

Operation of the stations of the angled web production grouping will be discussed hereinbelow, specifically with respect to FIGS. 4-6. At the angled web loading station 100, dimensional lumber DL (e.g., a plurality of pieces of dimensional lumber that are delivered as a bundle) is moved into a position on a conveyor 110 where the dimensional lumber DL is accessible by (e.g., can be picked up by) an automated robot 120. The automated robot 120 can be of any suitable type for grasping and manipulating one or more pieces of the dimensional lumber DL, but in the example embodiment discussed herein is a robotic arm with a grasping end effector (e.g., a grasping and/or suction mechanism) that is configured to detect a position of each piece of dimensional lumber DL on the conveyor 110, to lift the dimensional lumber DL off of the conveyor 110, and to transfer the dimensional lumber DL to the angled web rough cut station 200. The conveyor 110 receives the dimensional lumber DL from a dimensional lumber source (e.g., a crane, forklift, etc.) and transports the dimensional lumber DL into the position shown in FIG. 4 using one or more driven rollers (e.g., with the remaining rollers being idler rollers). The conveyor 110 may be of any type suitable for the transport of dimensional lumber DL in an automated manner into the position shown in FIG. 4 for manipulation by the robot 120. The robot 120 transfers (e.g., individually) the dimensional lumber DL from the conveyor 110 into an automated feed trough 210 of the angled web rough cut station 200.

The angled web rough cut station 200 has a controller that receives as an input (e.g., from a measuring device, such as may be provided on the end effector of the robot 120) the length of the dimensional lumber DL deposited into the feed trough 210 by the robot 120. At a position along the feed trough 210, the angled web rough cut station 200 has a saw 220 (e.g., any suitable device for cutting dimensional lumber) that is movable vertically and/or laterally to cut the dimensional lumber DL into angled web segments having a prescribed length according to the design of the truss element being assembled by the system 1. The saw 220 has attached thereto a vacuum hose 225 for evacuation of sawdust and other particulate debris that is generated when the saw 220 is actuated (e.g., vertically and/or laterally, within the cross-section defined by the feed trough 210) for cutting the dimensional lumber DL in the feed trough 210 into the individual rough cut angled webs, which are then transferred onto the inlet conveyor for the cutting machine 310. The dimensional lumber DL is thus loaded into the feed trough 210 and is positionally registered (e.g., using one or more sensors). The controller then instructs the feed trough 210 to move (e.g., using a linear actuator) the dimensional lumber DL along the feed trough 210 by a prescribed distance.

In some embodiments, the dimensional lumber DL may be positionally registered within the feed trough 210 by advancing the dimensional lumber DL through the feed trough 210 to a location where the end of the dimensional lumber DL is detected at a point past the saw 220 where a sensor is located and the saw 220 may be actuated and retracted to cut the dimensional lumber DL, thereby ensuring a sufficiently square end of the dimensional lumber DL for the first angled web segment to be cut from the dimensional lumber DL and also establishing a zero, or "home," position for the dimensional lumber DL within the feed trough 210. The controller then instructs the feed trough 210 to advance the dimensional lumber DL by a distance corresponding to (e.g., substantially the same as) a length of one of the angled webs used in the truss element being assembled. The lengths of the angled web segments may be different from each other, such as when the truss element being assembled comprises at least two angled webs of different lengths. The order in which the angled web segments is cut is known by the system 1 so that, when each finished angled web arrives at the finished lumber merge/transfer station 1100, the system 1 can ensure that the angled webs are each placed correctly on the assembly jig 10 (e.g., in the designated position on the assembly jig 10 for an angled web of a prescribed length) for the truss element being assembled.

After the saw 220 cuts the dimensional lumber DL within the feed trough 210 to form a rough cut angled web segment, this rough cut angled web segment is transferred (e.g., on a conveyor) to the angled web finish cut station 300. Any scrap pieces of dimensional lumber DL (e.g., pieces that are too short for use as one of the angled webs of the truss element being assembled) are transported onto a scrap lumber conveyor 280, which in turn transports such scrap pieces of dimensional lumber DL into a scrap lumber bin 290 for disposal.

In the angled web finish cut station 300, the ends of each of the rough cut angled web segments are cut at prescribed angles to provide enhanced contact at each end of the angled web with each of the truss chord and the upright web, with which the angled web is in contact. Thus, the angled web has, at each end thereof, a generally "V" shaped cross-sectional profile. The surfaces that form this V-shaped profile at each end can have a same or a different length depending on the design of the truss element for which the angled web is produced. The surfaces that form the V-shaped profile at each end of the angled web are typically arranged at a 90° angle relative to each other, but are not necessarily limited to such a 90° angle. In order to produce these V-shaped profiles at each end of the angled segment, the angled web finish cut station 300 comprises a truss web saw 310 (e.g., a Floor Web Truss Saw, model FWA 500 from Monet DeSauw, Inc., Fulton, MO, USA) that has cutting blades that are adjustable both in terms of position and angle, such that the cutting blades can be repositioned within the truss web saw 310 based on the length of the angled web and also based on the specified shape of the V-shaped profile at each of the ends of the angled web. The truss web saw 310 has attached thereto vacuum hoses 325 for evacuation of sawdust and other particulate debris that is generated within the truss web saw 310 during the finish cut operation. After being cut into a specified geometric shape by the truss web saw 310, finished angled webs are produced and output to the angled web delivery station 400, which comprises a finished angled web conveyor 410 that slopes down and deposits the finished angled webs individually (e.g., sequentially) into an angled web transport trough 420 that transports each of the finished angled webs (e.g., in the order in which the finished angled webs are produced) to the finished lumber merge/transfer station 1100.

Operation of the stations of the upright web production grouping will be discussed hereinbelow, specifically with respect to FIGS. 7-9. At the upright web loading station 500, dimensional lumber DL (e.g., a plurality of pieces of dimensional lumber that are delivered together as a bundle) is moved into a position on a conveyor 510 where the dimensional lumber DL is accessible by (e.g., can be picked up by) an automated robot 520. The dimensional lumber DL provided at the upright web loading station 500 can have the same or different dimensions as the dimensional lumber DL provided at the angled web loading station 100. The automated robot 520 can be of any suitable type for grasping and manipulating one or more pieces of the dimensional lumber DL, but in the example embodiment discussed herein is a robotic arm with a grasping end effector (e.g., a grasping and/or suction mechanism) that is configured to detect a position of each piece of dimensional lumber DL on the conveyor 510, to lift the dimensional lumber DL off of the conveyor 510, and to transfer the dimensional lumber DL to the upright web cut station 600. The conveyor 510 receives the dimensional lumber DL from a dimensional lumber source (e.g., a crane, forklift, etc.) and transports the dimensional lumber DL into the position shown in FIG. 8 using one or more driven rollers (e.g., with the remaining rollers being idler rollers). The conveyor 110 may be of any type suitable for the transport of dimensional lumber DL in an automated manner into the position shown in FIGS. 8 and 9 for manipulation by the robot 520. The robot 520 transfers (e.g., individually) the dimensional lumber DL from the conveyor 510 into an automated feed trough 610 of the upright web cut station 600.

The upright web cut station 600 has a controller that receives as an input (e.g., from a measuring device, such as may be provided on the end effector of the robot 520) the length of the dimensional lumber DL deposited into the feed trough 610 by the robot 520. At a position along the feed trough 610, the upright web cut station 600 has a saw 620 (e.g., any suitable device for cutting dimensional lumber) that is movable vertically and/or laterally to cut the dimensional lumber DL into upright web segments having a prescribed length according to the design of the truss element being assembled by the system 1. The dimensional lumber DL is thus loaded into the feed trough 610 and is positionally registered (e.g., using one or more sensors). The position of the dimensional lumber DL along the length of the feed trough 610 is controlled by a linear actuator 630 that is driven along a rail 640 coupled (e.g., attached) to the feed trough 610. The controller instructs the linear actuator 630 to move the dimensional lumber DL along the feed trough 610 by a prescribed distance.

In some embodiments, the dimensional lumber DL may be positionally registered within the feed trough 610 by the linear actuator 630 advancing the dimensional lumber DL through the feed trough 610 to a location where the end of the dimensional lumber DL is detected at a point past the saw 620 where a sensor is located and the saw 620 may be actuated and retracted to cut the dimensional lumber DL, thereby ensuring a sufficiently square end of the dimensional lumber DL for the first upright web segment to be cut from the dimensional lumber DL and also establishing a zero, or "home," position for the dimensional lumber DL within the feed trough 610 relative to the saw 620. The controller then instructs the linear actuator 630 to advance the dimensional lumber DL along the feed trough 610 by a distance corresponding to (e.g., substantially the same as) a length of one of the upright webs used in the truss element being assembled. While the lengths of the upright web segments may be different from each other, it is typical for each of the upright webs in the same truss element to have the same length. The order in which the upright web segments is cut is known by the system 1 so that, when each finished upright web arrives at the finished lumber merge/transfer station 1100, the system 1 can ensure that the upright webs are each placed correctly on the assembly jig 10 (e.g., in the designated position on the assembly jig 10 for an upright web of a prescribed length) for the truss element being assembled.

After the saw 620 cuts the dimensional lumber DL that is positioned within the feed trough 210 to form a plurality of finished upright webs, each of these cut upright web segments is transferred by a delivery trough 710 (e.g., a conveyor) of the upright web delivery station 700. Any scrap pieces of dimensional lumber DL (e.g., pieces that are too short for use as one of the upright webs of the truss element being assembled) are disposed of (e.g., by depositing into a scrap bin at the end of the delivery trough 710 at the finished lumber merge/transfer station 1100. The saw 620 has attached thereto a vacuum hose 625 for evacuation of sawdust and other particulate debris that is generated when the saw 620 is actuated (e.g., vertically and/or laterally, within the cross-section defined by the feed trough 610) for cutting the dimensional lumber DL in the feed trough 610 into the individual finished upright webs, which are then transferred onto the delivery trough 710. In the example embodiment shown, the saw 620 is positioned between the feed trough 610 and the delivery trough 710, such that each of the finished upright webs is transferred directly onto the delivery trough 710 after being cut off the distal end of the dimensional lumber DL by the saw 620.

Operation of the stations of the truss chord production grouping will be discussed hereinbelow, specifically with respect to FIGS. 7-9. At the truss chord loading station 800, dimensional lumber DL (e.g., a plurality of pieces of dimensional lumber that are delivered together as a bundle) is moved into a position on a conveyor 810 where the dimensional lumber DL is accessible by (e.g., can be picked up by) an automated robot 820. The dimensional lumber DL provided at the truss chord loading station 800 can have the same or different dimensions as the dimensional lumber DL provided at the angled web loading station 100 and/or at the upright web loading station 500. The automated robot 520 can be of any suitable type for grasping and manipulating one or more pieces of the dimensional lumber DL, but in the example embodiment discussed herein is a robotic arm with a grasping end effector (e.g., a grasping and/or suction mechanism) that is configured to detect a position of each piece of dimensional lumber DL, to lift the dimensional lumber DL off of the conveyor 810, and to transfer the piece of dimensional lumber DL to the truss chord cut station 900. The conveyor 810 receives the dimensional lumber DL from a dimensional lumber source (e.g., a crane, forklift, etc.) and transports the dimensional lumber DL into the position shown in FIG. 8 using one or more driven rollers (e.g., with the remaining rollers being idler rollers). The conveyor 810 may be of any type suitable for the transport of dimensional lumber DL in an automated manner into the position shown in FIG. 8 for manipulation by the robot 820. The robot 820 transfers (e.g., individually) the dimensional lumber DL from the conveyor 810 into an automated feed trough 910 of the truss chord cut station 900.

The truss chord cut station 900 has a controller that receives as an input (e.g., from a measuring device, such as may be provided on the end effector of the robot 820) the length of the dimensional lumber DL deposited into the feed trough 910 by the robot 820. At a position along the feed trough 910, the upright web cut station 900 has a saw 920 (e.g., any suitable device for cutting dimensional lumber) that is movable vertically and/or laterally to cut the dimensional lumber DL into upright web segments having a prescribed length according to the design of the truss element being assembled by the system 1. The dimensional lumber DL is thus loaded into the feed trough 910 and is positionally registered (e.g., using one or more sensors). The position of the dimensional lumber DL along the length of the feed trough 910 is known and the controller is configured to move the dimensional lumber DL to a position within the feed trough 910 such that the distal end of the dimensional lumber DL is spaced apart, along the length of the feed trough 910, from the saw 920 by a distance corresponding to the length of the finished truss chord being used in assembly of the truss element.

Once the dimensional lumber DL is properly positioned within the feed trough 910, the saw 920 is actuated and retracted to cut the dimensional lumber DL to the prescribed length for the finished truss chord. After the saw 920 cuts the dimensional lumber DL that is positioned within the feed trough 210 to form the finished truss chord(s), each of these finished truss chords is transferred by a delivery trough 1010 (e.g., a conveyor) of the truss chord delivery station 1000. Any scrap pieces of dimensional lumber DL (e.g., pieces that are too short for use as another truss chord of the truss element being assembled) are disposed of. The saw 920 has attached thereto a vacuum hose 925 for evacuation of sawdust and other particulate debris that is generated when the saw 920 is actuated (e.g., vertically and/or laterally, within the cross-section defined by the feed trough 910) for cutting the dimensional lumber DL in the feed trough 910 to form the finished truss chords. In some embodiments, the feed trough 910 and the delivery trough 1010 can be separate from each other and operable independently of each other. In the example embodiment shown, the feed trough 910 and the delivery trough 1010 are different segments, or portions, of the same continuous automated trough.

Any excess lumber segments are discarded and the controller then instructs the feed trough 910 to advance the dimensional lumber DL along the feed trough 910 to the automated delivery trough 1010 of the truss chord delivery station 1000, which then transports the finished truss chords to the finished lumber merge/transfer station 1100. The order in which the finished truss chords are cut is known by the system 1 so that, when each finished truss chord arrives at the finished lumber merge/transfer station 1100, the system 1 can ensure that the truss chords are each placed correctly on the assembly jig 10 (e.g., in the designated position on the assembly jig 10 for a truss chord of a prescribed length) for the truss element being assembled.

At the finished lumber merge/transfer station 1100, as shown in FIGS. 12-14, the finished lumber pieces (e.g., the finished angle webs, the finished upright webs, and the finished truss chords) are transferred from their respective delivery troughs and each is placed in a designated position on an assembly jig 10 at the finished lumber jig placement station 1200. The assembly jig 10 has guidance features attached thereto that aid in proper and precise placement of the respective pieces of finished lumber onto the assembly jig 10 for forming the truss element being assembled. At the finished lumber merge/transfer station 1100, there are a plurality of automated robots 1120 provided for manipulating the finished lumber pieces and moving them from the respective delivery trough onto the assembly jig 10. In the example embodiment shown, there are three (3) automated robots 1120 at the finished lumber merge/transfer station 1100, but a different quantity of such automated robots 1120 may be used without deviating from the scope of the invention disclosed herein. The automated robots 1120 can be of any suitable type for grasping and manipulating one or more of the pieces of finished lumber (e.g., angled webs, upright webs, and/or truss chords), but in the example embodiment discussed herein is a robotic arm with a grasping end effector (e.g., a grasping and/or suction mechanism) that is configured to detect a position of each finished piece of lumber (e.g., angled webs, upright webs, and/or truss chords) in the respective delivery trough (e.g., 410, 710, 1010), to lift one of the finished pieces of lumber out and/or off of the respective delivery trough, and to move and position the finished piece of lumber in a specified location on the assembly jig 10 at the finished lumber jig placement station 1200.

As shown in FIGS. 12-14, the finished lumber merge/transfer station 1100 comprises two (2) web robots 1120W and a truss chord robot 1120T. The web robots 1120W and the truss chord robot 1120T may be different from, or the same as, each other, depending on the anticipated weight of the finished lumber being moved by the robot and/or the anticipated movements (e.g., distances) needed for transferring the finished lumber from the respective trough onto the assembly jig 10. In the example embodiment shown, the truss chord robot 1120T is larger than the web robots 1120W, both due to the increased weight of the finished truss chords compared to the finished angled and upright webs, as well as the increased distance over which the truss chord robot 1120T must move the finished truss chords from the delivery trough 1010 for the finished truss chords to the assembly jig 10.

The web robots 1120W are positioned between the delivery trough 710 for the finished upright webs and the delivery trough 1010 for the finished truss chords. The web robots 1120W receive instructions (e.g., from a controller of the system 1) specifying a next finished angled web or a next finished upright web for placement onto the assembly jig 10 at the finished lumber jig placement station 1200. The web robots 1120W are advantageously operable independent of each other. Each web robot 1120W thus identifies a position/location of either a designated finished angled web within the delivery trough 410 for the finished angled webs or a designated finished upright web within the delivery trough 710 for the finished upright webs, moves its end effector to the location of the identified web element, grasps and lifts the identified web element, and moves and deposits the identified web element onto the designated position on the assembly jig 10. The web robots 1120W continue identifying, moving, and positioning the web elements on the assembly jig 10 until all of the angled webs and upright webs for the truss element being assembled have been placed on the assembly jig 10, as shown in FIG. 12.

The truss robot 1120T is positioned on the opposite side of the delivery trough 1010 of the finished truss chords from the web robots 1120W. The truss robot 1120T receives instructions (e.g., from a controller of the system 1) specifying a next finished truss chord for placement onto the assembly jig 10 at the finished lumber jig placement station 1200. The truss robot 1120T thus identifies a position/location of a designated finished truss chord within the delivery trough 1010 for the finished truss chords, moves its end effector to the location of the identified truss chord, grasps and lifts the identified truss chord, and moves and deposits the identified truss chord onto the designated position on the assembly jig 10. The truss robot 1120T continues identifying, moving, and positioning the truss chords onto the assembly jig 10 until all of the truss chords for the truss element being assembled have been placed on the assembly jig 10, as is also shown in FIG. 12.

The system 1 is configured such that the web robots 1120W and the truss robots 1120T know the position of each other in three-dimensional space, as well as the position of any finished lumber pieces being manipulated by such robots, and are configured to move in unison around each other to avoid impacts of the robots 1120W, 1120T with each other directly, or between the finished lumber and any of the robots 1120W, 1120T during transfer of the finished lumber to the assembly jig 10. Thus, at the finished lumber jig placement station 1200, the robots 1120W, 1120T transport angled webs, upright webs, and truss chords to the corresponding positions on the assembly jig 10, based on instructions received (e.g., from a controller) for the position of each such angled web, upright web, and truss chord for the particular truss assembly being assembled.

Prior to the assembly jig 10 arriving at the finished lumber jig placement station 1200, the assembly jig 10 has a plurality of bottom nail plates (BNPs) positioned thereon at the bottom nail plate (BNP) jig placement station 1500. The BNP jig placement station 1500 is, along with the BNP loading station 1300 and the BNP delivery station 1400, part of the BNP grouping, aspects of which are shown in FIGS. 10-12. A pallet of BNP bundles are provided at the BNP loading station 1300, which comprises an automated robot 1310, which is configured to deliver one of the BNP bundles to a BNP staging area 1420 of the BNP delivery station 1400. The robot 1310 can be of any suitable type for grasping and manipulating one or more bundles of the BNPs, but in the example embodiment discussed herein is a robotic arm with a grasping end effector (e.g., a grasping and/or suction mechanism) that is configured to detect a position of each bundle of BNPs in the pallet of BNPs, to lift the bundles of BNPs off of the pallet, and to transfer the bundle of BNPs to the BNP staging area 1420.

The BNP delivery station 1400 includes the BNP staging areas 1420 and a plurality of automated robots 1410, which can be of any suitable type for grasping and manipulating the BNPs, but in the example embodiment discussed herein is a robotic arm with a grasping end effector (e.g., a grasping and/or suction mechanism) that is configured to detect a position of each BNP in the bundle of BNPs delivered to the BNP staging area 1420 with which the robot 1410 is associated and to transfer BNPs, either individually or sequentially from the bundle of BNPs, onto the assembly jig 10 at the BNP jig placement station 1500. Each BNP is positioned on the assembly jig 10 in a designated location by one of the robots 1410, based on instructions received (e.g., from a controller) by the robot 1410 dictating the placement positions of each of the BNPs on the jig assembly 10 for the truss element being assembled. The BNP staging areas 1420 each comprise a table 1422 and walls 1424 that form a right angle to positionally locate the bundle of BNPs that are transferred onto the table 1422 of the BNP staging area by the robot 1310 of the BNP loading station 1300. The BNP staging areas 1420 also comprise linear actuators 1426 that are axially extendable for pressing the bundle of BNPs against the walls 1424 to positionally register the bundle of BNPs on the table 1422, so that the BNPs can be retrieved by the corresponding robot 1410 from the positionally registered location on the table 1422. The BNPs are plates that are formed in a unitary, or monolithic, manner and comprise a plurality of protrusion elements that extend away from a base plate structure, in the manner of a plurality of nails or other fasteners, and are configured for driving through one of the truss chords into one or more of the angled and/or upright webs on the assembly jig 10 for rigidly attaching together the truss chord and the angled and/or upright webs, through which such BNP is pressed (e.g., at the nail plate press station 1900).

After the placement of the BNPs onto the designated locations of the assembly jig 10, the assembly jig 10 is moved along conveyors 1550 to the finished lumber jig placement station 1200 for placement of the finished angled webs, upright webs, and truss chords onto the assembly jig 10. Thus, all of the lumber used in forming the truss element is in position on the assembly jig 10 before the assembly jig 10 is transported to the TNP jig placement station 1800.

Figure 16:
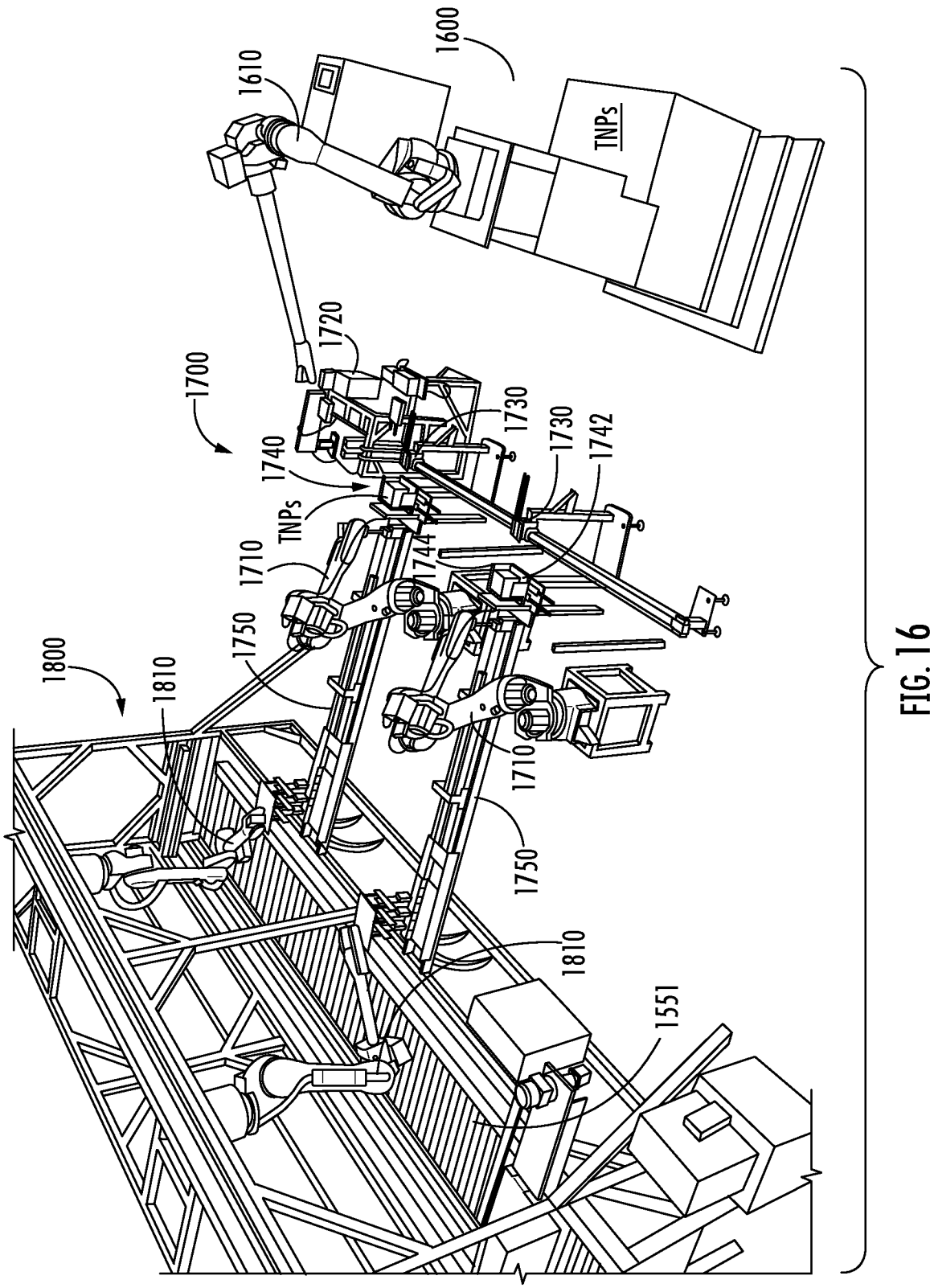
Figure 17:
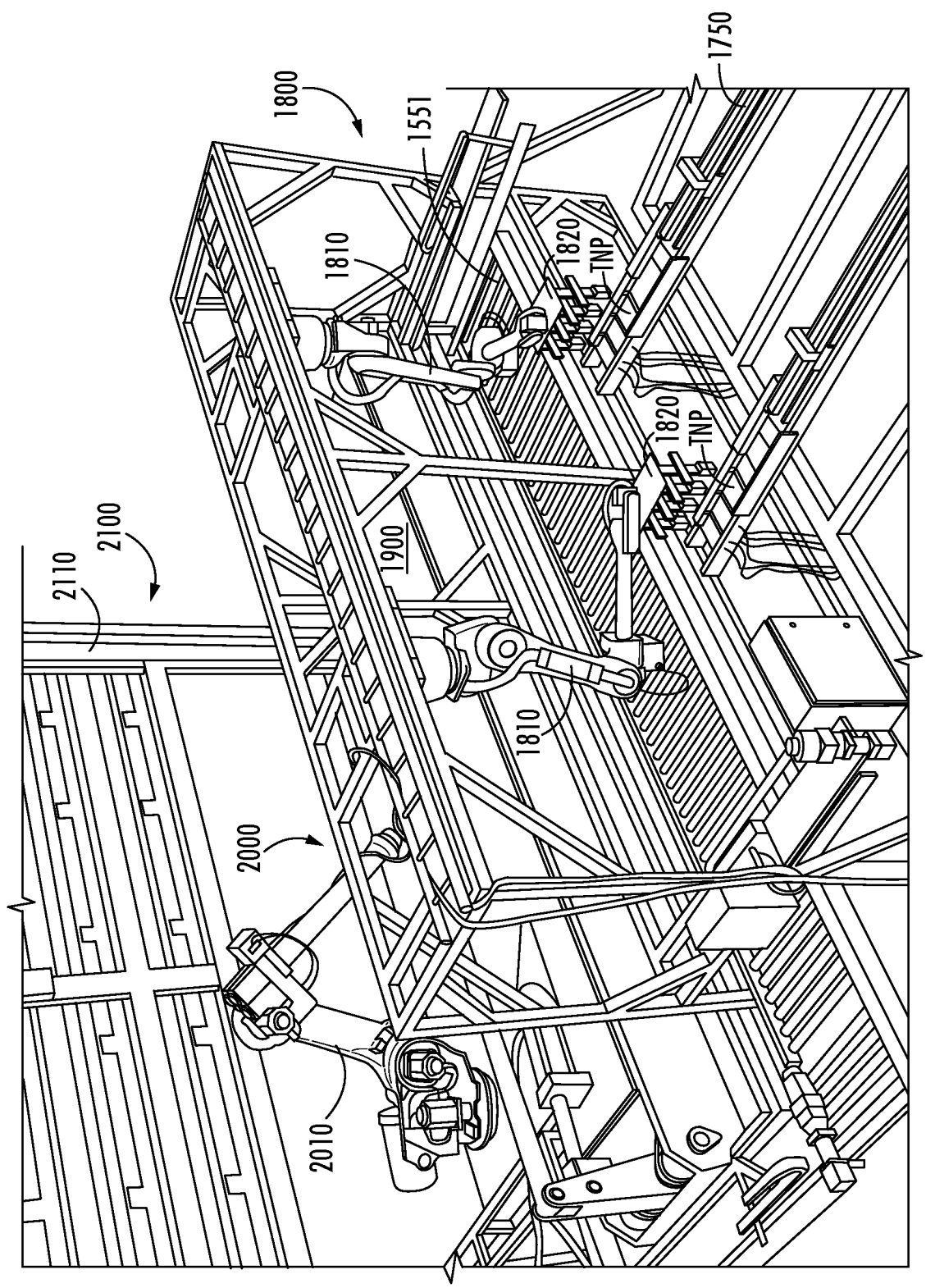
Figure 18:
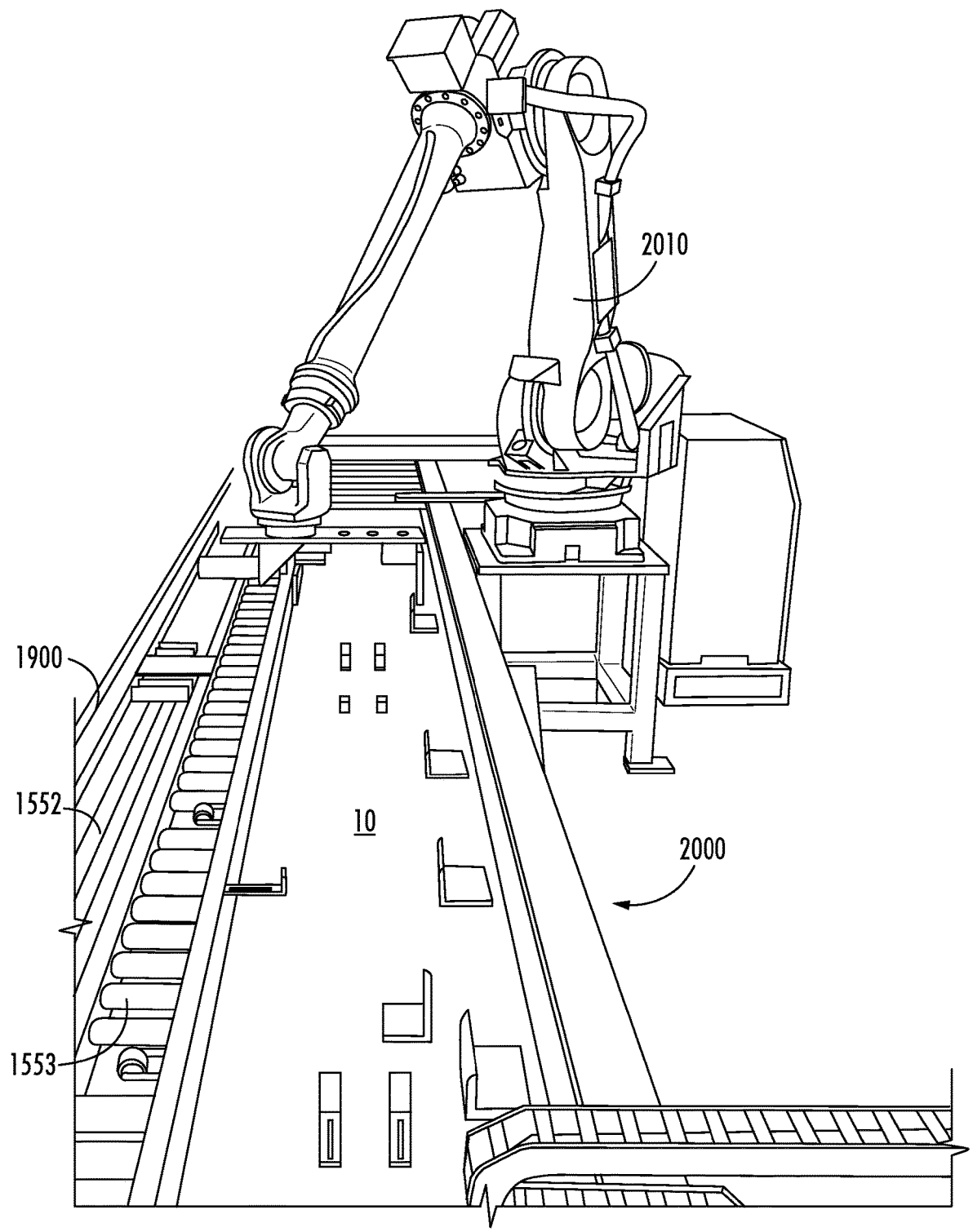
Figure 19:
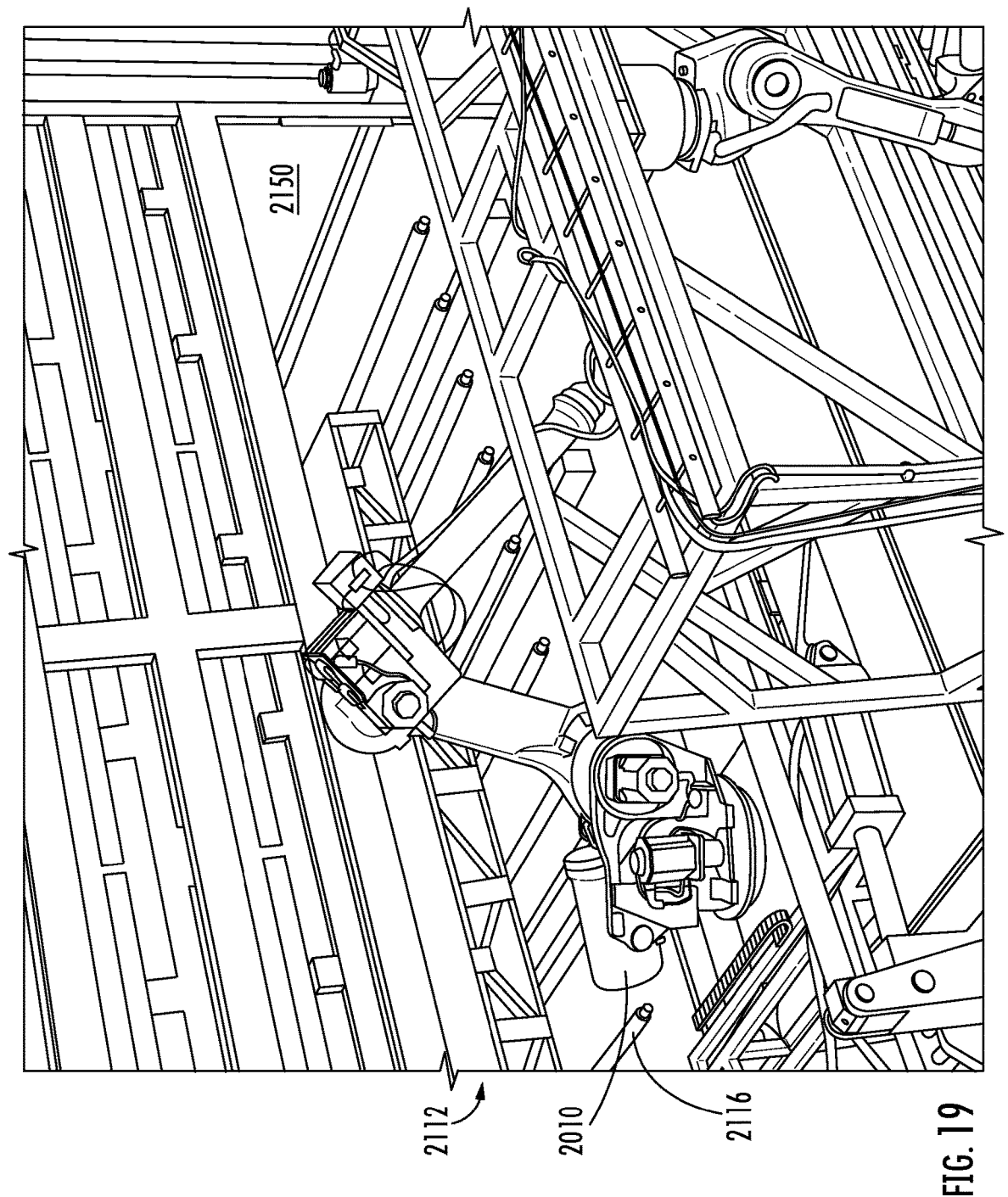

After the truss chords and the angled and upright webs have been positioned on the assembly jig 10 at the finished lumber jig placement station 1200, the assembly jig 10 is transferred along a conveyor 1551 to the top nail plate (TNP) jig placement station 1800. The TNP jig placement station 1800 is, along with the TNP loading station 1600 and the TNP delivery station 1700, part of the TNP grouping, aspects of which are shown in FIGS. 15-17. A pallet of TNP bundles is provided at the TNP loading station 1600, which comprises an automated robot 1610, which is configured to deliver one of the TNP bundles to a TNP staging area 1720 of the TNP delivery station 1700. The robot 1610 can be of any suitable type for grasping and manipulating one or more bundles of the TNPs, but in the example embodiment discussed herein is a robotic arm with a grasping end effector (e.g., a grasping and/or suction mechanism) that is configured to detect a position of each bundle of TNPs in the pallet of TNPs, to lift the bundles of TNPs off of the pallet, and to transfer the bundle of TNPs to the TNP staging area 1720.

The TNP delivery station 1700 includes the TNP staging areas 1720 and a plurality of automated robots 1710, which can be of any suitable type for grasping and manipulating the TNPs, but in the example embodiment discussed herein is a robotic arm with a grasping end effector (e.g., a grasping and/or suction mechanism) that is configured to detect a position of each TNP in the bundle of TNPs delivered to the TNP staging area 1720 with which the robot 1710 is associated and to transfer TNPs, either individually or sequentially from the bundle of TNPs, onto the TNP delivery rail 1750. The TNP staging area 1720 is an electromechanical assembly configured for receiving bundles, or stacks, of TNPs from the robot 1610 and distributing these TNP stacks to one of the TNP loaders 1730, from which the TNP stacks are loaded onto the TNP registration areas, generally designated 1740. The TNP registration areas comprise a bottom surface 1742 and two wall 1744, against which the TNP stacks are pressed (e.g., via linear actuators) to ensure that the TNP stacks are positionally registered in a known, or zero, position, for lifting by the robots 1710 onto the TNP delivery rail 1750, which moves the TNPs (e.g., individually) towards the conveyor 1551 at the TNP jig placement station 1800.

At the TNP jig placement station 1800, there are automated robots 1810 that are configured to grasp and manipulate the TNPs (e.g., by lifting the TNPs off of the TNP delivery rail 1750). The robots 1810 can be of any suitable type for grasping and manipulating the TNPs, but in the example embodiment discussed herein is a robotic arm with a grasping end effector (e.g., a grasping and/or suction mechanism) that is configured to detect a position of each TNP on the TNP delivery rail 1750 with which the robot 1810 is associated and to transfer the TNPs, individually, sequentially, in multiples, etc. from the TNP delivery rail 1750 onto the assembly jig 10 at the TNP jig placement station 1800. Each TNP is positioned via one of the robots 1810 on the assembly jig at the TNP jig placement station 1800, in a designated location by one of the robots 1710, based on instructions received (e.g., from a controller) by the robot 1710 dictating the placement positions of each of the TNPs on the jig assembly 10 for the truss element being assembled. The TNP staging areas 1720 each comprise a table 1722 and walls 1724 that form a right angle to positionally locate the bundle of TNPs that are transferred onto the table 1722 of the TNP staging area by the robot 1610 of the TNP loading station 1600. The TNP staging areas 1720 also comprise linear actuators 1726 that are axially extendable for pressing the bundle of TNPs against the walls 1724 to positionally register the bundle of TNPs on the table 1722, so that the TNPs can be retrieved by the corresponding robot 1710 from the positionally registered location on the table 1722. The TNPs are plates that are formed in a unitary, or monolithic, manner and comprise a plurality of protrusion elements that extend away from a base plate structure, in the manner of a plurality of nails or other fasteners, and are configured for driving through one of the truss chords into one or more of the angled and/or upright webs on the assembly jig 10 for rigidly attaching together the truss chord and the angled and/or upright webs, through which such TNP is pressed (e.g., at the nail plate press station 1900).

After all of the components from which the truss element is formed (e.g., one or more angled webs, one or more upright webs, truss chords, BNPs, and TNPs) have been positioned on the assembly jig 10 in their designated positions, the assembly jig 10 is transferred along a set of conveyors 1552 to the nail plate pressing station 1900, as shown in FIGS. 15 and 17. In the nail plate pressing station 1900, the BNPs and the TNPs that are positioned about the truss chords are pressed (e.g., by press plates) into and through the truss chords and into the upright webs and/or the angled webs to rigidly interconnect the truss chords with the angled and upright webs to form a finished, or complete, truss element. The BNPs and the TNPs are advantageously pressed flush with (e.g., coplanar with) the outer surface of the truss chord through which the BNPs or the TNPs, respectively, are driven by the press plates.

After the finished truss element is produced within the nail plate pressing station 1900, the assembly jig 10 with the finished truss element thereon is transported by the set of conveyors 1552 to the finished truss unloading station 2000, which comprises a conveyor 1553 and an automated robot 2010 configured to unload the finished truss element from the assembly jig 10 and to transfer the finished truss element to the finished truss storage station 2100. The robot 2010 can be of any suitable type for grasping and manipulating the finished truss element, but in the example embodiment discussed herein is a robotic arm with a grasping end effector (e.g., a grasping and/or suction mechanism) that is configured to detect a position of the finished truss element on the assembly jig 10, to lift the finished truss element off of the assembly jig 10, and to transfer the finished truss element to the finished truss storage station 2100. The truss storage station 2100 can, in some embodiments, be omitted entirely and/or modified into any suitable storage or staging area for finished truss elements after their assembly by the system 1. In the example embodiment shown, the finished truss storage station 2100 comprises a multi-level storage rack 2110, such that, for example, finished truss elements of different dimensions can be stored on different levels of the multi-level storage rack 2110. In the example embodiment shown, the multi-level storage rack 2110 has an induction level 2112, into which the finished truss elements are directly deposited by the robot 2010 of the finished truss unloading station 2000.

The induction level 2112 comprises at least two independently operable conveyors, namely, an induction conveyor 2114 and a transport conveyor 2116. As the finished truss elements are being produced by the system 1, the robot 2010 places each of the finished truss elements sequentially onto the induction conveyor 2114, which moves the finished truss elements in a first direction and, optionally, positionally registers the finished truss elements against a stop plate on a distal side of the induction level 2112 in the first direction, such that each subsequently deposited finished truss element is abutted against a previously deposited finished truss element to form a laterally-extending "stack," or bundle, of finished truss elements within the induction level 2112. After the system 1 has built all of the designated quantity of finished truss elements of a single size or, alternately, after the induction level 2112 is full and cannot receive any additional finished truss elements therein, the rotating platforms (e.g., belts, chains, rollers, etc.) that form the induction conveyor 2114 move vertically downward (e.g., to a position entirely below the plane defined by the rollers of the transport conveyor 2116), such that the stack of finished truss elements is directly resting on (e.g., only on) the rollers of the transport conveyor 2116, which is configured to move the stack of finished truss elements in a second direction, which is a different direction from (e.g., perpendicular to) the first direction, onto a truss elevator 2150. After the stack of finished truss elements have been transferred to the truss elevator 2150, the rotating platforms that form the induction conveyor move vertically upward (e.g., to a position in which the upper surface of the rotating platforms of the induction conveyor 2114 are above the plane defined by the rollers of the transport conveyor 2116) to receive further finished truss elements from the robot 2010 at the finished truss unloading station 2000.

The truss elevator 2150 raises the stack of finished truss elements, based on the physical characteristics of the finished truss elements produced by the system 1, to a designated level within the multi-level storage rack 2110 for the storage of the stack of finished truss elements until it is requested for such stack of truss elements to be retrieved from the multi-level storage rack 2110. The truss elevator 2150 comprises a plurality of rollers that are configured to move the stack of finished truss elements in the second direction (e.g., forward and backward in the second direction) for loading the stack of finished truss elements onto one of the levels of the multi-level storage rack 2110 for storage or off of one of the levels of the multi-level storage rack 2110 for retrieval. The truss elevator 2150 is also configured to move vertically between the various levels of the multi-level storage rack 2110. The truss elevator 2150, upon receipt of a command from a controller, retrieves a stack of truss elements from a designated level of the multi-level storage rack 2110, on which the stack of finished truss elements is indicated (e.g., in a database) as being stored. The truss elevator 2150 then is configured to lower the designated stack of finished truss elements from the level on the multi-level storage rack 2110 where it was stored to a transport level (e.g., coplanar with the induction level 2112) and then is configured to transport (e.g., using a plurality of rollers, which may be any combination of drive and idler rollers, including exclusively driven rollers) the stack of finished truss elements to another system for use in construction of, for example, modular building units.

Thus, the truss elevator 2150 and the multi-level storage rack 2110 of the finished truss storage station 2100 provide a storage area for the finished truss elements that are not designated for immediate use in another system (e.g., an automated construction system).

At the finished truss unloading station 2000, after the robot 2010 has removed the finished truss element from the assembly jig 10, the assembly jig 10 is transported along the conveyor 1553 to return to the BNP jig placement station 1500, such that the assembly jig can be used in assembling a further truss element in a repeated manner. The direction of movement of the assembly jigs 10 between the various stations of the system 1 is shown generally in FIG. 20 as being in the counterclockwise direction. As shown, the assembly jig 10 receives, at the BNP jig placement station 1500, BNPs in the designated positions for the truss element being assembled. The assembly jig 10 is then transported, via the set of conveyors 1550, to the finished lumber jig placement station 1200, where the angled webs, upright webs, and truss chords are positioned on the assembly jig 10. After the finished lumber jig placement station 1200, the assembly jig 10 is transported along the conveyor 1551 to the TNP jig placement station 1800, where the assembly jig 10 receives TNPs in the designated positions for the truss element being assembled. The assembly jig 10 is then transported, via the set of conveyors 1552, to the nail plate press station 1900, where the BNPs and the TNPs are pressed through the truss chords and into various of the angled webs and/or upright webs, for rigidly interlocking the angled webs, the upright webs, and the truss chords together, thereby producing a finished truss element. After the finished truss element is produced at the nail plate press station 1900, the set of conveyors 1552 continue to transport the assembly jig 10, with the finished truss element still supported thereon, onto the conveyor 1553 at the finished truss unloading station 2000, where the robot 2010 unloads the finished truss element from the assembly jig 10 for use or storage (e.g., at the finished truss storage station 2100. After the finished truss element has been unloaded from the assembly jig 10 at the finished truss unloading station 2000, the conveyor 1553 transports the empty assembly jig back to the BNP jig placement station 1500, where the truss element assembly process starts again by the placement of the BNPs onto the assembly jig in the designated positions for the truss element being assembled. This counterclockwise movement of the assembly jigs 10 is repeated until a desired quantity of finished truss elements has been assembled. While only a single assembly jig 10 is shown moving between the various stations (e.g., 1500, 1200, 1800, 1900, 2000) for simplicity of illustration and description, a plurality of assembly jigs 10 may be used simultaneously (e.g., one at every station). In some embodiments, four assembly jigs 10 can be in use at a given time, such that one of the stations (e.g., 1500, 1200, 1800, 1900, 2000) may be "empty" (e.g., not have an assembly jig 10) at any given time; as the assembly jigs 10 move from station-to-station, the "empty" station will necessarily change in a counterclockwise direction as well.

An alternate embodiment for a truss lumber placement station, designated 2200, is schematically illustrated by the region outlined in broken lines, as shown in FIG. 21, with various aspects of the truss lumber placement station 2200 being shown in FIGS. 22-24. As shown in FIG. 21, the truss lumber placement station 2200 extends over the conveyors 1550 and also over the region in which the truss lumber placement station 1200 is located, as shown in FIG. 10. This region in which the truss lumber placement station is located in the embodiment shown in FIG. 10 is, as shown in FIGS. 22 and 24, utilized as a staging area, generally designated 1201. As shown in FIGS. 22 and 24, the truss lumber placement station 2200 comprises a frame 1210 that is positioned around and, at least in part, vertically above the staging area 1201 and at least a portion of each of the conveyors 1550. An automated robot 2300 is attached (e.g., rigidly, or fixedly) to an upper portion of the frame 2210 that is, as shown, vertically above (e.g., directly over) the conveyors 1550. An assembly shelf 2220 is attached (e.g., rigidly, or fixedly) to a lower portion of the frame 2210 that is, as shown, vertically above (e.g., directly over) the staging space 1201. When the assembly jig 10 is held within the staging area 1201, the assembly jig 10 is on the conveyor 1551, which will transport the assembly jig 10 to the TNP jig placement station 1800 upon receipt of a signal (e.g., from a controller). Thus, at least a portion of the conveyor 1551 is positioned within the staging area 1201.

The alternate embodiment in which the system comprises the truss lumber placement station 2200 is advantageous, in some instances, for aiding in proper and precise positioning of the truss chords, angled webs, and upright webs on the assembly jig 10, on which the BNPs are already positioned. Among the reasons for this is the inherently large dimensional variance of dimensional lumber from its nominal dimensions. Because of this dimensional variance of lumber, even in the finished cut forms of the angled webs, upright webs, and truss chords provided by other components of the system 1 at the truss lumber merge/transfer station 1100, these finished pieces of lumber are optimally slid against a surface (e.g., of the assembly jig 10) against other adjacent pieces of the truss lumber to account for dimensional variances of the lumber. However, this sliding of the finished lumber pieces is not possible directly on the assembly jig 10, since the BNPs are already positioned on the assembly jig 10 and, therefore, any sliding of the finished lumber pieces on the assembly jig 10 would result in a movement and, necessarily, a misalignment, of the BNPs already positioned on the assembly jig 10. Thus, in the truss lumber jig placement station 1200, the finished truss lumber pieces are placed (e.g., in a vertical direction) directly onto the assembly jig 10 without any lateral (e.g., sliding) movement, which can result in finished truss elements that, while structurally sound, can have gaps between adjacent pieces of lumber in the finished truss element.

As such, in the example embodiment shown in FIGS. 21-24, the finished pieces of truss lumber (e.g., angled webs, upright webs, and truss chords) are positioned on the assembly shelf 2220 and transferred (e.g., in unison) by the robot 2300 onto the assembly jig 10 at the same time. The assembly shelf 2220 is positioned vertically above a portion of the conveyor 1551, such that a space, referred to herein as the staging area 2201, is defined between the conveyor 2201 and the assembly shelf 2220. By assembling the finished pieces of truss lumber into the configuration designated for the finished truss element directly on the assembly shelf 2220, the robot 2300 can grasp and transfer all of the angled webs, upright webs, and truss chords at the same time and transfer them onto (e.g., vertically) the assembly jig 10 and, necessarily, directly onto the BNPs already on the assembly jig 10, while the assembly jig 10 is on the conveyors 1550.

Various aspects of the example embodiment of the assembly shelf, generally designated 2220 in FIG. 23, are shown therein, but the subject matter disclosed herein is not limited to this specific embodiment. The shelf 2220 comprises a base 2222, onto which the finished pieces of truss lumber (angled webs, upright webs, and truss chords) are deposited (e.g., directly) by the robots 1120W, 1120T of the truss lumber merge/transfer station 1100. These finished pieces of truss lumber are deposited by the robots 1120W, 1120T in the same configuration (e.g., an "assembled configuration") in which they will be rigidly interconnected (e.g., by the BNPs and/or TNPs) in the finished truss element, such that there is substantially no relative movement between the finished pieces of truss lumber after they have been removed in unison from the assembly shelf 2220 by the robot 2300. The assembly shelf 2220 further comprises, attached to the base 2222 and/or the frame 2210, clamping/squaring devices, generally designated 2230. These clamping/squaring devices 2230 comprise a cleat 2232 (e.g., a bracket with a surface that is substantially flat and/or extends substantially vertically, such as perpendicular to the plane defined by the base 2222) and an actuator 2234 (e.g., a linear actuator) that is connected to the cleat 2232.

The assembly shelf 2220 also comprises a wall 2226, which is connected (e.g., rigidly or in a mobile manner) to the base 2222. The wall 2226 can have any suitable orientation and height but, in the example embodiment shown in FIG. 23, extends in a vertical direction (e.g., perpendicular to the plane defined by the base 2222). Thus, when all of the finished pieces of truss lumber have been positioned by the robots 1120W, 1120T on the base 2222 in the assembled configuration for the truss element being assembled, the linear actuators 2234 are activated and extend to drive a respective one of the cleats 2232 against the finished pieces of truss lumber in the assembled configuration and, specifically, against a finished truss chord. The cleat 2232 is extended until one edge of the unassembled truss element defined by the finished pieces of truss lumber in the assembled configuration is pressed (e.g., directly) against the wall 2226 and the other edge of the unassembled truss element is pressed (e.g., directly) against the cleats 2232. Thus, the unassembled truss element is compressed between the cleats 2232 and the wall 2226 by the extension of the cleats 2232 caused by the activation of the actuators 2234.

The assembly shelf 2220 also comprises a slot, generally designated 2224, which extends in a length direction of the unassembled truss element on the base 2222. Positioned within this slot 2224 are a plurality of web clamps, generally designated 2250. The web clamps 2250 are advantageously installed in a movable manner within the slot 2224 and, particularly advantageously, are each configured to adjust their position along the slot 2224 in an automated manner based on the dimensions and configuration of the truss element being assembled. In some embodiments, the position of the web clamps 2250 may be altered in a manual and/or automated manner. The web clamps 2250 each comprise an opposing pair of brackets 2252 that are spaced apart from each other (e.g., in the direction of extension of the slot 2224). The pair of brackets 2252 are connected to an actuator 2242, which is configured to move the brackets 2252 relative to each other, such that a distance between the brackets 2252 can be changed, thereby allowing a web (e.g., an upright web) to be clamped between opposing brackets 2252 to prevent a lateral movement (e.g., in the direction of extension of the slot 2224) of the web positioned between the brackets 2252 of one of the web clamps 2250 while the clamping/squaring devices 2230 are activated to compress the unassembled truss element between the cleats 2232 and the wall 2226. Thus, the upright webs positioned between the brackets 2252 are capable of moving in the direction of extension of the cleats 2232 and are not rigidly held by the brackets 2252 except in the direction of extension of the slot 2224. The web clamps 2250 are, in some embodiments, servo-controlled. The web clamps 2250 thus allow the robots 1120W, 1120T to deposit the finished pieces of truss lumber on the base 2222 in a rough, or approximate, position, thereby allowing for dimensional tolerances in the finished pieces of truss lumber to be accounted for, since the robots 1120W, 1120T do not have to place the finished pieces of truss lumber on the base 2222 with a great deal of precision.

Once all of the finished pieces of truss lumber are positioned on the base 2222, the brackets 2252 are moved to the precise position designated for the upright web for the truss element being assembled and (e.g., subsequently) the cleats 2232 are extended to compress the unassembled truss elements against the wall 2226, which causes the finished pieces of truss lumber to be pressed (e.g., directly) against each other and to ensure a proper orientation of the finished pieces of truss lumber relative to each other; specifically, a substantially square (e.g., 90°) orientation between the upright webs and the truss chords is provided by compressing the finished pieces of truss lumber between the cleats 2232 and the wall 2226 while the upright webs are held in place between the brackets 2252. Since there are no BNPs positioned on the base 2222, this sliding alignment of the finished pieces of truss lumber to form the unassembled truss element is possible.

After the finished pieces of truss lumber are assembled in the configuration specified by the truss element being assembled to form the unassembled truss element, the robot 2300 engages the entire unassembled truss element and lifts the entire unassembled truss element off of the assembly shelf 2220. To accomplish this, the robot 2300 comprises a truss-lifting end effector 2350, which comprises a frame 2350 and a plurality of actuators arranged around a perimeter of the frame 2350. When transporting the unassembled truss element from the assembly shelf 2220 to the assembly jig 10 on the conveyors 1550, the frame 2350 is positioned around the perimeter of the unassembled truss element on the assembly shelf 2220 and the actuators are activated to rigidly clamp (e.g., by engaging directly against the finished truss chords) the finished pieces of truss lumber in the unassembled truss element in the configuration for the truss element being assembled. Thus, the finished pieces of truss lumber in the unassembled truss element are held (e.g., frictionally) by the actuators attached to the frame 2350 in the configuration for the truss element being assembled before the finished pieces of truss lumber in the unassembled truss element are lifted off of the assembly shelf 2220, while the finished pieces of truss lumber in the unassembled truss element are lifted off of the assembly shelf 2220, while the finished pieces of truss lumber in the unassembled truss element are moved between the assembly shelf 2220 and the assembly jig 10 on the conveyors 1550, and while the finished pieces of truss lumber in the unassembled truss element are deposited vertically onto the assembly jig 10 on the conveyors 10. The finished pieces of truss lumber in the unassembled truss element are deposited (e.g., directly) onto the BNPs already loaded onto the assembly jig at the BNP jig placement station 1500 and the actuators of the frame 2300 are retracted, such that the finished pieces of truss lumber in the unassembled truss element are no longer compressed against each other. Thus, the finished pieces of truss lumber in the unassembled truss element are positioned precisely onto the assembly jig 10 by the robot 2300 and the assembly jig 10 is then moved into the staging area 1201 underneath the assembly shelf 2220. From the staging area 1201, the assembly jig is transported to the TNP jig placement station 1500 and assembly of the truss element proceeds as described elsewhere herein (e.g., TNPs are positioned onto the finished pieces of truss lumber in the unassembled truss element at the TNP jig placement station 1800, the BNPs and TNPs are driven into the finished pieces of truss lumber in the unassembled truss element within the nail plate press station 1900, and the finished truss element is unloaded from the assembly jig 10 at the finished truss unloading station 2000.

FIG. 25 is a partial view of an example embodiment of an assembly jig 10 suitable for use with the system 1 in producing truss elements. In FIG. 25, a finished truss element is shown positioned on the assembly jig 10. The assembly jig 10 comprises a plate 12, on which the finished pieces of truss lumber are arranged, and by which the finished pieces of truss lumber are supported. An alignment block 20 is rigidly attached to the plate 12 and/or the walls 14 and has an alignment hole 22 formed through the entire thickness of the alignment block 20 (e.g., in the direction perpendicular to the plane defined by the plate 12). The plate 12 has an opening (e.g., a hole that is the same size or larger than the alignment hole 22) formed therein and aligned with the alignment hole 22 so that an alignment pin (e.g., 2420, FIG. 26) can be inserted through the alignment hole 22 from the direction of the plate 12, relative to the alignment block 20.

As shown in FIG. 25, the BNPs are positioned directly against the plate 12, the angled webs AW, the upright webs UW, and the truss chords TC are spaced apart from the plate 12 by the BNPs and the TNPs are positioned on the opposite side of the angled webs AW, the upright webs UW, and the truss chords TC from the side on which the BNPs are arranged. In order to maintain proper alignment of the finished pieces of truss lumber in the unassembled truss element (e.g., before the nail plate press station 1900), the assembly jig 10 comprises stops 16 and clamps 18, which compress the finished pieces of truss lumber in the unassembled truss element between the clamps 18 and the stops 16. In some embodiments, the clamps 18 and/or the stops 16 can be omitted from the assembly jig 10. The clamps 18 can be actuated, for example, pneumatically or hydraulically. The clamps 18 are actuated after the finished pieces of truss lumber in the unassembled truss element are deposited onto the assembly jig 10 by the robot 2300 on the conveyors 1550 and, advantageously, remain actuated until the finished truss element is formed at the nail plate press station 1900, after which the clamps 18 are retracted to allow for removal of the finished truss element from the assembly jig 10 at the finished truss unloading station 2000.

To ensure precise positioning of the assembly jig 10 at each of the stations (e.g., the truss wood placement station 1200, 2200, the BNP placement station 1500, the TNP placement station 1800, the nail plate press station 1900, and/or the finished truss unloading station 2000), one or more tapered alignment pins (e.g., 2420, FIG. 26) may be utilized at each such station for insertion into one or more corresponding locating holes that are formed in the assembly jig 10. FIG. 26 shows such engagement of one of the alignment pins 2420 within an alignment hole 22 at the truss wood placement station 2200. Thus, the tapered pins 2420 are axially extended (e.g., in the vertical direction of FIG. 26) to ensure precise alignment of the assembly jig on the conveyors 1550 for placement of the unassembled truss element onto the assembly jig 10 by the robot 2300. After the unassembled truss element is transferred onto the assembly jig 10, the alignment pins 2420 are retracted so that the assembly jig 10 can be moved by the conveyors 1550 onto the conveyor 1551 in the staging area 2201.

Referring now to FIG. 26, the robot 2300 is shown using the truss-lifting end-effector 2350 to place the unassembled truss elements onto the assembly jig 10 at the truss wood placement station 2200. In this view, the conveyors 1550 are not shown to illustrate other features of the truss wood placement station 2200 with greater clarity. For example, in order to provide gross positional alignment of the alignment jig 10 on the conveyors 1550, a stop plate 2400 is provided, which is operably attached to an actuator 2410 (e.g., a linear actuator) that is configured to move the stop plate 2400 vertically between an extended position and a retracted position. In the extended position, the stop plate 2400 extends above the uppermost plane of the transport surface (e.g., of the rollers, a belt, etc.) of the conveyors 1550 to contact (e.g., directly) the assembly jig 10 and prevent a movement of the assembly jig 10 beyond the stop plate 2400. In the retracted position, the stop plate 2400 is retracted beneath the uppermost plane of the transport surface (e.g., of the rollers, a belt, etc.) of the conveyors 1550, such that the assembly jig 10 can move along the conveyors 10 past the stop plate 2400 without making contact with the stop plate 2400. Advantageously, at least two stop plates 2400 are provided at the truss wood placement station 2200 and are spaced out (e.g., adjacent to different conveyors 1550) such that multiple points on the assembly jig 10 are contacted by the stop plates 2400. The movement of each of the alignment pins 2420 in the vertical direction is controlled via an actuator to which the alignment pin is rigidly attached, as shown in FIG. 26.

The truss-lifting end-effector 2350 is connected to the robot 2300 via a bracket 2340. In the example embodiment shown, the attachment of the truss-lifting end-effector 2350 to the bracket 2340 is accomplished via a spring-biased sliding rod engagement, such that damping in the direction of compression of the unassembled truss element is provided between the bracket 2340 and the truss-lifting end-effector 2350, which advantageously maintains a more consistent compression force on the unassembled truss element by the truss-lifting end-effector 2350. However, in some embodiments, a different type of attachment between the bracket 2340 and the truss-lifting end-effector 2350 can be provided.

The truss-lifting end-effector 2350 comprises a frame 2352, to which the bracket 2340 is connected. The frame comprises vertically-extending walls 2354 and brackets 2356. The brackets 2356 have attached thereto an actuator 2358 (e.g., a linear actuator) which is extendable in a direction towards the vertically-extending walls 2354. The vertically-extending walls 2354 are aligned with the brackets 2356. In some embodiments, the quantity of brackets 2356 and the quantity of the vertically-extending walls 2354 are the same. In some embodiments, the quantity of brackets 2356 and the quantity of the vertically-extending walls 2354 are different. Each actuator 2358 is connected at a distal end to at least one slider 2360, which is movable along a rod rigidly attached to the frame. It is advantageous, in order to ensure proper alignment and avoid inducing moments of rotation, for each actuator 2358 to be attached to two sliders 2360, which are positioned, respectively, on opposite sides of the actuator 2358. The sliders 2360 are connected (e.g., rigidly and/or directly) to a plate 2362, which extends in a plane that is substantially parallel to the plane defined by the frame 2353 of the truss-lifting end-effector 2350. The rods 2350 extend in the same direction as the direction of extension of the actuator 2358, such that the plate 2362 is also movable in the same direction as the direction of extension of the actuator 2358 to which the plate 2362 is attached. There is a push bar 2364 that is attached (e.g., rigidly, as a monolithic structure) at the distal end (e.g., the end closest to the vertically-extending walls 2354 on the opposite side of the frame 2352) of the plate 2362. The push bar 2364 comprises a substantially planar surface, which is the surface that directly contacts the unassembled truss element during movement between the assembly shelf 2220 and the assembly jig 10 via the truss-lifting end-effector 2350.

The push bars 2364 each extend in a substantially vertical direction to engage against one of the truss chords of the unassembled truss element during movement between the assembly shelf 2220 and the assembly jig 10. Via extension of each actuator 2358, the sliders 2360 move along the rods and, necessarily, the plates 2362 and the push bars 2364 move simultaneously (e.g., in unison) in the direction towards the vertically-extending walls 2354 to compress the unassembled truss element between the vertically-extending walls and the push bars 2364 for transfer in unison of all of the angled webs, upright webs, and truss chords that form the unassembled truss element from the assembly shelf 2220 to the assembly jig at the truss wood placement station 2200 (e.g., on the conveyors 1550). Via retraction of each actuator 2358 (e.g., in the direction opposite the extension direction of such actuator 2358), the sliders 2360 move along the rods and, necessarily, the plates 2362 and the push bars 2364 move simultaneously (e.g., in unison) in the direction away from the vertically-extending walls 2354 to release the unassembled truss element onto the assembly jig 10 (e.g., directly onto the BNPs already in position on the assembly jig 10). The actuators 2358 are retracted only when the unassembled truss element is in contact with the assembly jig 10 (e.g., with only the BNPs positioned between the assembly jig 10 and the unassembled truss element), such that assembly jig 10 can be moved via the conveyors 1550 into the staging area 2201 and another assembly jig 10 can be transferred from the BNP jig placement station 1500 into the position shown in FIGS. 21, 24, and 26 on the conveyors 1550 at the truss wood placement station 2200, and the robot 2300 returns to the assembly shelf 2220 to pick up another unassembled truss element that was assembled simultaneous with the previous transfer of the unassembled truss element from the assembly shelf onto the assembly jig 10 via the robot 2300. Thus, the operations at each of the truss wood placement station 1200, 2200, the BNP placement station 1500, the TNP placement station 1800, the nail plate press station 1900, and/or the finished truss unloading station 2000 are performed simultaneous on a plurality of assembly jigs 10, each such station having a different assembly jig 10 positioned there.

The vertically-extending walls 2354 extend beneath the frame 2352 and, advantageously, at least to within a same horizontal plane as a portion of the push bars 2364. In some embodiments, the vertically-extending walls 2354 extend at least in a vertical direction to or below a horizontal plane defined by a bottom surface of the push bars 2364. In some embodiments, the bottom surface of each of the vertically-extending walls 2354 is substantially coplanar with the bottom surface of each of the push bars 2364.

The invention claimed is:

1. An automated system for manufacturing truss elements for use in modular construction units, the system comprising:
   an angled web grouping of stations configured to receive and cut dimensional lumber to form angled webs for use in assembly of the truss elements;
   an upright web grouping of stations configured to receive and cut dimensional lumber to form upright webs for use in assembly of the truss elements;
   a truss chord grouping of stations configured to receive and cut dimensional lumber to form truss chords for use in assembly of the truss elements;
   a finished lumber merge/transfer station, which is configured to:
      receive the angled webs from the angled web grouping of stations, the upright webs from the upright web grouping of stations, and the truss chords from the truss chord grouping of stations; and
      transfer the angled webs, the upright webs, and the truss chords onto an assembly jig at a finished lumber jig placement station;

a bottom nail plate (BNP) grouping of stations configured to receive and position BNPs onto the assembly jig in designated positions for the truss elements being manufactured;

a top nail plate (TNP) grouping of stations configured to receive and position TNPs onto the assembly jig in designated positions for the truss elements being manufactured; and a nail plate press station configured to press the BNPs and the TNPs through a corresponding one of the truss chords and into one or more of the angled webs and/or upright webs for rigidly interlocking the angled webs, the upright webs, and the truss chords together to form a finished truss element;

wherein the assembly jig comprises alignment and/or positioning features configured to hold the TNPs, the BNPs, the truss chords, the upright webs, and the angled webs in alignment with each other to form one of the truss elements.

2. The system of claim 1, comprising:

a finished truss storage station configured to store finished truss elements; and a finished truss unloading station configured to transfer finished truss elements from the assembly jig to the finished truss storage station.

3. The system of claim 2, wherein:

the finished truss storage station comprises a multi-level storage rack, which has at least an induction level and one or more upper levels, and a truss elevator;

the induction level comprising an induction conveyor, which is configured to form the finished truss elements into a stack of finished truss elements, and a transport conveyor, which is configured to transfer the stack of finished truss elements onto the truss elevator;

the induction conveyor is vertically movable between an induction position, in which a plane on which the finished truss elements are supported by the induction conveyor is above a plane defined by an upper surface of the transport conveyor, and a transport position, in which the plane on which the truss elements are supported by the induction conveyor is below the plane defined by the upper surface of the transport conveyor; and the truss elevator is configured to vertically move the stack of finished truss elements between the induction level and any of the one or more upper levels.

4. The system of claim 3, wherein the finished truss unloading station comprises an automated robot configured to lift the finished truss element off of the assembly jig and deposit the finished truss element onto the induction conveyor of the multi-level storage rack.

5. The system of claim 1, wherein the angled web grouping of stations comprises an angled web loading station, an angled web rough cut station, an angled web finish cut station, and an angled web delivery station.

6. The system of claim 5, wherein the angled web loading station comprises:

a conveyor configured to provide the dimensional lumber for use in forming the angled webs; and an automated robot configured to transfer the dimensional lumber to the angled web rough cut station.

7. The system of claim 6, wherein the angled web rough cut station comprises:

a saw for cutting the dimensional lumber into angled web segments; and a feed trough configured to receive the dimensional lumber from the robot of the angled web loading station and to move the dimensional lumber relative to the saw;

the system comprising:

a controller configured to control a movement of the dimensional lumber along the feed trough and an actuation of the saw to produce the angled web segments having a length specified in instructions stored in a database associated with the controller for the truss elements being manufactured.

8. The system of claim 7, wherein the angled web finish cut station comprises:

a cutting machine for forming an end profile on opposing ends of each of the angled web segments to produce a finished angled web; and a conveyor configured to transport the angled web segment into the cutting machine and to transport the finished angled web to a delivery trough of the angled web delivery station.

9. The system of claim 8, wherein the delivery trough of the angled web delivery station is configured to transport the finished angled webs to the finished lumber merge/transfer station.

10. The system of claim 1, wherein the upright web grouping of stations comprises an upright web loading station, an upright web cut station, and an upright web delivery station.

11. The system of claim 10, wherein the upright web loading station comprises:

a conveyor configured to provide the dimensional lumber for use in forming the upright webs; and an automated robot configured to transfer the dimensional lumber to the upright web cut station.

12. The system of claim 11, wherein the upright web cut station comprises:

a saw for cutting the dimensional lumber into finished upright webs; and a feed trough configured to receive the dimensional lumber from the robot of the upright web loading station and to move the dimensional lumber relative to the saw;

the system comprising:

a controller configured to control a movement of the dimensional lumber along the feed trough and an actuation of the saw to produce the finished upright webs having a length specified in instructions stored in a database associated with the controller for the truss elements being manufactured;

wherein the finished upright webs are transferred, after cutting of the dimensional lumber by the saw, to a delivery trough of the upright web delivery station.

13. The system of claim 12, wherein the delivery trough of the upright web delivery station is configured to transport the finished upright webs to the finished lumber merge/transfer station.

14. The system of claim 1, wherein the truss chord grouping of stations comprises a truss chord loading station, a truss chord cut station, and a truss chord delivery station.

15. The system of claim 14, wherein the truss chord loading station comprises:

a conveyor configured to provide the dimensional lumber for use in forming the truss chords; and an automated robot configured to transfer the dimensional lumber to the truss chord cut station.

16. The system of claim 15, wherein the truss chord cut station comprises:
a saw for cutting the dimensional lumber into finished truss chords; and
a feed trough configured to receive the dimensional lumber from the robot of the truss chord loading station and to move the dimensional lumber relative to the saw;
the system comprising:
a controller configured to control a movement of the dimensional lumber along the feed trough and an actuation of the saw to produce the finished truss chords having a length specified in instructions stored in a database associated with the controller for the truss elements being manufactured;
wherein the finished truss chords are transferred, after cutting of the dimensional lumber by the saw, to a delivery trough of the truss chord delivery station.

17. The system of claim 16, wherein the delivery trough of the truss chord delivery station is configured to transport the finished truss chords to the finished lumber merge/transfer station.

18. The system of claim 1, wherein the finished lumber merge/transfer station comprises at least one robot configured to transfer finished angled webs, finished upright webs, and finished truss chords onto the assembly jig at the finished lumber jig placement station according to instructions stored in a database for the truss elements being manufactured.

19. The system of claim 18, wherein, before the finished angled webs, finished upright webs, and finished truss chords are transferred onto the assembly jig at the finished lumber jog placement station, the BNP grouping of stations is configured to place BNPs at prescribed locations on the assembly jig according to the instructions for the truss elements being manufactured.

20. The system of claim 18, comprising a conveyor configured to move the assembly jig from the finished lumber jig placement station to a TNP jig placement station of the TNP grouping of stations, which is configured to place TNPs at prescribed locations on the assembly jig according to the instructions for the truss elements being manufactured.

21. The system of claim 20, comprising one or more conveyors configured to move the assembly jig from the TNP jig placement station to the nail plate press station and, after the nail plate press station has formed the finished truss element, from the nail plate press station to the finished truss unloading station.

22. The system of claim 21, comprising a further conveyor configured to move the assembly jig from the finished truss unloading station to a BNP jig placement station of the BNP grouping of stations, which is configured to place BNPs at prescribed locations on the assembly jig according to the instructions for manufacture of another of the truss elements.

23. The system of claim 1, wherein the system is configured such that truss elements can be assembled on a plurality of assembly jigs simultaneously.

24. A method for automated manufacture of truss elements for use in modular construction units, the method comprising:
receiving and cutting, at an angled web grouping of stations, dimensional lumber to form angled webs for use in assembly of the truss elements;
receiving and cutting, at an upright web grouping of stations, dimensional lumber to form upright webs for use in assembly of the truss elements;
receiving and cutting, at a truss chord grouping of stations, dimensional lumber to form truss chords for use in assembly of the truss elements;
receiving, at a finished lumber merge/transfer station, the angled webs from the angled web grouping of stations, the upright webs from the upright web grouping of stations, and the truss chords from the truss chord grouping of stations;
transferring, at the finished lumber merge/transfer station, the angled webs, the upright webs, and the truss chords onto an assembly jig at a finished lumber jig placement station;
receiving and positioning, at a bottom nail plate (BNP) grouping of stations, BNPs onto the assembly jig in designated positions for the truss elements being manufactured;
receiving and positioning, at a top nail plate (TN P) grouping of stations, TNPs onto the assembly jig in designated positions for the truss elements being manufactured; and
pressing, at a nail plate press station, the BNPs and the TNPs through a corresponding one of the truss chords and into one or more of the angled webs and/or upright webs for rigidly interlocking the angled webs, the upright webs, and the truss chords together to form a finished truss element;
wherein the assembly jig comprises alignment and/or positioning features configured to hold the TNPs, the BNPs, the truss chords, the upright webs, and the angled webs in alignment with each other to form one of the truss elements.

25. The method of claim 24, comprising:
storing, at a finished truss storage station, finished truss elements; and
transferring, at a finished truss unloading station, finished truss elements from the assembly jig to the finished truss storage station.

26. The method of claim 25, wherein the finished truss storage station comprises a multi-level storage rack, which has at least an induction level and one or more upper levels, and a truss elevator, the method comprising:
forming, using an induction conveyor of the induction level, the finished truss elements into a stack of finished truss elements;
transferring, using a transport conveyor of the induction level, the stack of finished truss elements onto the truss elevator;
moving the induction conveyor vertically between an induction position, in which a plane on which the finished truss elements are supported by the induction conveyor is above a plane defined by an upper surface of the transport conveyor, and a transport position, in which the plane on which the truss elements are supported by the induction conveyor is below the plane defined by the upper surface of the transport conveyor; and
moving, using the truss elevator, the stack of finished truss elements vertically between the induction level and any of the one or more upper levels.

27. The method of claim 26, wherein the finished truss unloading station comprises an automated robot, the method comprising:
lifting, using the automated robot, the finished truss element off of the assembly jig; and depositing, using the automated robot, the finished truss element onto the induction conveyor of the multi-level storage rack.

28. The method of claim 24, wherein the angled web grouping of stations comprises an angled web loading station, an angled web rough cut station, an angled web finish cut station, and an angled web delivery station.

29. The method of claim 28, wherein the angled web loading station comprises a conveyor and an automated robot, the method comprising:
providing, via the conveyor, the dimensional lumber for use in forming the angled webs; and
transferring, using the automated robot, the dimensional lumber to the angled web rough cut station.

30. The method of claim 29, wherein the angled web rough cut station comprises a saw and a feed trough, the method comprising:
receiving, in the feed trough, the dimensional lumber from the robot of the angled web loading station;
moving, via the feed trough, the dimensional lumber relative to the saw;
cutting, using the saw, the dimensional lumber into angled web segments; and
controlling, via a controller, a movement of the dimensional lumber along the feed trough and an actuation of the saw to produce the angled web segments having a length specified in instructions stored in a database associated with the controller for the truss elements being manufactured.

31. The method of claim 30, wherein the angled web finish cut station comprises a cutting machine and a conveyor, the method comprising:
forming, via the cutting machine, an end profile on opposing ends of each of the angled web segments to produce a finished angled web;
transporting, via the conveyor, the angled web segment into the cutting machine; and
transporting, via the conveyor, the finished angled web to a delivery trough of the angled web delivery station.

32. The method of claim 31, comprising transporting, via the delivery trough of the angled web delivery station, the finished angled webs to the finished lumber merge/transfer station.

33. The method of claim 24, wherein the upright web grouping of stations comprises an upright web loading station, an upright web cut station, and an upright web delivery station.

34. The method of claim 33, wherein the upright web loading station comprises a conveyor and an automated robot, the method comprising:
providing, via the conveyor, the dimensional lumber for use in forming the upright webs; and
transferring, via the automated robot, the dimensional lumber to the upright web cut station.

35. The method of claim 34, wherein the upright web cut station comprises a saw and a feed trough, the method comprising:
receiving, in the feed trough, the dimensional lumber from the robot of the upright web loading station;
moving, via the feed trough, the dimensional lumber relative to the saw;
the method comprising:
cutting, using the saw, the dimensional lumber into finished upright webs;
controlling, via a controller, a movement of the dimensional lumber along the feed trough and an actuation of the saw to produce the finished upright webs having a length specified in instructions stored in a database associated with the controller for the truss elements being manufactured; and
transferring, after cutting of the dimensional lumber by the saw, the finished upright webs to a delivery trough of the upright web delivery station.

36. The method of claim 35, comprising transporting, via the delivery trough of the upright web delivery station, the finished upright webs to the finished lumber merge/transfer station.

37. The method of claim 24, wherein the truss chord grouping of stations comprises a truss chord loading station, a truss chord cut station, and a truss chord delivery station.

38. The method of claim 37, wherein the truss chord loading station comprises a conveyor and an automated robot, the method comprising:
providing, via the conveyor, the dimensional lumber for use in forming the truss chords; and
transferring, using the automated robot, the dimensional lumber to the truss chord cut station.

39. The method of claim 38, wherein the truss chord cut station comprises a saw and a feed trough, the method comprising:
receiving, in the feed trough, the dimensional lumber from the robot of the truss chord loading station;
moving, via the feed trough, the dimensional lumber relative to the saw;
cutting, using the saw, the dimensional lumber into finished truss chords;
controlling, using a controller, a movement of the dimensional lumber along the feed trough and an actuation of the saw to produce the finished truss chords having a length specified in instructions stored in a database associated with the controller for the truss elements being manufactured; and
transferring, after cutting of the dimensional lumber by the saw, the finished truss chords to a delivery trough of the truss chord delivery station.

40. The method of claim 39, comprising transporting, via the delivery trough of the truss chord delivery station, the finished truss chords to the finished lumber merge/transfer station.

41. The method of claim 24, wherein the finished lumber merge/transfer station comprises at least one robot, the method comprising transferring, using the at least one robot, finished angled webs, finished upright webs, and finished truss chords onto the assembly jig at the finished lumber jig placement station according to instructions stored in a database for the truss elements being manufactured.

42. The method of claim 41, comprising placing, using the BNP grouping of stations, BNPs at prescribed locations on the assembly jig according to the instructions for the truss elements being manufactured before the finished angled webs, finished upright webs, and finished truss chords are transferred onto the assembly jig at the finished lumber jog placement station.

43. The method of claim 41, comprising:
moving, using a conveyor, the assembly jig from the finished lumber jig placement station to a TNP jig placement station of the TNP grouping of stations; and
placing, using the TNP jig placement station, TNPs at prescribed locations on the assembly jig according to the instructions for the truss elements being manufactured.

44. The method of claim 43, comprising moving, using one or more conveyors, the assembly jig from the TNP jig placement station to the nail plate press station and, after the nail plate press station has formed the finished truss element, from the nail plate press station to the finished truss unloading station.

45. The method of claim 44, comprising:
- moving, using a further conveyor, the assembly jig from the finished truss unloading station to a BNP jig placement station of the BNP grouping of stations; and
- placing, using the BNP jig placement station, BNPs at prescribed locations on the assembly jig according to the instructions for manufacture of another of the truss elements.

46. The method of claim 24, comprising using a plurality of assembly jigs to simultaneously manufacture a plurality of truss elements in a sequential manner.

* * * * *